US012559182B2

(12) United States Patent
Lemke et al.

(10) Patent No.: US 12,559,182 B2
(45) Date of Patent: Feb. 24, 2026

(54) TRANSITION DOOR FOR REFUSE VEHICLE

(71) Applicant: Oshkosh Corporation, Oshkosh, WI (US)

(72) Inventors: Brandon Lemke, Oshkosh, WI (US); Greg Steffens, Oshkosh, WI (US); McCall Groen, Oshkosh, WI (US); Jeff Verhagen, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 474 days.

(21) Appl. No.: 18/110,982

(22) Filed: Feb. 17, 2023

(65) Prior Publication Data

US 2023/0312021 A1 Oct. 5, 2023

Related U.S. Application Data

(60) Provisional application No. 63/325,684, filed on Mar. 31, 2022, provisional application No. 63/325,810, (Continued)

(51) Int. Cl.
*B62D 25/24* (2006.01)
*B62D 33/06* (2006.01)
(Continued)

(52) U.S. Cl.
CPC ............. *B62D 33/06* (2013.01); *B62D 25/24* (2013.01); *B62D 35/005* (2013.01); *B65F 3/02* (2013.01); *B65F 2003/0279* (2013.01)

(58) Field of Classification Search
CPC ...... B62D 33/06; B62D 25/24; B62D 35/005; B65F 3/02; B65F 2003/0279; E05Y 2900/516; E05Y 2900/518
See application file for complete search history.

(56) References Cited

U.S. PATENT DOCUMENTS

| | | | |
|---|---|---|---|
| 1,754,257 A | | 4/1930 | Britt |
| 3,929,202 A | * | 12/1975 | Hobbensiefken .... B62D 35/001 296/180.2 |

(Continued)

FOREIGN PATENT DOCUMENTS

| | | |
|---|---|---|
| CN | 111890891 A | 11/2020 |
| CN | 116834522 A | 10/2023 |

(Continued)

OTHER PUBLICATIONS https://info.macktrucks.com/refuse-revolution; "Welcome to the refuse revolution. Mack LR Electric." Retrieved on Mar. 21, 2023.

(Continued)

*Primary Examiner* — Hilary L Gutman
(74) *Attorney, Agent, or Firm* — Foley & Lardner LLP

(57) ABSTRACT

A refuse vehicle includes a chassis, a cab coupled to the chassis, a body coupled to the chassis and spaced from the cab such that a gap is positioned therebetween, and a transition door assembly positioned across the gap. The transition door assembly includes a support structure, a door panel, a hinge, a latch, and a latch actuator. The support structure is coupled to the body. The support structure includes a cantilevered arm having a latch retainer positioned or defined therealong. The door panel has a rear edge and a front edge. The hinge pivotably couples the rear edge of the door panel to the body. The latch is disposed along the door panel and positioned to engage with the latch retainer to selectively secure the door panel in a closed orientation. The latch actuator is configured to facilitate disengaging the latch from the latch retainer.

20 Claims, 62 Drawing Sheets

Related U.S. Application Data filed on Mar. 31, 2022, provisional application No. 63/325,872, filed on Mar. 31, 2022.

(51) Int. Cl.
  *B62D 35/00* (2006.01)
  *B65F 3/02* (2006.01)

(56) References Cited

U.S. PATENT DOCUMENTS

| | | | |
|---|---|---|---|
| 3,934,644 A | 1/1976 | Johnston | |
| 4,035,016 A * | 7/1977 | Ricca | B62D 33/06 296/202 |
| 4,082,343 A * | 4/1978 | Hurt, II | B60R 21/131 296/35.1 |
| 4,121,684 A * | 10/1978 | Stephens | B62D 33/067 296/26.02 |
| 4,257,643 A * | 3/1981 | Choulet | B62D 35/001 296/180.2 |
| 4,351,554 A * | 9/1982 | Miller | B62D 33/0612 296/190.02 |
| 4,611,796 A | 9/1986 | Orr | |
| 4,648,775 A | 3/1987 | Verner | |
| 4,775,179 A * | 10/1988 | Riggs | B62D 33/0612 5/118 |
| 4,787,670 A * | 11/1988 | Bentz | B62D 33/06 5/118 |
| 4,813,736 A * | 3/1989 | Schubert | B62D 65/04 180/89.18 |
| 4,883,307 A * | 11/1989 | Hacker | B62D 35/001 296/180.2 |
| 4,913,485 A * | 4/1990 | Moffatt | B62D 33/0612 52/309.1 |
| 5,078,448 A | 1/1992 | Selzer et al. | |
| 5,083,834 A * | 1/1992 | Moffatt | B62D 33/0612 296/26.02 |
| 5,310,239 A * | 5/1994 | Koske | B62D 33/0612 296/190.07 |
| 5,317,880 A | 6/1994 | Spears | |
| 5,501,567 A | 3/1996 | Lanzdorf et al. | |
| 5,536,062 A | 7/1996 | Spears | |
| 5,653,493 A | 8/1997 | Spears | |
| 6,099,069 A | 8/2000 | Spears | |
| 6,932,419 B1 * | 8/2005 | McCullough | B62D 35/001 296/180.1 |
| 7,263,754 B1 * | 9/2007 | Henry | B62D 33/0612 29/469 |
| 8,827,351 B1 * | 9/2014 | Kenevan | B62D 35/001 296/180.1 |
| 8,944,016 B2 | 2/2015 | Hallqvist et al. | |
| 10,214,252 B2 | 2/2019 | Schellekens et al. | |
| 10,941,695 B2 | 3/2021 | Tholander et al. | |
| 10,946,906 B2 | 3/2021 | Pereira et al. | |
| 11,345,219 B2 | 5/2022 | Getzschman et al. | |
| 11,639,204 B2 * | 5/2023 | Weber | B62D 35/001 296/180.2 |
| 11,679,821 B2 * | 6/2023 | Polzin | B62D 35/001 296/91 |
| 12,017,705 B2 * | 6/2024 | Archer | F16D 63/006 |
| 2002/0073626 A1 | 6/2002 | Ringger | |
| 2005/0040668 A1 | 2/2005 | Wood | |
| 2006/0207207 A1 | 9/2006 | Bang et al. | |
| 2007/0200390 A1 * | 8/2007 | Lotarev | B62D 33/0612 296/180.2 |
| 2008/0053129 A1 | 3/2008 | Follette et al. | |
| 2009/0250970 A1 * | 10/2009 | Regnell | B62D 33/06 296/190.01 |
| 2010/0072779 A1 * | 3/2010 | Pfaff | B62D 35/001 296/180.2 |
| 2011/0068602 A1 * | 3/2011 | Burrows | B62D 35/001 296/180.1 |
| 2011/0241377 A1 * | 10/2011 | Rogers | B62D 35/001 296/180.3 |
| 2012/0098215 A1 | 4/2012 | Rositch et al. | |
| 2013/0249183 A1 | 9/2013 | Ellifson et al. | |
| 2013/0300073 A1 | 11/2013 | Venton-Walters et al. | |
| 2014/0252798 A1 * | 9/2014 | Angelo | B62D 33/0604 296/180.2 |
| 2014/0265203 A1 | 9/2014 | Zuleger et al. | |
| 2014/0326555 A1 | 11/2014 | Ellifson et al. | |
| 2014/0334956 A1 | 11/2014 | Venton-Walters et al. | |
| 2015/0108787 A1 | 4/2015 | Schmidt | |
| 2015/0151651 A1 | 6/2015 | Stingle et al. | |
| 2015/0191069 A1 | 7/2015 | Zuleger et al. | |
| 2016/0096555 A1 | 4/2016 | Kantharaju et al. | |
| 2016/0167475 A1 | 6/2016 | Ellifson et al. | |
| 2016/0311253 A1 | 10/2016 | Palmer et al. | |
| 2016/0375805 A1 | 12/2016 | Krueger et al. | |
| 2017/0267052 A1 | 9/2017 | Zuleger et al. | |
| 2018/0056746 A1 | 3/2018 | Ellifson et al. | |
| 2019/0185077 A1 | 6/2019 | Smith et al. | |
| 2019/0276102 A1 | 9/2019 | Zuleger et al. | |
| 2019/0337350 A1 | 11/2019 | Ellifson et al. | |
| 2020/0062071 A1 | 2/2020 | Zuleger et al. | |
| 2020/0247486 A1 | 8/2020 | Groteleuschen et al. | |
| 2020/0256649 A1 | 8/2020 | Krueger et al. | |
| 2020/0290236 A1 | 9/2020 | Bjornstad et al. | |
| 2020/0290237 A1 | 9/2020 | Steffens et al. | |
| 2020/0290238 A1 | 9/2020 | Andringa et al. | |
| 2020/0291846 A1 | 9/2020 | Steffens et al. | |
| 2020/0391569 A1 | 12/2020 | Zuleger | |
| 2021/0171137 A1 | 6/2021 | Zuleger et al. | |
| 2021/0276643 A1 | 9/2021 | Ellifson et al. | |
| 2021/0300143 A1 | 9/2021 | Zuleger | |
| 2021/0354329 A1 | 11/2021 | Hou et al. | |
| 2021/0380179 A1 | 12/2021 | Smith et al. | |
| 2021/0394578 A1 | 12/2021 | Ellifson et al. | |
| 2022/0063738 A1 | 3/2022 | Nelson et al. | |
| 2022/0072736 A1 | 3/2022 | Steffens et al. | |
| 2022/0118854 A1 | 4/2022 | Davis et al. | |
| 2022/0134372 A1 | 5/2022 | Andringa | |
| 2022/0134856 A1 | 5/2022 | Andringa et al. | |
| 2022/0260344 A1 | 8/2022 | Krueger et al. | |
| 2022/0289290 A1 | 9/2022 | Andringa et al. | |
| 2022/0339987 A1 | 10/2022 | Zuleger et al. | |
| 2023/0070279 A1 | 3/2023 | Wheeler et al. | |
| 2023/0070769 A1 | 3/2023 | Wheeler et al. | |
| 2023/0074504 A1 | 3/2023 | Ellifson et al. | |
| 2023/0191887 A1 | 6/2023 | Rausch et al. | |
| 2023/0192202 A1 | 6/2023 | Landvik et al. | |
| 2023/0415985 A1 | 12/2023 | Steffens et al. | |
| 2023/0415986 A1 | 12/2023 | Steffens et al. | |
| 2025/0128576 A1 | 4/2025 | Mielke et al. | |
| 2025/0219429 A1 * | 7/2025 | Verhagen | B60R 16/0238 |

FOREIGN PATENT DOCUMENTS

| | | | | |
|---|---|---|---|---|
| DE | 4020221 A1 * | 1/1991 | | B65F 3/201 |
| EP | 2 886 034 A1 | 6/2015 | | |
| JP | H05-000569 U | 1/1993 | | |

OTHER PUBLICATIONS https://www.youtube.com/watch?v=NQFtAnm7D-c; "All-New Mack LR Electric Garbage Truck." Retrieved on Mar. 21, 2023.

* cited by examiner

1210

1230

1234

TRANSITION DOOR FOR REFUSE VEHICLE

CROSS-REFERENCE TO RELATED PATENT APPLICATIONS

This application claims the benefit of and priority to (a) U.S. Provisional Patent Application No. 63/325,684, filed Mar. 31, 2022, (b) U.S. Provisional Patent Application No. 63/325,810, filed Mar. 31, 2022, and (c) U.S. Provisional Patent Application No. 63/325,872, filed Mar. 31, 2022, all of which are incorporated herein by reference in their entireties.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to a refuse vehicle. The refuse vehicle includes a chassis, a cab coupled to the chassis, a body coupled to the chassis and spaced from the cab such that a gap is positioned therebetween, and a transition door assembly positioned across the gap. The transition door assembly includes a support structure, a door panel, a hinge, a latch, and a latch actuator. The support structure is coupled to the body. The support structure includes a cantilevered arm having a latch retainer positioned or defined therealong. The door panel has a rear edge and a front edge. The hinge pivotably couples the rear edge of the door panel to the body. The latch is disposed along the door panel and positioned to engage with the latch retainer to selectively secure the door panel in a closed orientation. The latch actuator is configured to facilitate disengaging the latch from the latch retainer.

Another embodiment relates to a refuse vehicle. The refuse vehicle includes a chassis, a cab coupled to the chassis, a body coupled to the chassis and spaced from the cab such that a gap is positioned therebetween, a cowl assembly positioned above the cab and extending toward the body where the cowl assembly defines a cowl recess, and a transition door coupled to either the body or the cab, and extending across the gap. The transition door includes a door panel having a first panel portion, a second panel portion, and a third panel portion extending between the first panel portion and the second panel portion at an angle toward a center of the refuse vehicle such that the second panel portion is offset inward relative to the first panel portion defining a door recess. The door recess aligns with the cowl recess.

Still another embodiment relates to a refuse vehicle. The refuse vehicle includes a chassis, a cab coupled to the chassis, a body coupled to the chassis and spaced from the cab such that a gap is positioned therebetween, a drip channel disposed along a rear wall of the cab where the drip channel extends at an angle along a height of the rear wall, and a transition door coupled to the body and extending across the gap. The transition door is configured to move with the body as the body and the cab articulate relative to one another. The angle of the drip channel provides clearance for the transition door as the transition door articulates relative to the cab.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIGS. 26-28A are various views of a configuration of the vehicle of FIG. 1 including a cowl assembly, according to another exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle (e.g., a refuse vehicle, etc.) of the present disclosure includes a cab, a body assembly positioned rearward of the cab with a gap defined therebetween, and a transition door assembly positioned between the cab and the body assembly and extending across the gap. The transition door assembly includes a cantilevered support structure extending from the body assembly and a door panel pivotably coupled to the body assembly. The door panel is configured to selectively engage with the support structure to secure the door panel in a closed orientation.

Overall Vehicle

Figure 1:
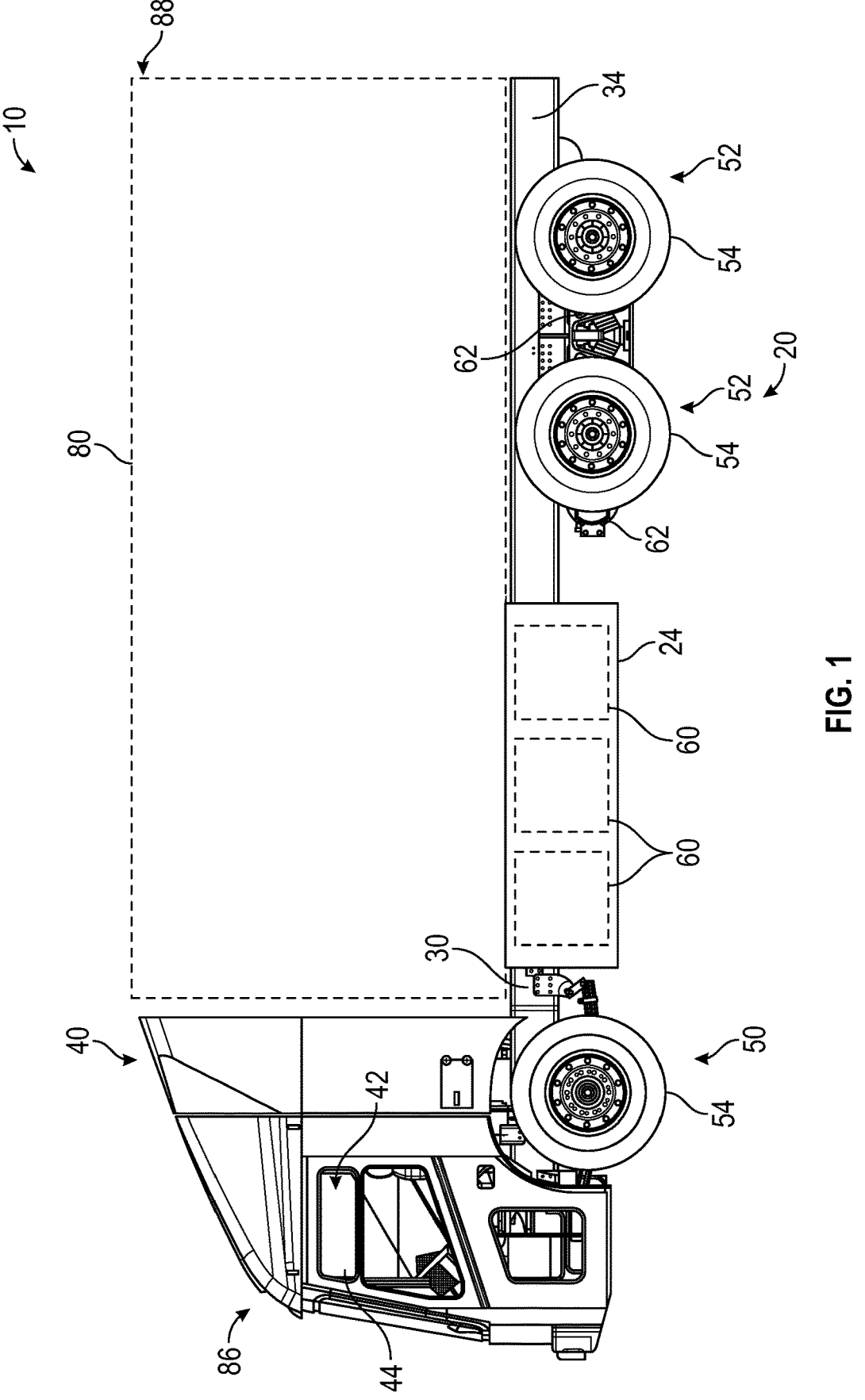
FIG. 1 is a left side view of a vehicle, according to an exemplary embodiment.
Figure 2:
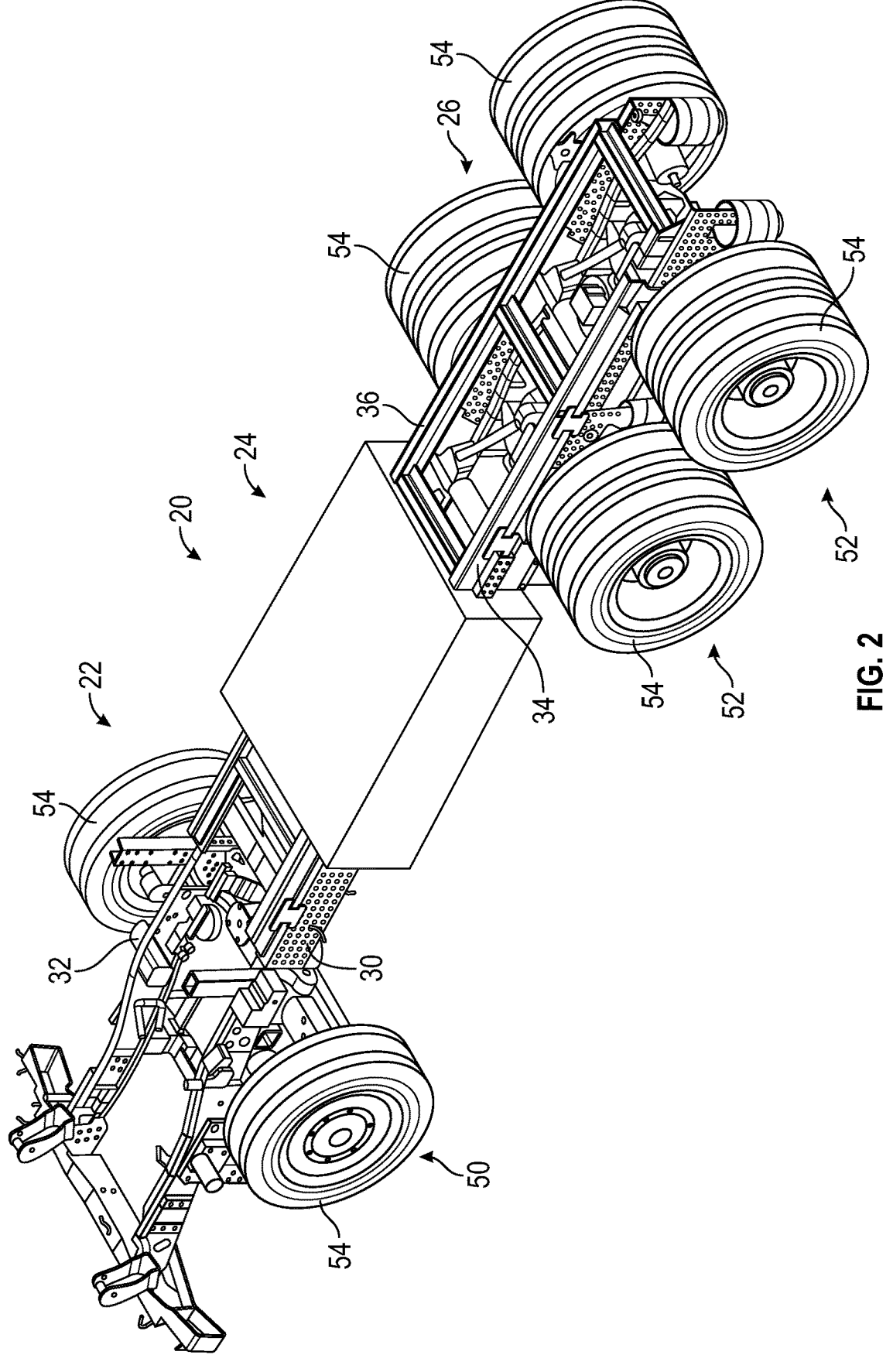
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles 52 may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide to the front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle 10 is longitudinal, with the front side 86 being arranged forward of the rear side 88.

A. Front-Loading Refuse Vehicle

Figure 3:
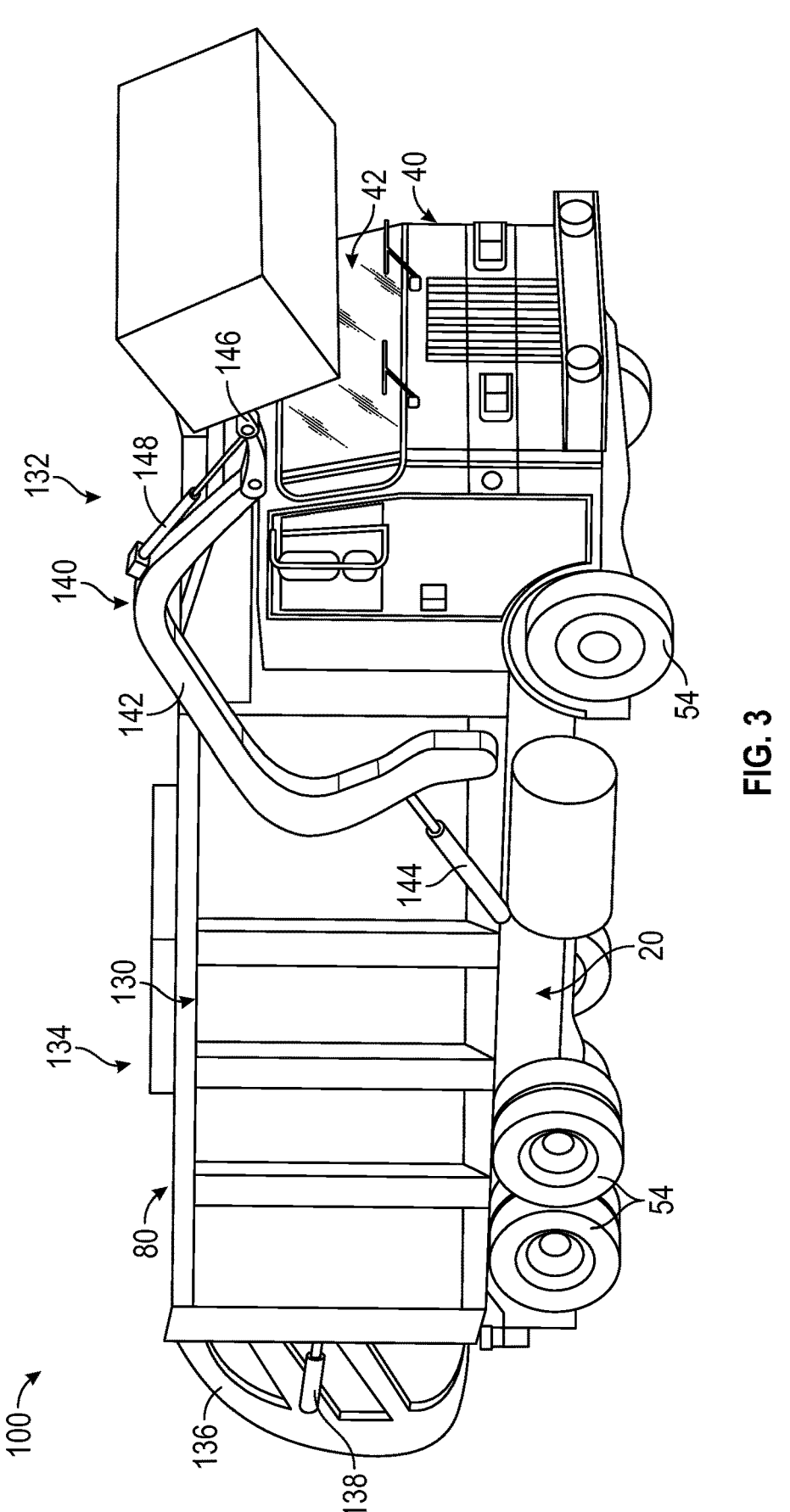
FIG. 3 is a perspective view of the vehicle of FIG. 1 configured as a front-loading refuse vehicle, according to an exemplary embodiment.
Figure 4:
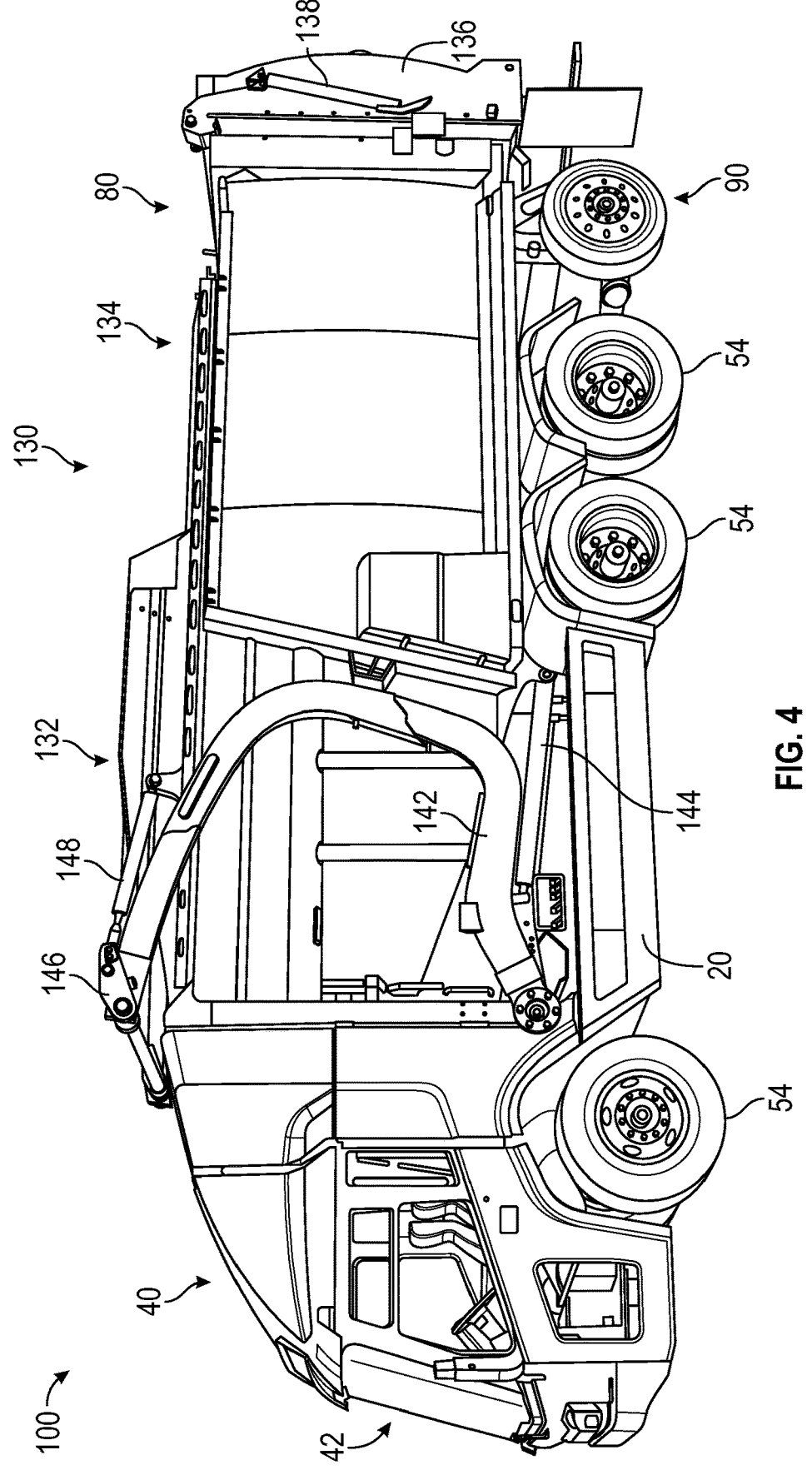
FIG. 4 is a left side view of the front-loading refuse vehicle of FIG. 3 configured with a tag axle.
Figure 5:
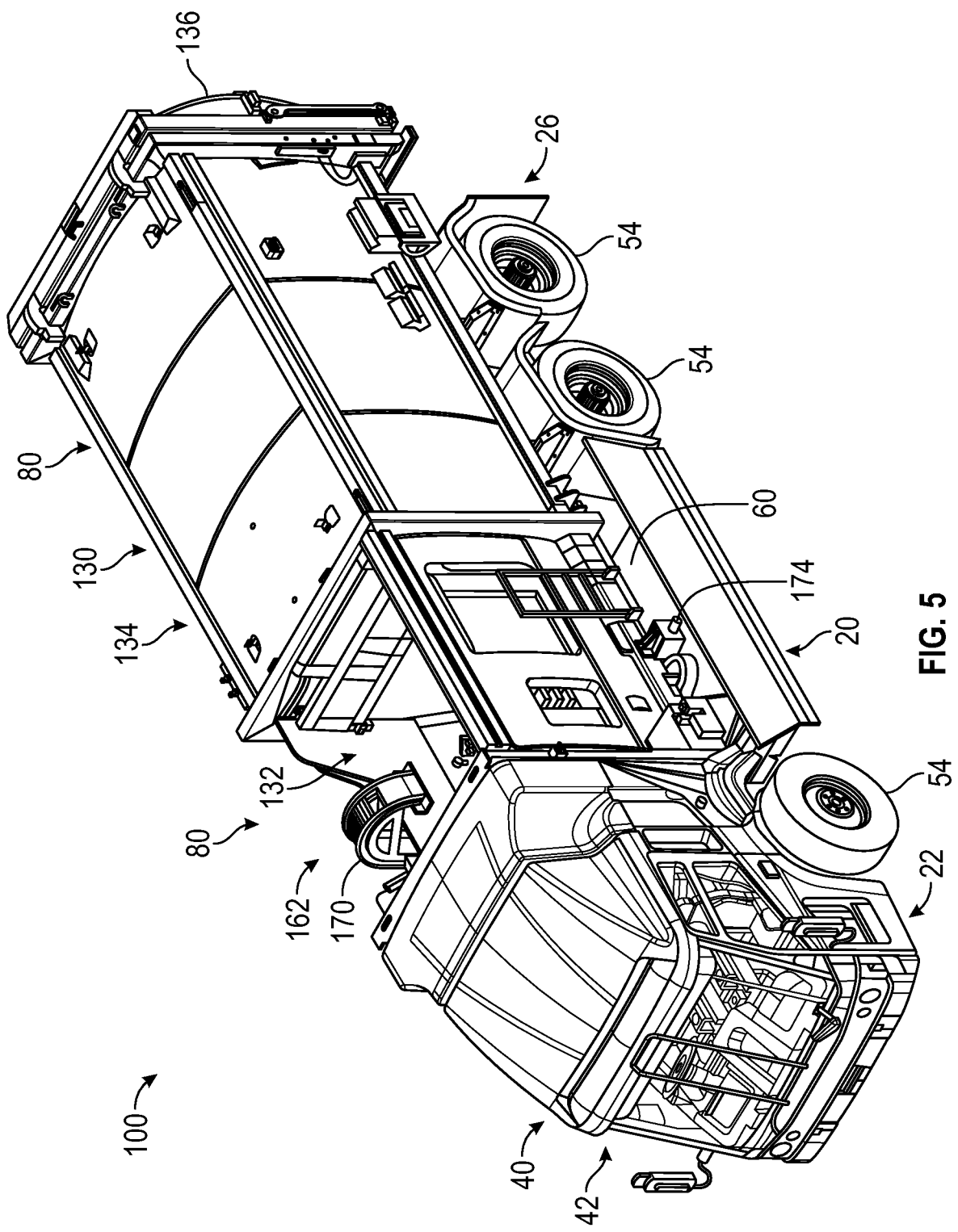
FIG. 5 is a perspective view of the vehicle of FIG. 1 configured as a side-loading refuse vehicle, according to an exemplary embodiment.
Figure 6:
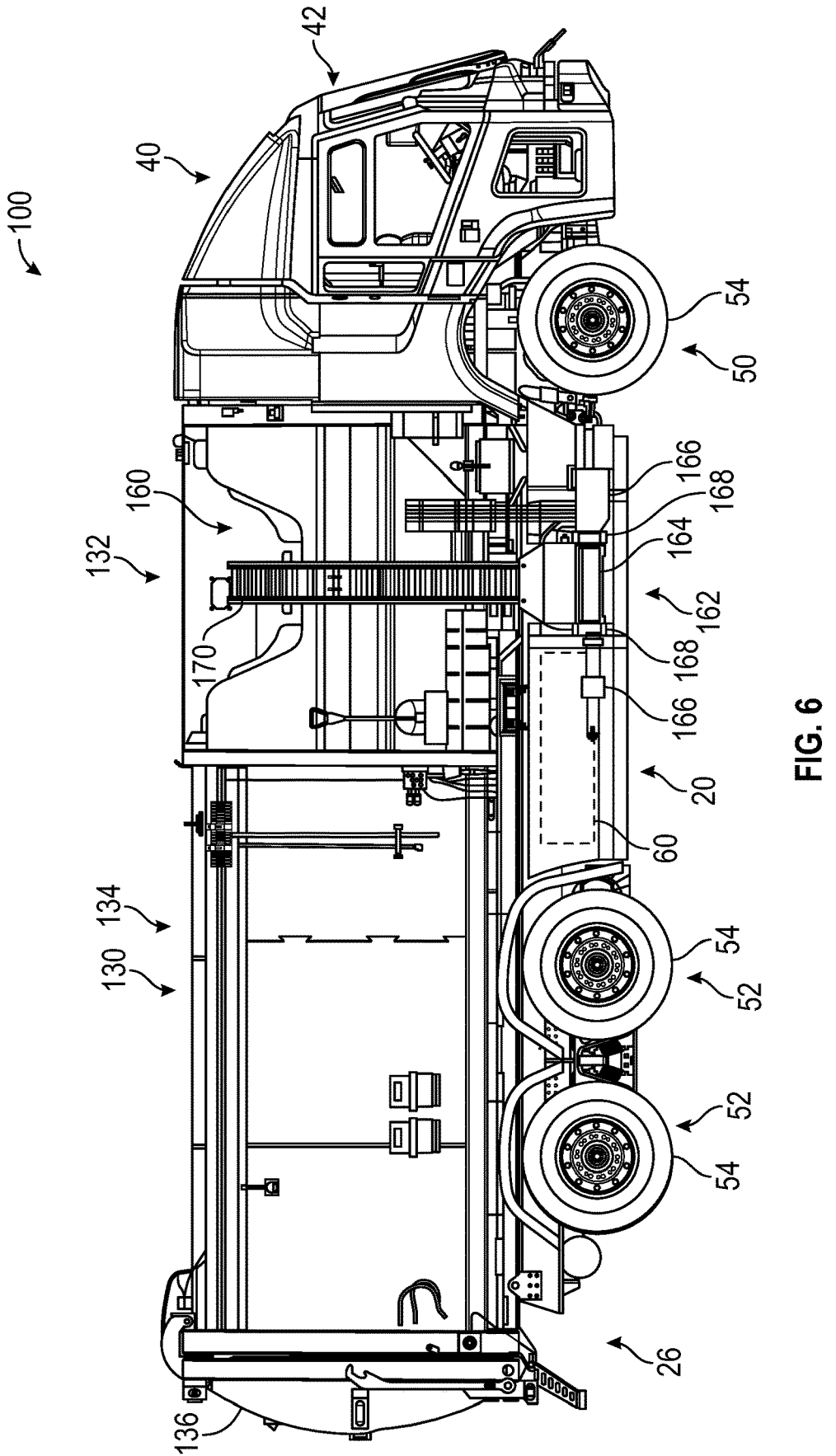
FIG. 6 is a right side view of the side-loading refuse vehicle of FIG. 5.
Figure 7:
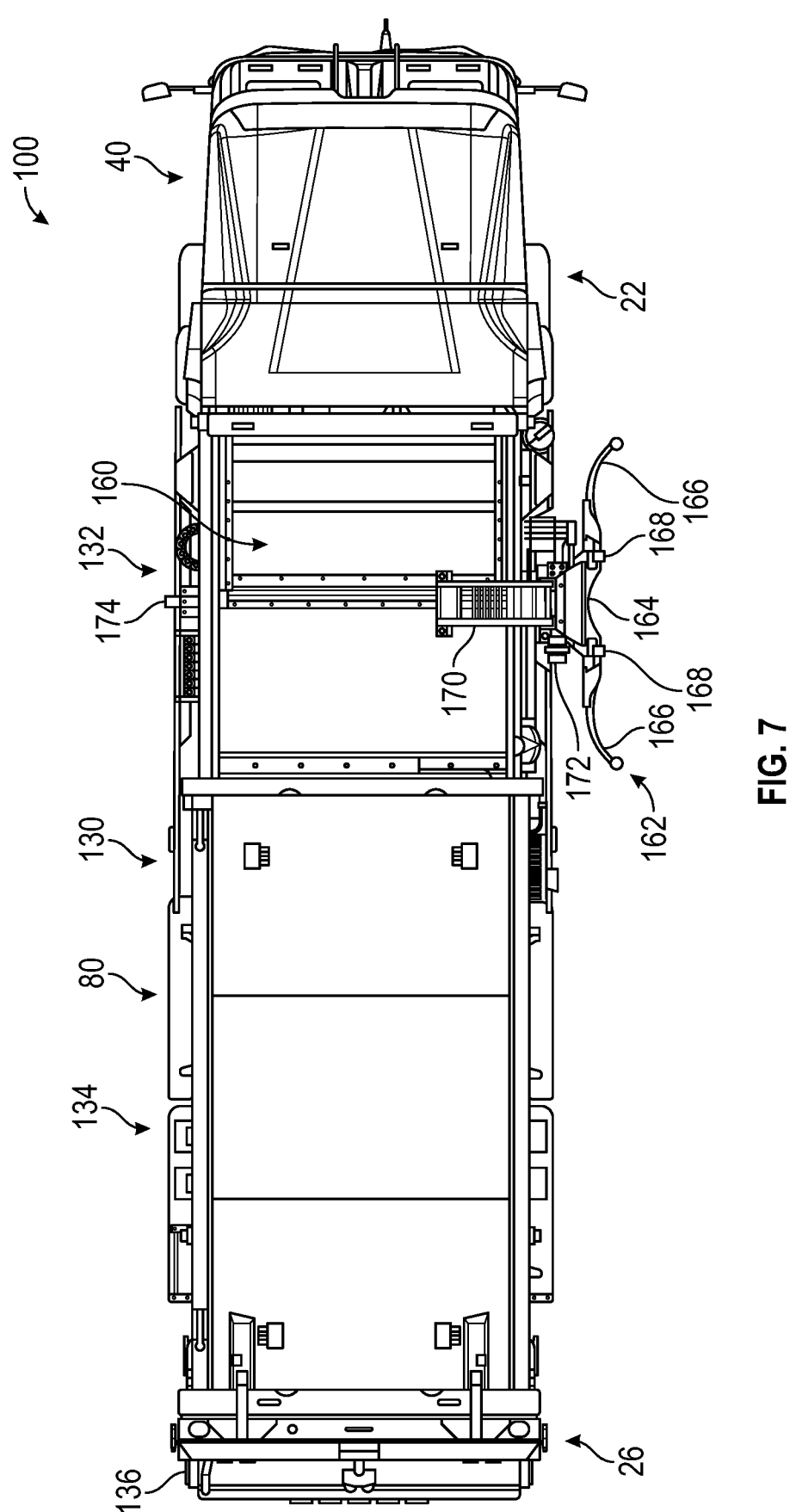
FIG. 7 is a top view of the side-loading refuse vehicle of FIG. 5.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively couple the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 8:
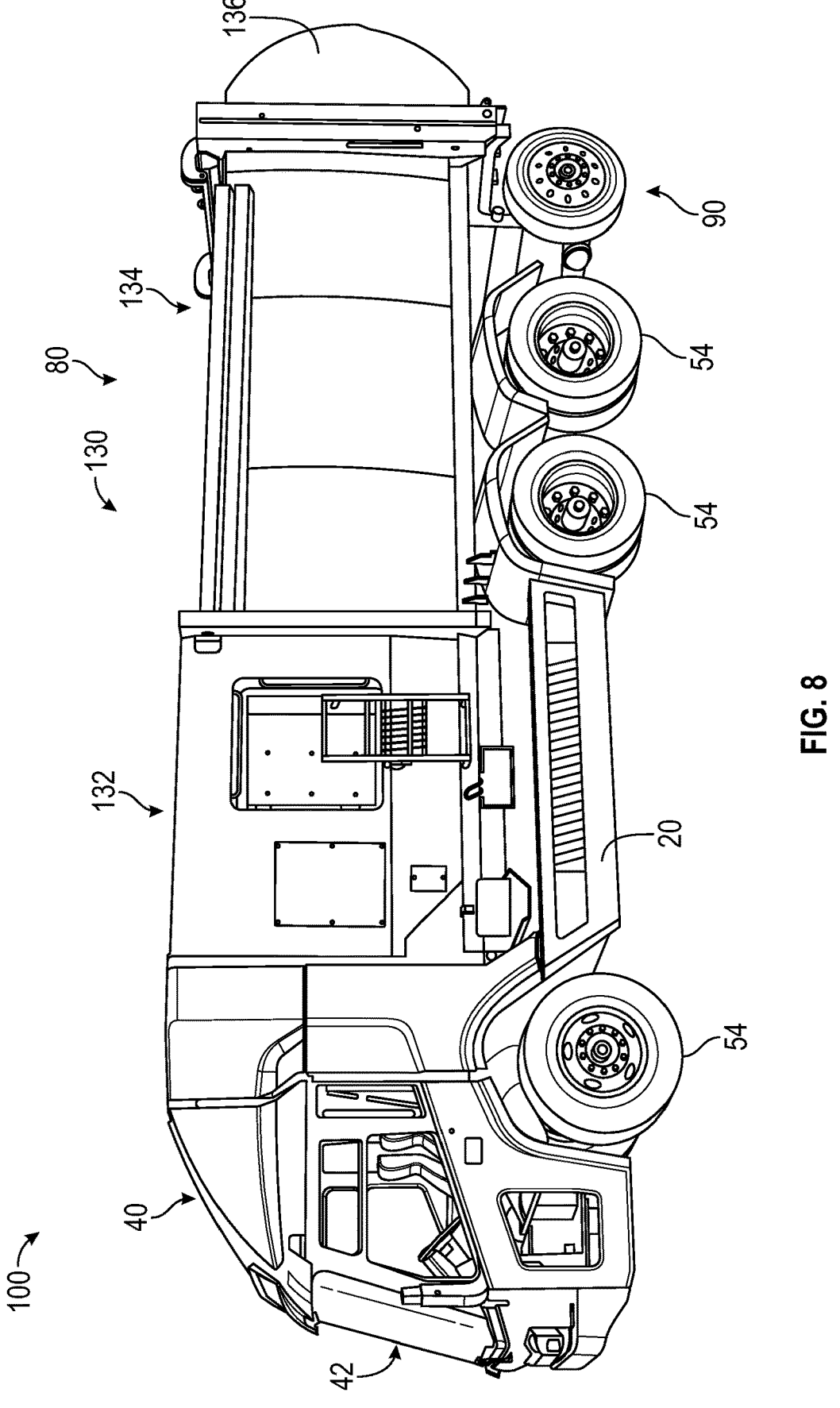
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown in FIG. 8, the refuse vehicle 100 of FIGS. 5-7 may be configured with a tag axle 90.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
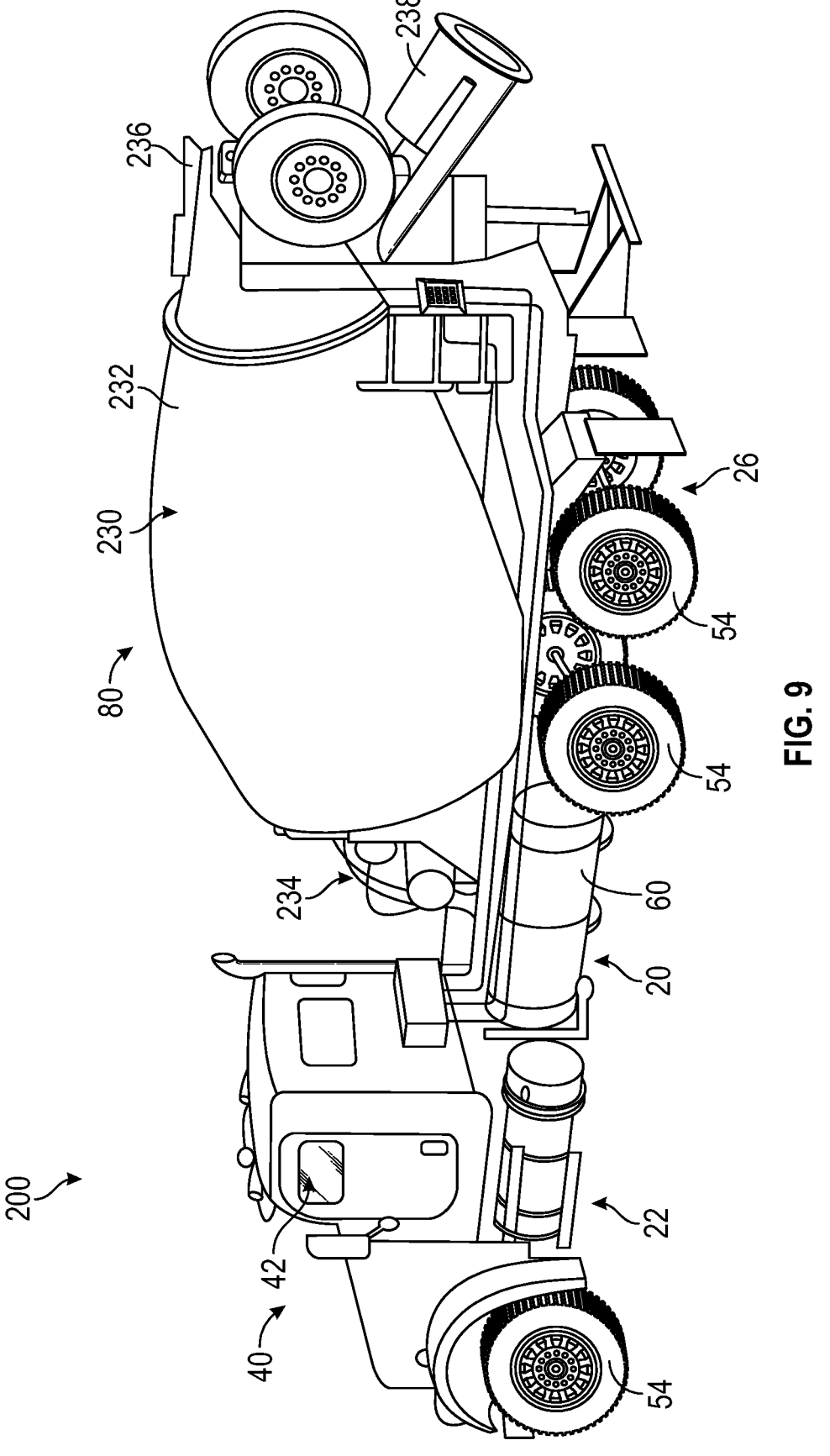
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plane extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
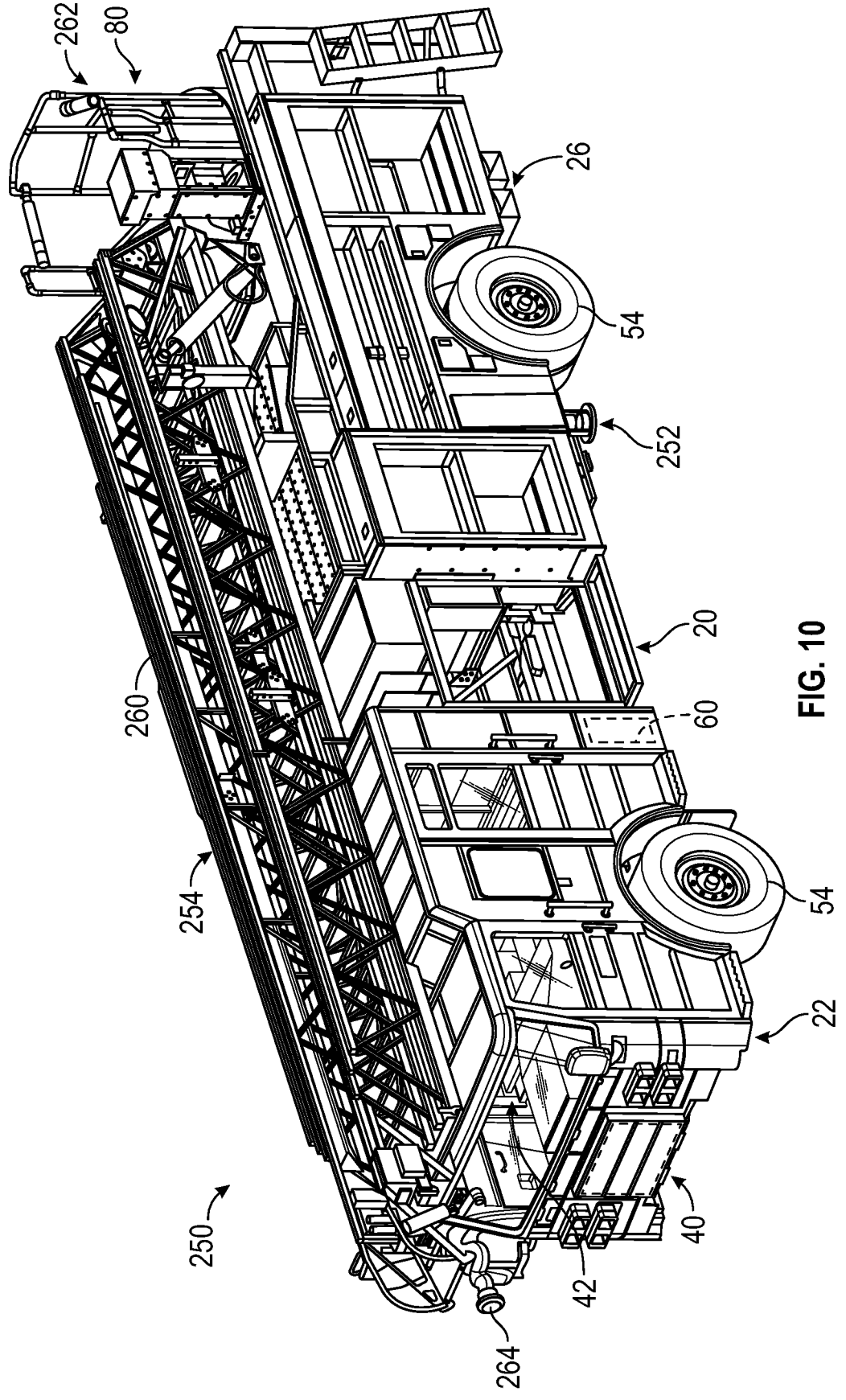
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
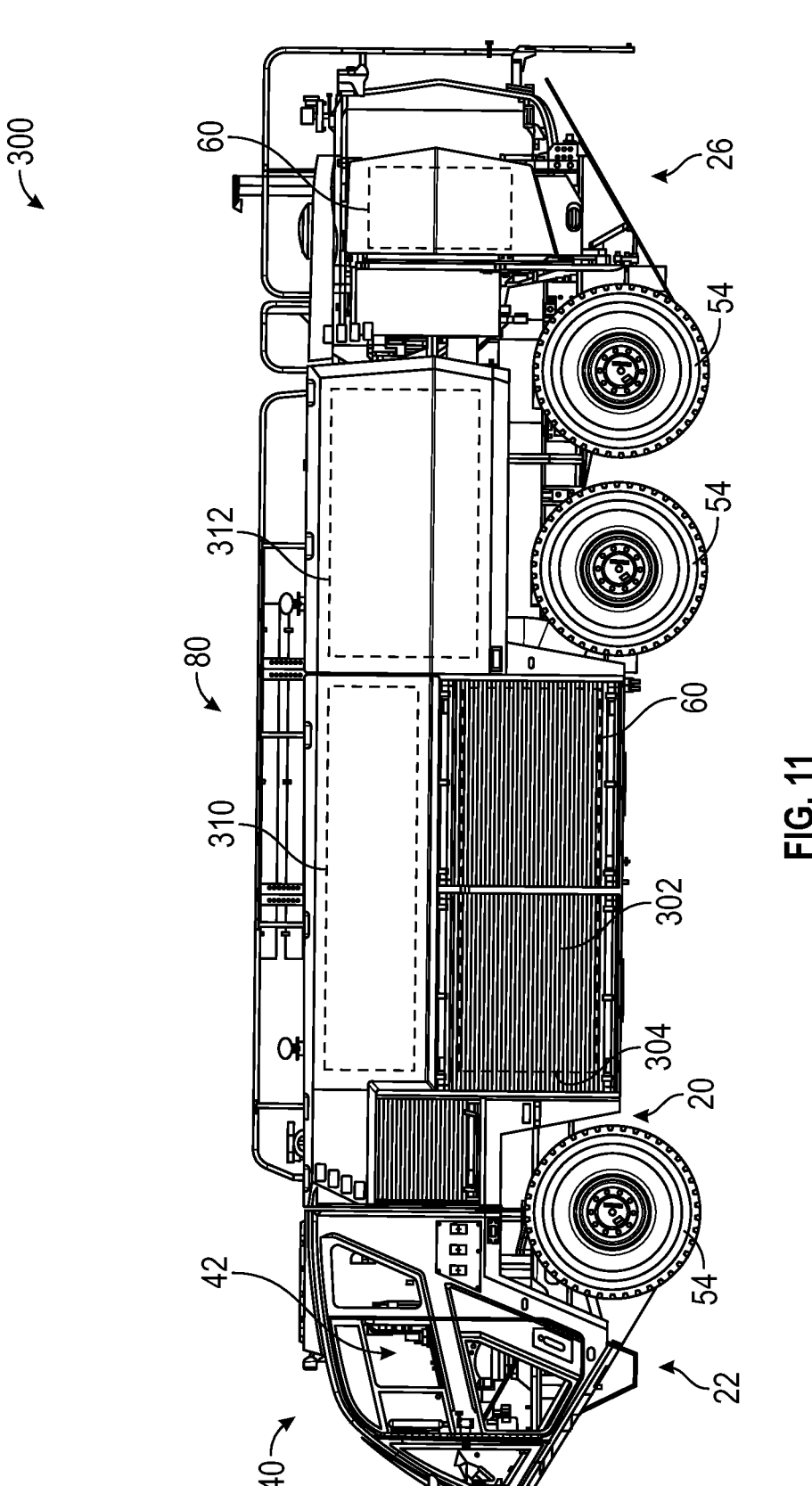
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
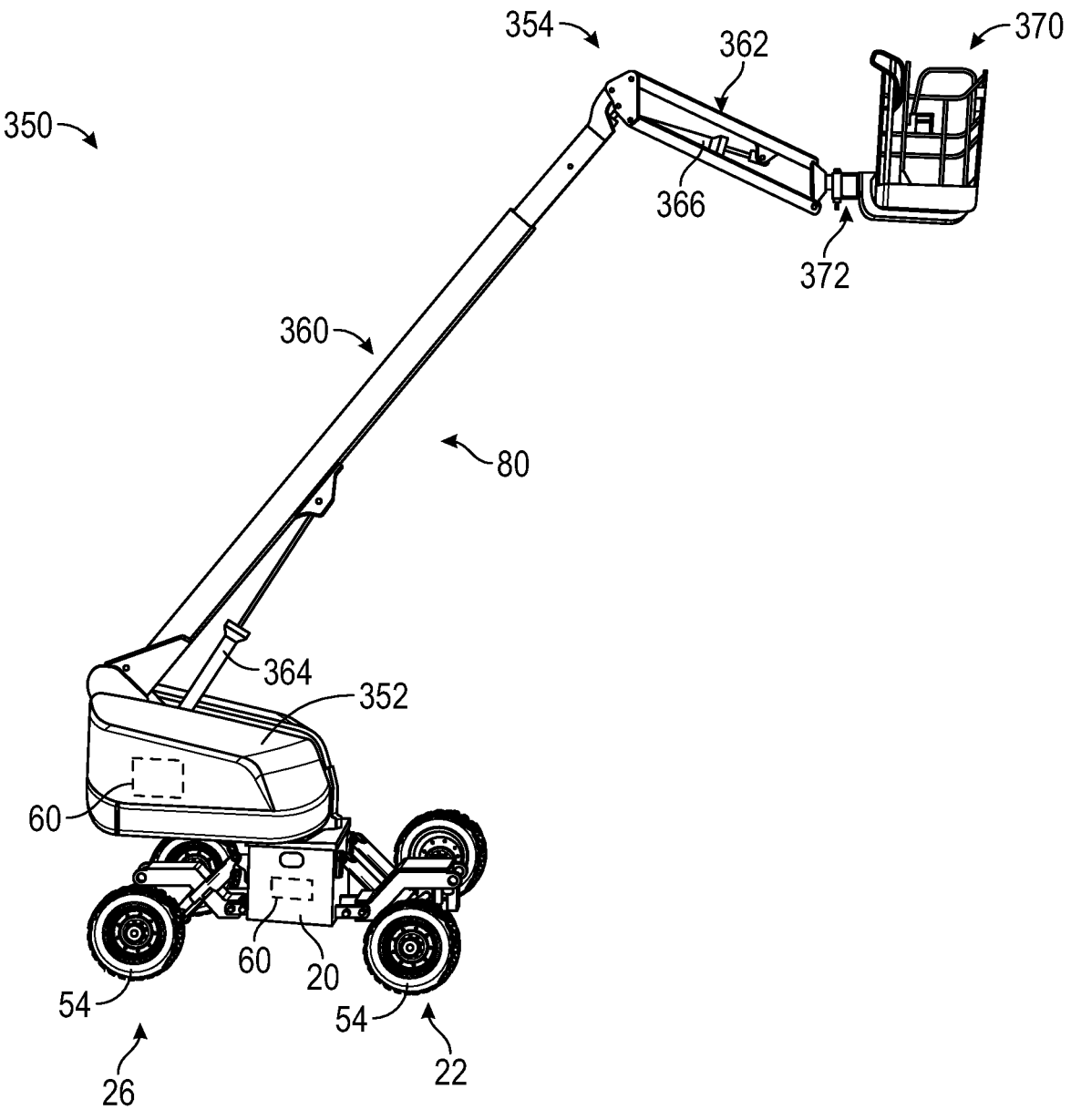
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may includes structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
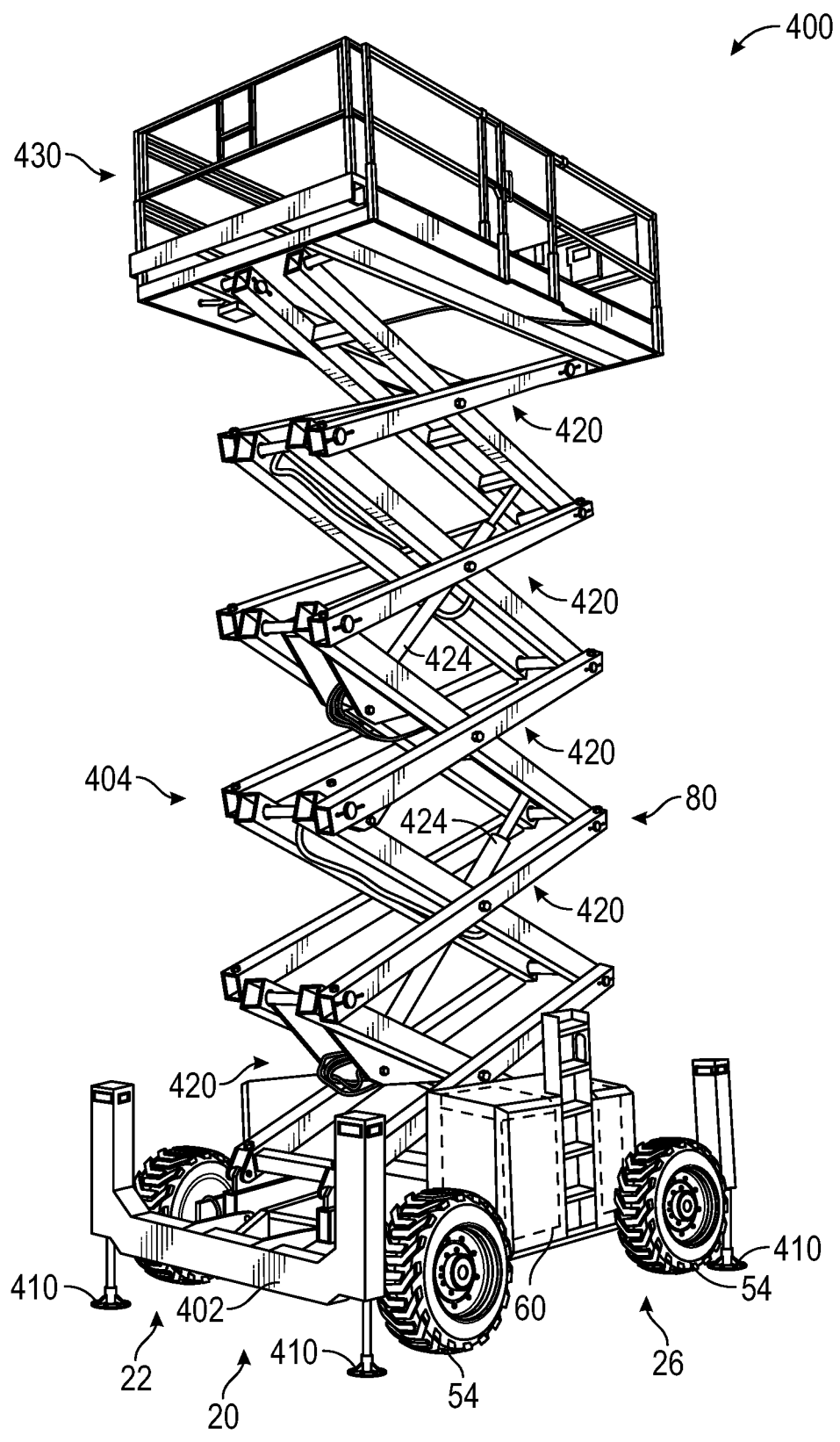
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Thermal Management System

Figure 15:
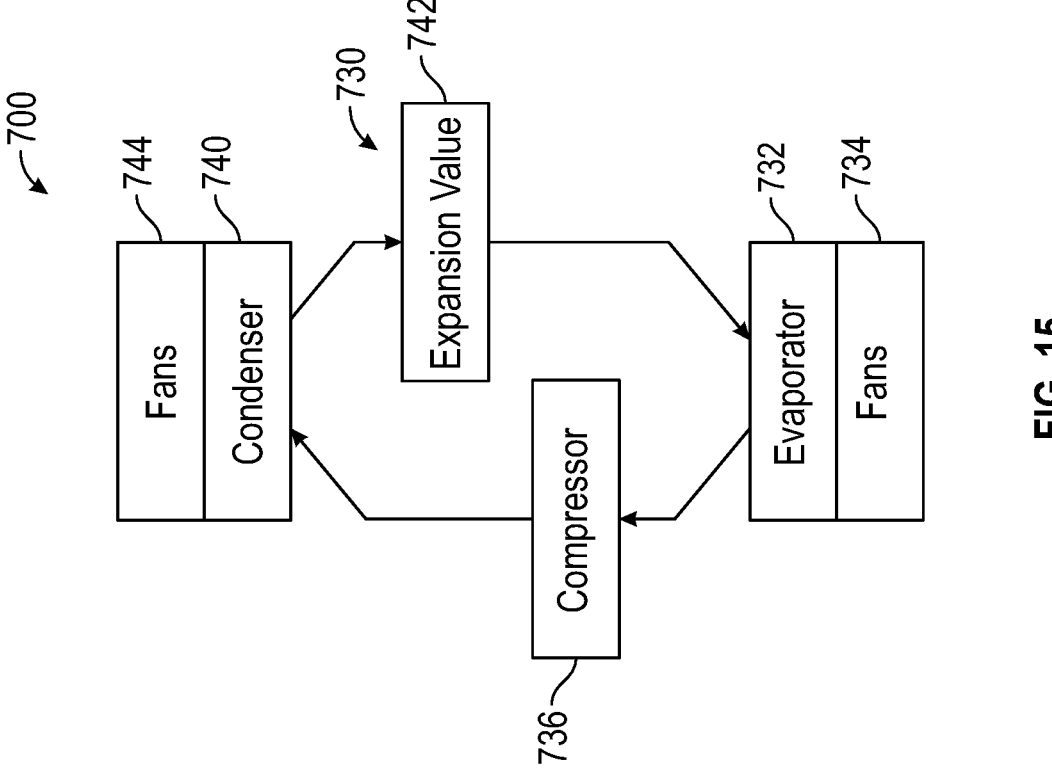
FIGS. 14 and 15 are block diagrams of a thermal management system for the vehicle of FIG. 1, according to an exemplary embodiment.
Figure 14:
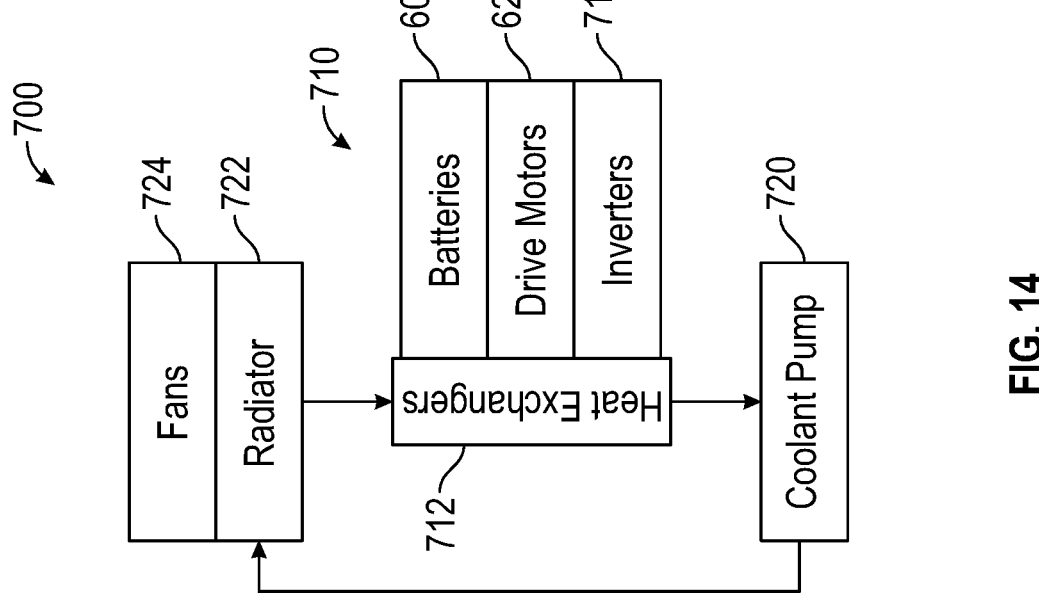

Referring to FIGS. 14 and 15, the vehicle 10 includes a heat dissipation system, a heating, ventilation, and air conditioning (HVAC) system, a temperature control system, or a thermal management system, shown as thermal management system 700. The thermal management system 700 is configured to vary the temperatures of one or more components of the vehicle 10 and/or one or more spaces within the vehicle 10. By way of example, the thermal management system 700 may cool one or more components of the vehicle 10 that generate heat during operation. By way of another example, the thermal management system 700 may provide cool air to a space occupied by an operator. By way of another example, the thermal management system 700 may warm the air within a space occupied by the operator (e.g., the cab interior 42).

Referring to FIG. 14, the thermal management system 700 includes a heat dissipation circuit, shown as coolant circuit 710. The coolant circuit 710 is configured to dissipate thermal energy from one or more components of the vehicle 10 to the surrounding atmosphere, decreasing or maintaining a temperature of those components. The coolant circuit 710 includes one or more heat transfer devices (e.g., water jackets, fins, etc.), shown as heat exchangers 712 that place one or more components in thermal communication with the coolant circuit 710. One heat exchanger 712 may be coupled to multiple components. Alternatively, each component may be coupled to a separate heat exchanger 712.

As shown, the heat exchangers 712 are coupled to the batteries 60, the drive motors 62, and one or more power conditioners or power converters, shown as inverters 714. The inverters 714 may be electrically coupled to the batteries 60 and the drive motors 62. The inverters 714 may convert direct current (DC) electrical energy from the batteries 60 to alternating current (AC) electrical energy and provide the AC electrical energy to the drive motors 62. Additionally or alternatively, the inverters 714 may convert AC electrical energy from the drive motors 62 to DC electrical energy and provide the DC electrical energy for storage in the batteries 60. The heat exchangers 712 may thermally couple to the batteries 60, the drive motors 62 and/or the inverters 714 to remove thermal energy generated during operation (e.g., due to resistance). In other embodiments, the heat exchangers 712 are coupled to other components of the vehicle 10. By way of example, the heat exchangers 712 may be coupled to pumps, compressors, actuators, or other components of the vehicle 10 that generate thermal energy during operation.

The heat exchangers 712 are fluidly coupled to a driver or actuator, shown as coolant pump 720. The coolant pump 720 is configured to receive coolant at a low pressure and provide a flow of fluid at an elevated pressure. As shown, an inlet of the coolant pump 720 is fluidly coupled to the heat exchangers 712, such that the coolant pump 720 is downstream of the heat exchangers 712. In other embodiments, the coolant pump 720 is positioned upstream of the heat exchangers 712.

The coolant pump 720 is fluidly coupled to a heat dissipater, radiator core, or heat exchanger, shown as radiator 722. The radiator 722 is fluidly coupled to the heat exchangers 712, forming a closed loop for coolant flow. In operation, the coolant pump 720 initiates a flow of coolant, which causes the coolant to flow through the heat exchangers 712. The heat exchangers 712 transfer thermal energy from the batteries 60, the drive motors 62, and/or the inverters 714 to the coolant. The coolant is received by the radiator 722, which transfers thermal energy from the coolant into the surrounding atmosphere.

In some embodiments, the coolant circuit 710 further includes one or more air movers, coolers, or blowers, shown as fans 724. The fans 724 are coupled to the radiator 722. The fans 724 may be positioned to direct air from the surrounding atmosphere through the radiator 722 (e.g., across fins of the radiator 722). The fans 724 may improve the cooling performance of the coolant circuit 710 by increasing the heat transfer from the radiator 722 to the surrounding atmosphere.

Referring to FIG. 15, the thermal management system 700 further includes a refrigeration circuit or air conditioning circuit, shown as air conditioning circuit 730. The air conditioning circuit 730 is configured to transfer thermal energy from the cab interior 42 to the surrounding atmosphere, decreasing or maintaining a temperature of air within the cab 40 to improve operator comfort. Operation of the air conditioning circuit 730 may be controlled by an operator (e.g., through a user interface that provides commands to a controller that controls the air conditioning circuit 730).

The air conditioning circuit 730 includes a heat exchanger or radiator core, shown as evaporator 732. The evaporator 732 is in fluid communication with the cab interior 42 such that air passes through the evaporator 732 and into the cab interior 42. In some embodiments, the evaporator 732 is positioned within the cab interior 42.

In some embodiments, the air conditioning circuit 730 includes one or more air movers or blowers, shown as fans 734. The fans 734 are coupled to the evaporator 732. The fans 734 may be positioned to direct air from the cab interior 42 and/or from the surrounding atmosphere through the evaporator 732 (e.g., across fins of the evaporator 732). The fans 734 may improve the cooling performance of the air conditioning circuit 730 by increasing the heat transfer from the air that passes through the evaporator 732 to the evaporator 732.

An outlet of the evaporator 732 is fluidly coupled to a compressor 736. The compressor 736 is configured to receive refrigerant at a low pressure and provide a flow of the refrigerant at an elevated pressure. An outlet of the compressor 736 is fluidly coupled to a heat dissipater, radiator core, or heat exchanger, shown as condenser 740. An outlet of the condenser 740 is fluidly coupled to an expansion valve or throttling valve, shown as expansion valve 742. The outlet of the expansion valve 742 is fluidly coupled to the inlet of the evaporator 732, forming a closed loop.

In some embodiments, the air conditioning circuit 730 includes one or more air movers or blowers, shown as fans 744. The fans 744 are coupled to the condenser 740. The fans 744 may be positioned to direct air from the surrounding atmosphere through the condenser 740 (e.g., across fins of the condenser 740). The fans 744 may improve the cooling performance of the air conditioning circuit 730 by increasing the heat transfer from the condenser 740 to the surrounding atmosphere.

In operation, the compressor 736 initiates a flow of compressed refrigerant, which flows into the condenser 740. The condenser 740 transfers thermal energy from the refrigerant into the surrounding atmosphere. The cooled refrigerant passes through the expansion valve 742, which expands the refrigerant, further cooling the refrigerant. The cooled refrigerant passes through the evaporator 732, where thermal energy from the cab interior 42 is transferred to the refrigerant. The heated refrigerant then returns to the compressor 736.

In some embodiments, the vehicle 10 includes a hydraulic system. By way of example, the vehicle 10 may include a pump that provides hydraulic fluid to one or more hydraulic actuators (e.g., hydraulic motors, hydraulic cylinders, etc.). Hydraulic fluid (e.g., oil) may increase in temperature throughout operation of the hydraulic system. In some embodiments, the thermal management system 700 includes a hydraulic fluid radiator or heat exchanger (e.g., similar to the radiator 722), through which the hydraulic fluid flows. The hydraulic fluid radiator may transfer heat from the hydraulic fluid to the surrounding atmosphere.

A. Configuration 1

Figure 16:
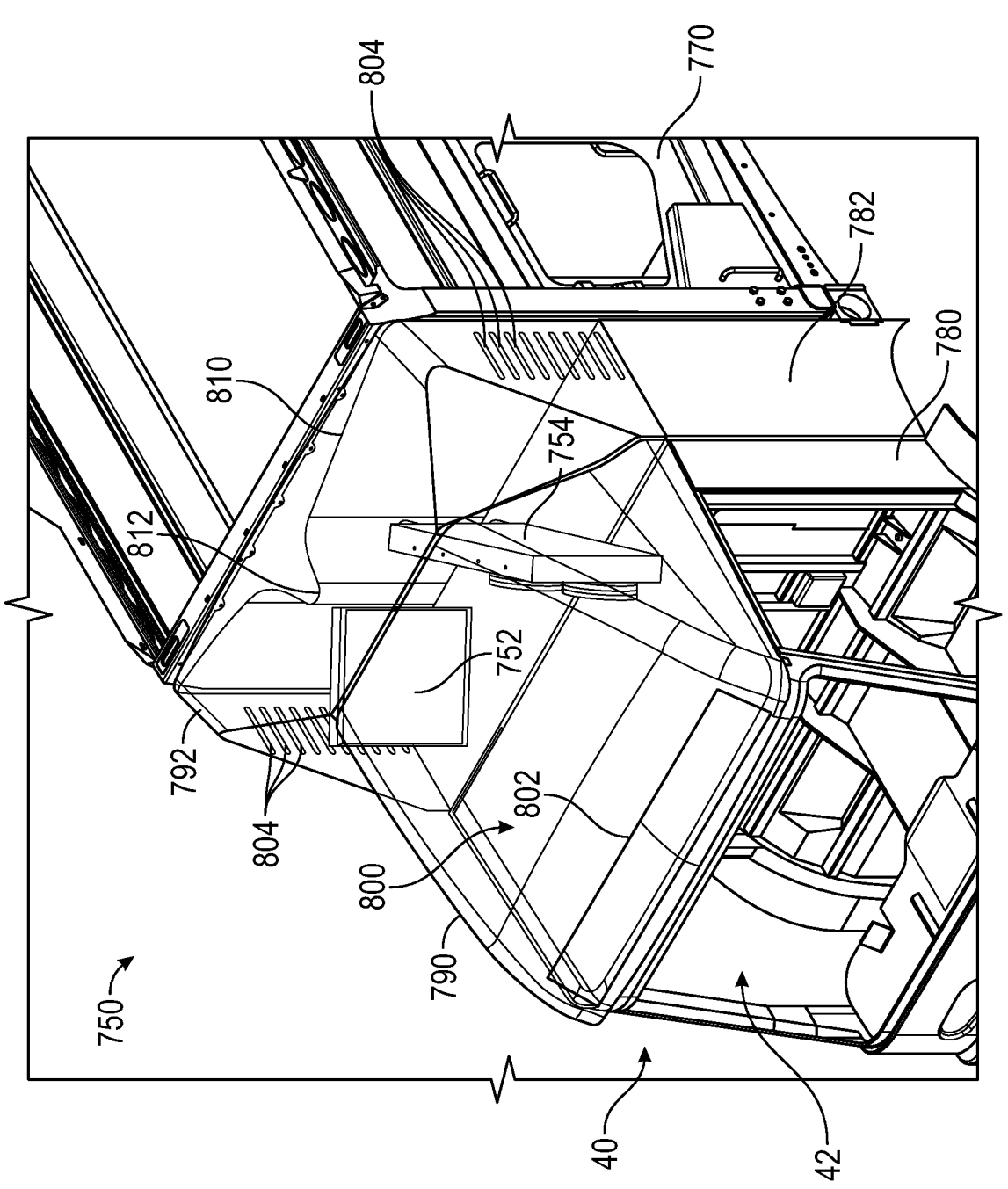
FIGS. 16-19 are various views of a configuration of the vehicle of FIG. 1, according to another exemplary embodiment.
Figure 17:
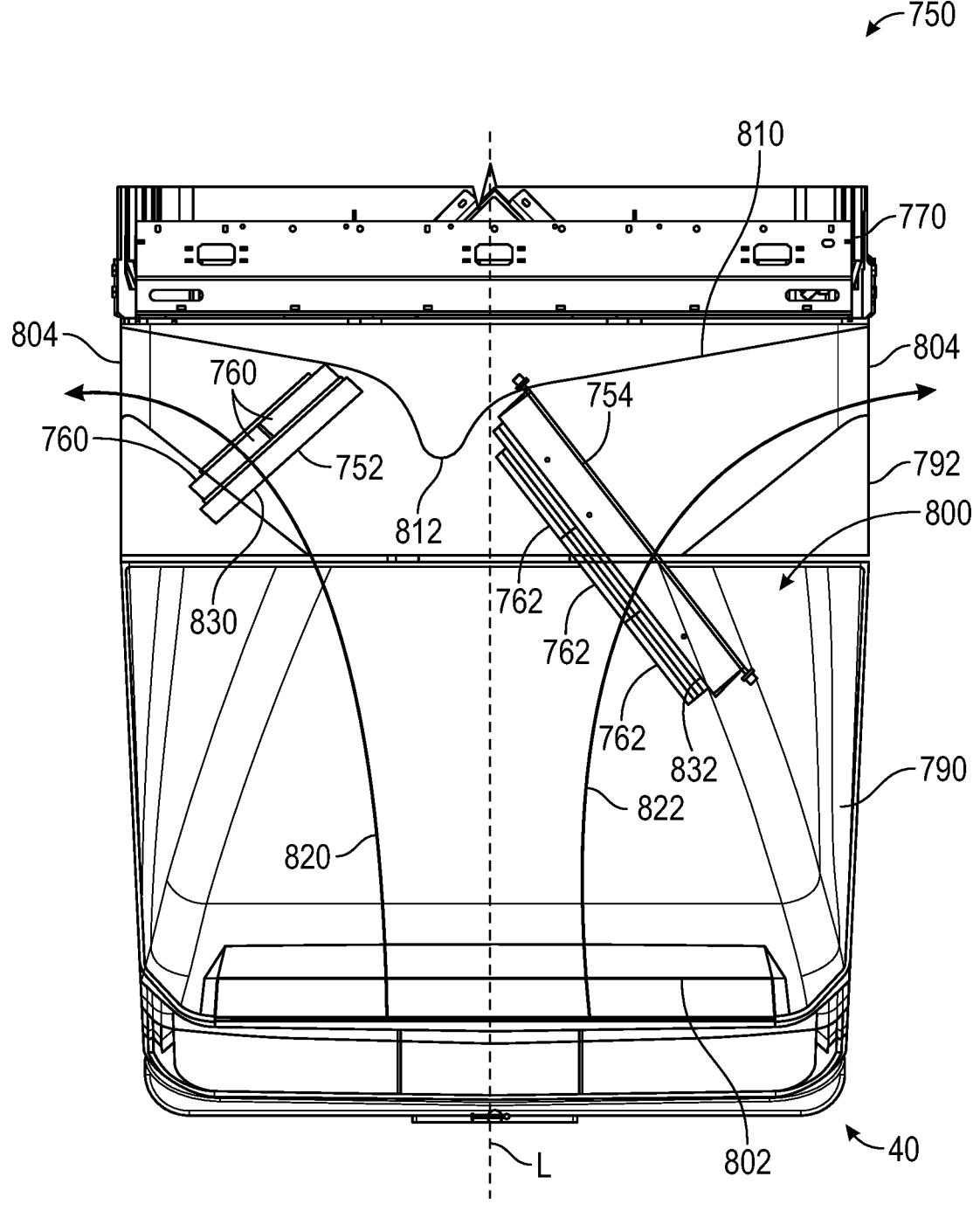

Referring to FIGS. 16 and 17, a vehicle 750 is shown as an exemplary configuration of the vehicle 10. Accordingly, any description with respect to the vehicle 10 may apply to the vehicle 750, except as otherwise specified. The vehicle 750 may be configured with any of the application kits 80 described herein.

The thermal management system 700 of the vehicle 750 includes a pair of radiator cores or heat exchangers, shown as core 752 and core 754. The cores 752 and 754 may transfer thermal energy from any component or system of the vehicle 750 to the surrounding atmosphere. By way of example, the core 752 and/or the core 754 may act as the radiator 722. By way of another example, the core 752 and/or the core 754 may act as the condenser 740. By way of another example, the core 752 and/or the core 754 may act as a hydraulic fluid radiator that cools hydraulic fluid.

As shown, the thermal management system 700 of the vehicle 750 includes a series of air movers or blowers, shown as fans 760 and fans 762. The fans 760 are coupled to the core 752 and configured to direct air through the core 752 (e.g., across fins of the core 752). The fans 762 are coupled to the core 754 and configured to direct air through the core 754 (e.g., across fins of the core 754. The fans 760 and the fans 762 may be in a push configuration (e.g., such that air flows first through the fans and then into the corresponding core) and/or in a pull configuration (e.g., such that air flows first through the corresponding core and then into the fans). The fans 760 and/or the fans 762 may include the fans 724 and/or the fans 744.

As shown in FIGS. 16-19, the application kit 80 of the vehicle 750 includes a container or structure, shown as body 770, positioned rearward of the cab 40. As shown, the body 770 is substantially rectangular (e.g., a rectangular prism). As shown, the body 770 extends above (e.g., is taller than) the cab 40. The body 770 may be a portion of any of the application kits 80 described herein. By way of example, the body 770 may act as the refuse compartment 130 of the refuse vehicle 100. By way of another example, the body 770 may act as the compartments 302 of the ARFF truck 300.

Figure 18:
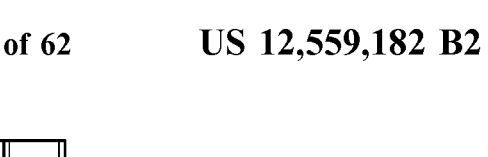
Figure 19:
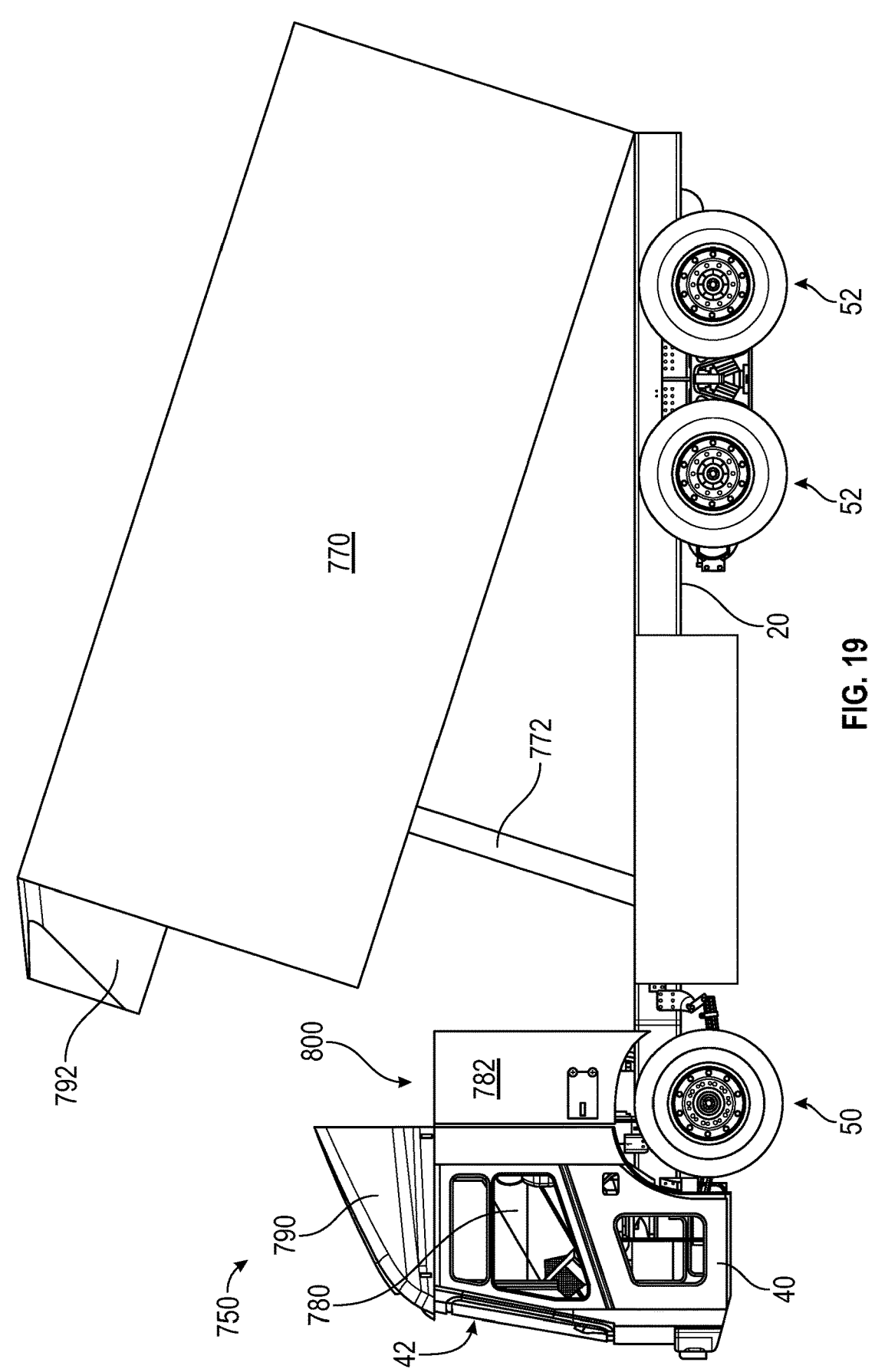

In some embodiments, the body 770 is capable of moving relative to the chassis 20 and the cab 40. In some such embodiments, the body 770 can be raised and lowered relative to the chassis 20 between a lowered or operating position (e.g., as shown in FIG. 18) and an elevated position (e.g., as shown in FIG. 19). In the embodiment shown in FIGS. 18 and 19, the body 770 is rotatably coupled to the chassis 20 near the rear end of the chassis 20, and the body 770 rotates about a lateral axis (i.e., a horizontal axis) such that the front end of the body 770 raises and lowers. In other embodiments, the entire body 770 raises and lowers. In some embodiments, the vehicle 750 includes an actuator (e.g., a hydraulic cylinder, an electric linear actuator, a pneumatic cylinder, etc.), shown as body actuator 772, that is coupled to the chassis 20 and the body 770. The body actuator 772 is configured to selectively move the body 770 between the raised position and the lowered position.

The cab 40 includes a first portion (e.g., an operator portion), shown as front portion 780, and a second portion (e.g., a storage portion), shown as rear portion 782, each coupled to the chassis 20. The front portion 780 defines the cab interior 42 and is configured to contain one or more operators. The rear portion 782 is positioned between the front portion 780 and the body 770. In some embodiments, the rear portion 782 defines one or more storage spaces that contain components of the vehicle 750 (e.g., pumps, batteries, plumbing, etc.) and/or provide storage for items placed by an operator (e.g., clothing, equipment, etc.). The rear portion 782 may include one or more doors that facilitate accessing the storage spaces. In some embodiments, as shown in FIG. 19, the front portion 780 and the rear portion 782 are fixedly coupled to the chassis 20 (e.g., the front portion 780 and the rear portion 782 remain stationary when the body 770 is raised). In other embodiments, the rear portion 782 is fixedly coupled to the body 770 (e.g., the rear portion 782 moves with the body 770 when the body 770 is raised).

The vehicle 750 further includes a pair of covers, guards, diverters, cowls, or flow control members, shown as front shroud 790 (e.g., a front cowl portion, a front shroud portion) and rear shroud 792 (e.g., a rear cowl portion, a rear shroud portion). The front shroud 790 is positioned directly above the front portion 780 of the cab 40 and coupled to the front portion 780. The rear shroud 792 is positioned directly above the rear portion 782 of the cab 40 and coupled to the body 770. The rear shroud 792 is positioned between the front shroud 790 and the body 770. Together, the front shroud 790 and the rear shroud 792 define a top surface of the vehicle 750 that slopes gradually from the front surface of the cab 40 to the top surface of the body 770. This gradual transition may reduce the drag on the vehicle 750 when the vehicle 750 travels in a forward direction.

Referring again to FIGS. 16 and 17, space or volume (e.g., an air volume, a plenum, a radiator volume, etc.), shown as radiator volume 800, is defined between a top surface of the cab 40, a front surface of the body 770, a bottom surface of the front shroud 790, and a bottom surface of the rear shroud 792. The radiator volume 800 contains the core 752, the fans 760, the core 754, and the fans 760. In FIGS. 16 and 17, the front shroud 790 and the rear shroud 792 are illustrated as being transparent for ease of viewing components within the radiator volume 800. However, it should be understood that these components may be opaque. Accordingly, the cores 752 and 754 and the fans 760 and 762 are positioned above the cab 40 and out of the way of the operators during normal use of the vehicle 750. The cores 752 and 754 and the fans 760 and 762 are protected from rain and falling debris (e.g., acorns, hail, rocks, refuse, etc.) by the front shroud 790 and the rear shroud 792. The cores 752 and 754 may be coupled to the cab 40.

The cores 752 and 754 are positioned within the radiator volume 800 to facilitate airflow through the cores 752 and 754, maximizing cooling performance of the cores 752 and 754. The front shroud 790 defines a first aperture or front aperture, shown as inlet 802. The inlet 802 is positioned near the front of the front shroud 790 such that air is forced through the inlet 802 when the vehicle 750 travels in a forward direction. The inlet 802 may be approximately centered about a longitudinal centerline L of the cab 40. The rear shroud 792 defines a series of second apertures or rear apertures, shown as outlets 804. The outlets 804 may be positioned along the lateral sides of the rear shroud 792. Air that flows into the radiator volume 800 through the inlet 802 subsequently exits the radiator volume 800 through the outlets 804.

To control the airflow through the radiator volume 800, the vehicle 750 includes a baffle, flow separator, or flow divider, shown as flow diverter 810, that facilitates airflow through the cores 752 and 754 and the outlets 804. The flow diverter 810 may be coupled to the cab 40 and/or to the body 770. As viewed from above (e.g., as in FIG. 17), the flow diverter 810 includes a middle portion, protrusion, or thickest portion, shown as frontmost portion 812. The frontmost portion 812 is the closest portion to the front of the vehicle 750, and the flow diverter 810 gradually retreats rearward from the frontmost portion 812 as the flow diverter 810 extends laterally outward. The shape of the flow diverter 810 splits the airflow into a first portion that moves toward the outlets 804 on the left side of the vehicle 750 and a second portion that moves toward the outlets 804 on the right side of the vehicle 750.

In the embodiment shown in FIG. 17, the core 754 is wider than the core 752. The frontmost portion 812 is offset from the longitudinal centerline L toward the core 752. This positioning of the frontmost portion 812 ensures that a larger portion of the airflow is directed toward the core 754 than to the core 752, taking advantage of the larger size of the core 754. The lateral position of the frontmost portion 812 may vary depending upon the relative sizes of the core 752 and the core 754.

In operation, airflow through the radiator volume 800 generally follows two paths, illustrated in FIG. 17 as path 820 and path 822. A first portion of the airflow moves along the path 820. Specifically, the first portion enters the inlet 802, is diverted by the flow diverter 810, passes through the core 752 and the fans 760, and exits through the outlets 804 on the passenger or curb side of the vehicle 750. A second portion of the airflow moves along the path 822. Specifically, the second portion enters the inlet 802, is diverted by the flow diverter 810, passes through the fans 760 and the core 754, and exits through the outlets 804 on the driver or street side of the vehicle 750. In some embodiments, the core 752 and the core 754 are arranged to be substantially perpendicular to the path 820 and the path 822, respectively.

As shown in FIGS. 16 and 17, the front face of the core 752 (e.g., the face through which the airflow enters) is positioned within a plane 830. The plane 830 is substantially vertical. The plane 830 is angularly offset from the longitudinal centerline L by an angle between 0 and 90 degrees. In some embodiments, the angle between the plane 830 and the longitudinal centerline L is approximately 45 degrees. The plane 830 is angularly offset from the longitudinal centerline L by an angle between 0 and 90 degrees. In some embodiments, the angle between the plane 830 and the longitudinal centerline L is approximately 30 degrees. The front face of the core 754 (e.g., the face through which the airflow enters) is positioned within a plane 832. The plane 832 is substantially vertical. In some embodiments, the angle between the plane 832 and the longitudinal centerline L is approximately 45 degrees. The plane 832 is angularly offset from the longitudinal centerline L by an angle between 0 and 90 degrees. In some embodiments, the angle between the plane 832 and the longitudinal centerline L is approximately 30 degrees. The core 752 and the core 754 are angularly offset from the longitudinal centerline L in opposing directions.

After operation, it may be advantageous to access the radiator volume 800 to clean and/or otherwise maintain the core 752 and the core 754. In some embodiments, the front shroud 790 is removably coupled to the front portion 780 of the cab 40. Accordingly, the front shroud 790 may be removed to facilitate access to the radiator volume 800. In some embodiments, the rear shroud 792 is coupled to the body 770. Accordingly, the body 770 may be raised to lift the rear shroud 792 and facilitate access to the radiator volume 800 (e.g., as shown in FIGS. 18 and 19).

B. Configuration 2

Figure 20:
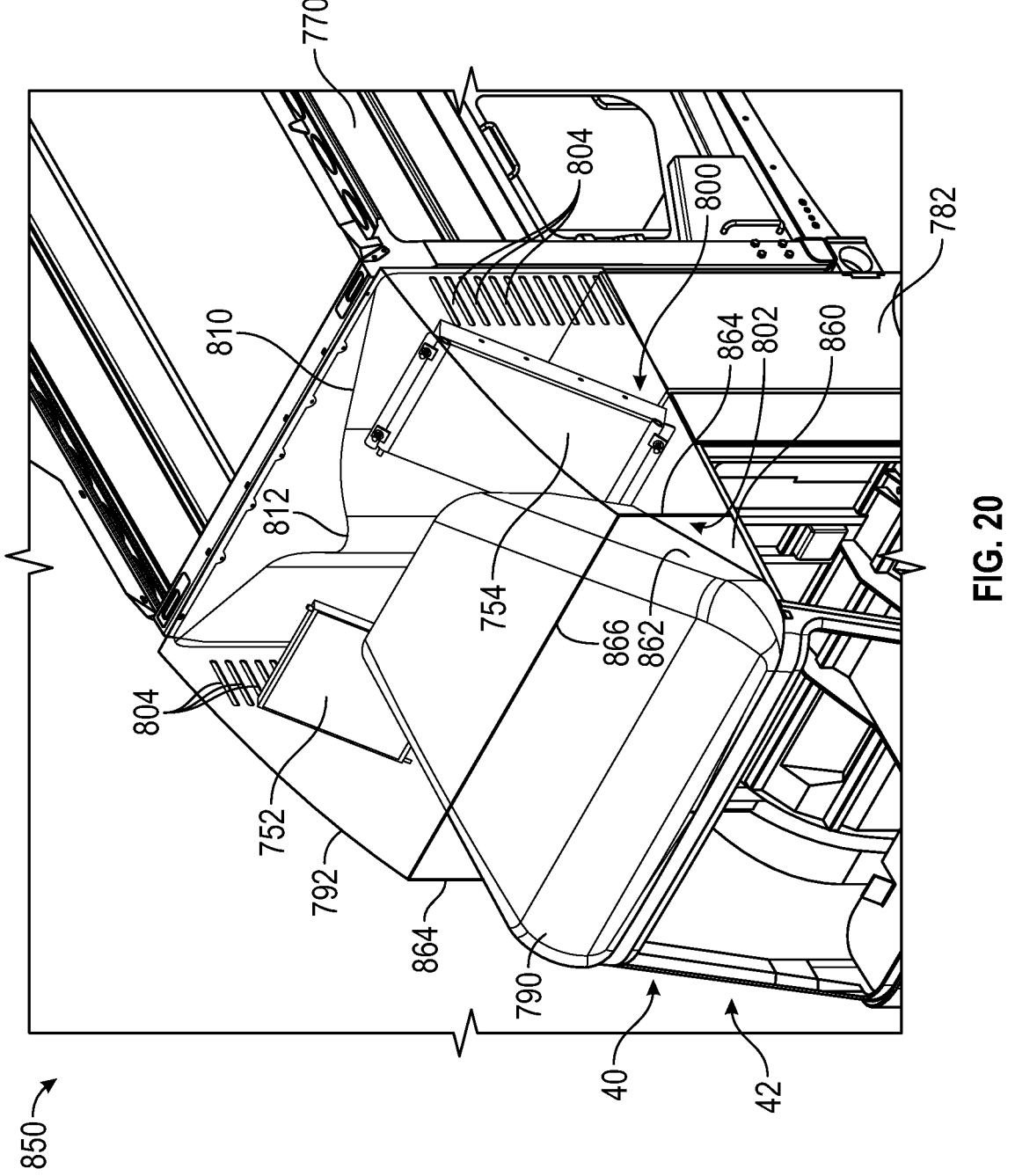
FIGS. 20 and 21 are various views of a configuration of the vehicle of FIG. 1, according to another exemplary embodiment.
Figure 21:
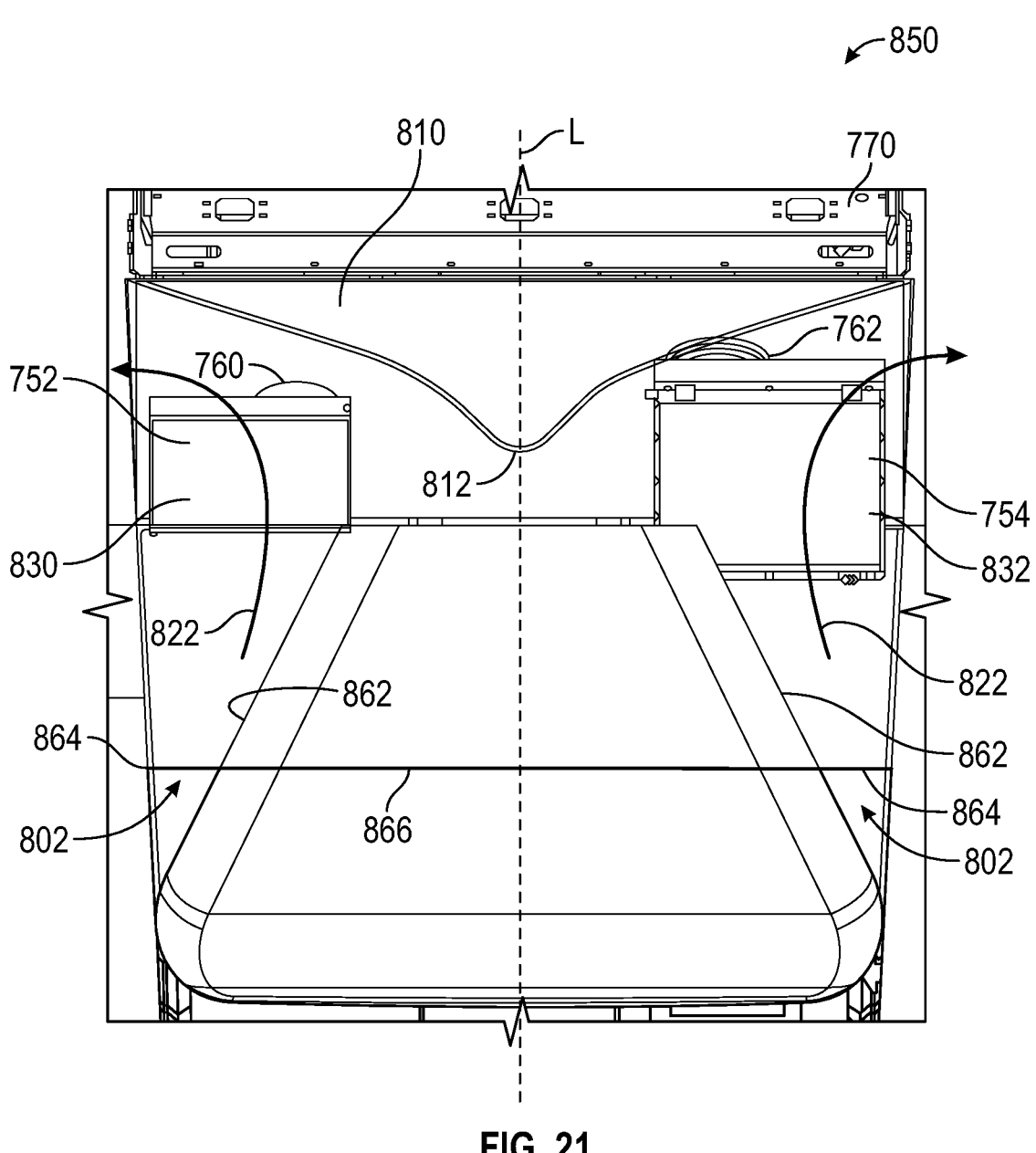

Referring to FIGS. 20 and 21, a vehicle 850 is shown as an alternative configuration of the vehicle 10. The vehicle 850 may be substantially similar to the vehicle 750, except as otherwise specified. The vehicle 850 may be configured with any of the application kits 80 described herein. In FIGS. 20 and 21, the rear shroud 792 is illustrated as being transparent for ease of viewing components within the radiator volume 800. However, it should be understood that this component may be opaque.

In the embodiment shown in FIGS. 20 and 21, the inlet 802 at the front end of the front shroud 790 is omitted (e.g., the front end of the front shroud 790 is solid). Instead, the front end of the front shroud 790 overlaps the rear end of the rear shroud 792, defining a pair of inlets 802. Specifically, each inlet 802 is defined between a top surface 860 of the cab 40, a lateral side surface 862 of the front shroud 790, a vertical, side edge 864 of the rear shroud 792, and a horizontal, top edge 866 of the rear shroud 792. The lateral side surfaces 862 move toward the longitudinal centerline L as the lateral side surfaces 862 extend rearward. Accordingly, the pathway defined for the airflow gradually widens as the pathway moves rearward.

In operation, airflow through the radiator volume 800 generally follows the paths 820 and 822. As shown in FIG. 21, the path 820 enters the inlet 802 on the right side of the vehicle 850, extends through the core 752 and the fans 760, is diverted by the flow diverter 810, and exits through the outlets 804 on the right side of the vehicle 850. The path 822 enters the inlet 802 on the left side of the vehicle 850, passes through the core 754 and the fans 762, is diverted by the flow diverter 810, and exits through the outlets 804 on the left (e.g., street or driver) side of the vehicle 850. In the vehicle 850, the frontmost portion 812 of the flow diverter 810 is located at or near the longitudinal centerline L.

As shown in FIGS. 20 and 21, the core 752 and the core 754 each extend from the top surface 860 of the cab 40 to a bottom surface of the rear shroud 792. The plane 830 and the plane 832 are each substantially parallel to a lateral axis. The plane 830 and the plane 832 are each angled relative to a horizontal plane. Specifically, the plane 830 and the plane 832 each extend upward as the plane 830 and the plane 832 extend rearward. The plane 830 and the plane 832 are each angularly offset from the horizontal plane by an angle between 0 and 90 degrees. In some embodiments, the angles between the planes 830 and 832 and the horizontal plane are each approximately 45 degrees.

In some embodiments, the front shroud 790 is removably coupled to the front portion 780 of the cab 40. Accordingly, the front shroud 790 may be removed to facilitate access to the radiator volume 800. In some embodiments, the angled orientations of the lateral side surfaces 862 of the front shroud 790 facilitate access to the cores 752 and 754 without removing the front shroud 790. In some embodiments, the rear shroud 792 is coupled to the body 770. Accordingly, the body 770 may be raised to lift the rear shroud 792 and facilitate access to the radiator volume 800.

C. Configuration 3

Figure 22:
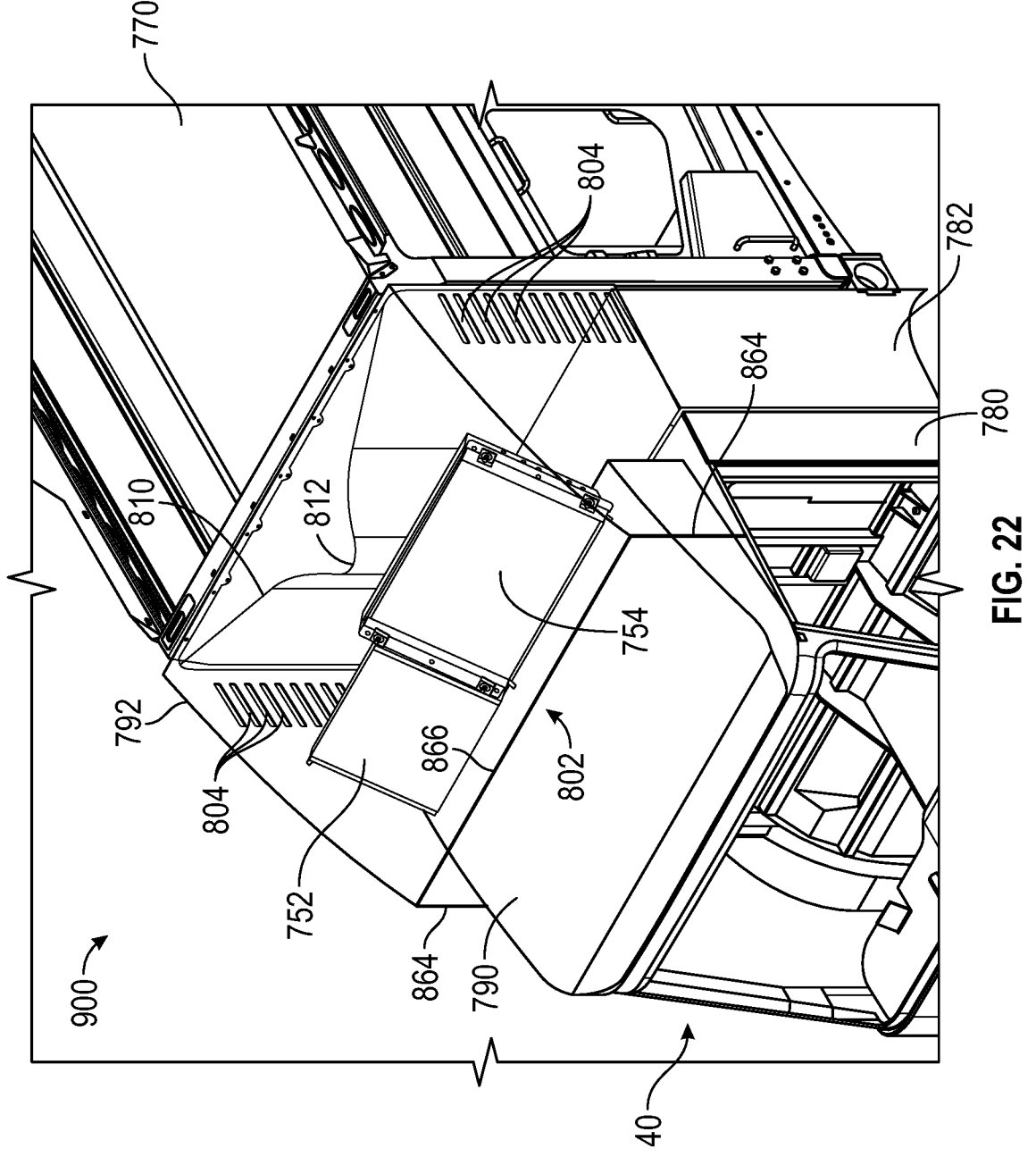
FIGS. 22 and 23 are various views of a configuration of the vehicle of FIG. 1, according to another exemplary embodiment.
Figure 23:
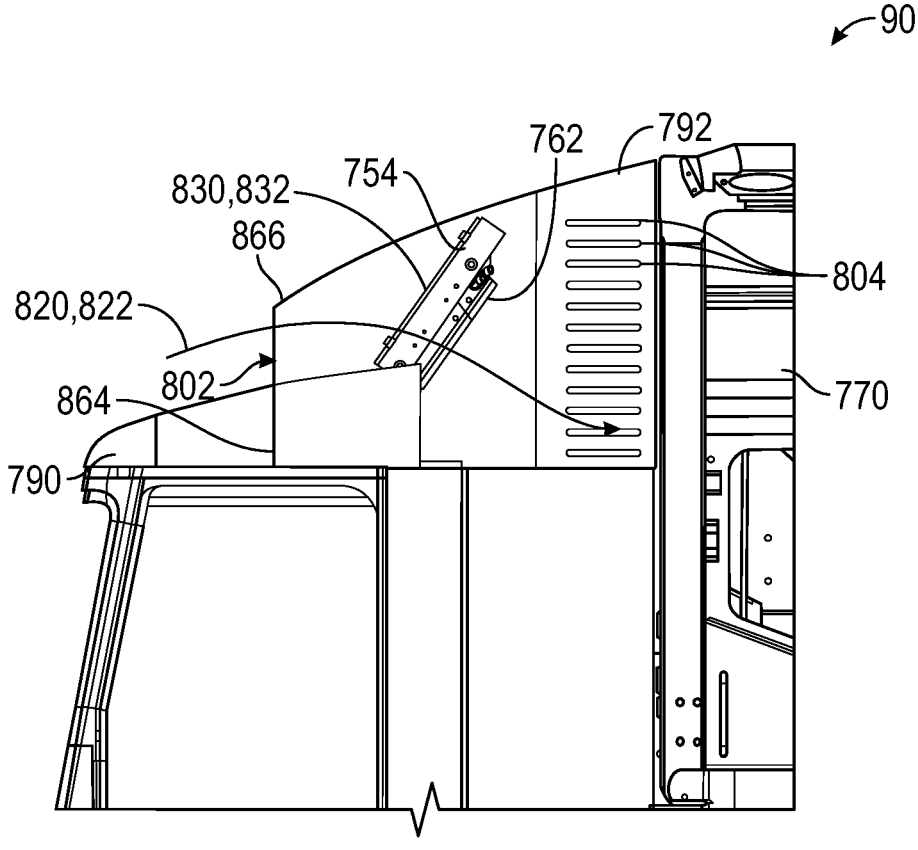

Referring to FIGS. 22 and 23, a vehicle 900 is shown as an alternative configuration of the vehicle 10. The vehicle 900 may be substantially similar to the vehicle 850, except as otherwise specified. The vehicle 900 may be configured with any of the application kits 80 described herein. In FIGS. 22 and 23, the rear shroud 792 is illustrated as being transparent for ease of viewing components within the radiator volume 800. However, it should be understood that this component may be opaque.

In the vehicle 900, the front end of the front shroud 790 overlaps the rear end of the rear shroud 792, defining a single inlet 802. Specifically, the inlet 802 is defined by the exterior surfaces of the front shroud 790, the side edges 864 of the rear shroud 792, and the top edge 866 of the rear shroud 792.

In operation, airflow through the radiator volume 800 generally follows the paths 820 and 822. The path 820 enters the inlet 802, extends through the core 752 and the fans 760, is diverted by the flow diverter 810, and exits through the outlets 804 on the passenger side of the vehicle 900. The path 822 enters the inlet 802, passes through the core 754 and the fans 762, is diverted by the flow diverter 810, and exits through the outlets 804 on the left (e.g., street or driver) side of the vehicle 900. In the vehicle 900, the frontmost portion 812 of the flow diverter 810 is located at or near the longitudinal centerline L.

As shown in FIGS. 22 and 23, the core 752 and the core 754 each extend from a top surface of the front shroud 790 to a bottom surface of the rear shroud 792. The plane 830 and the plane 832 are each substantially parallel to a lateral axis. The plane 830 and the plane 832 are each angled relative to a horizontal plane. Specifically, the plane 830 and the plane 832 each extend upward as the plane 830 and the plane 832 extend rearward. The plane 830 and the plane 832 are each angularly offset from the horizontal plane by an angle between 0 and 90 degrees. In some embodiments, the angles between the planes 830 and 832 and the horizontal plane are each approximately 60 degrees.

In some embodiments, the rear shroud 792 is coupled to the body 770. Accordingly, the body 770 may be raised to lift the rear shroud 792 and facilitate access to the radiator volume 800. Because the cores 752 and 754 are positioned above the front shroud 790, the cores 752 and 754 may be accessed without removing the front shroud 790.

D. Configuration 4

Figure 24:
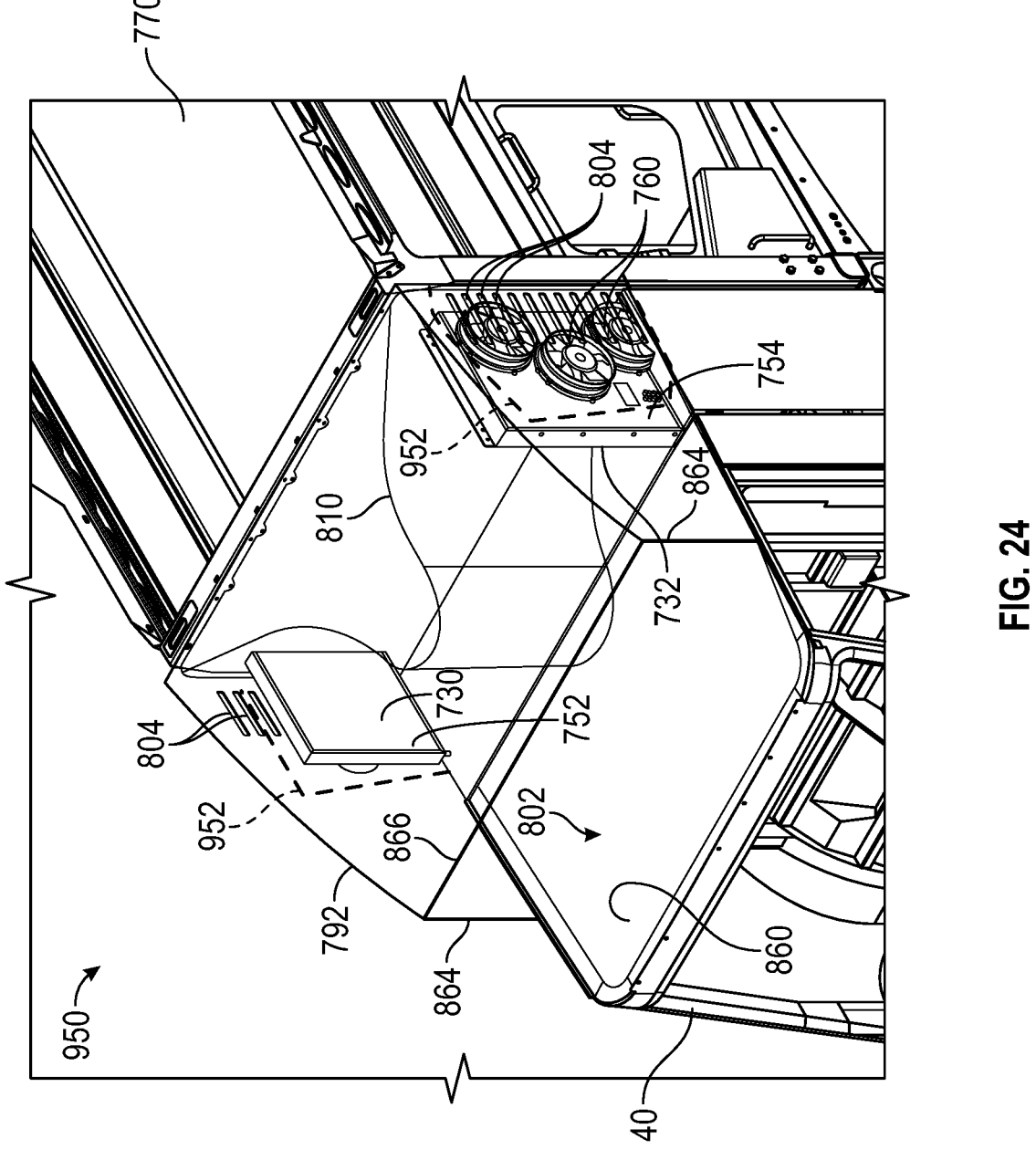
FIGS. 24 and 25 are various views of a configuration of the vehicle of FIG. 1, according to another exemplary embodiment.
Figure 25:
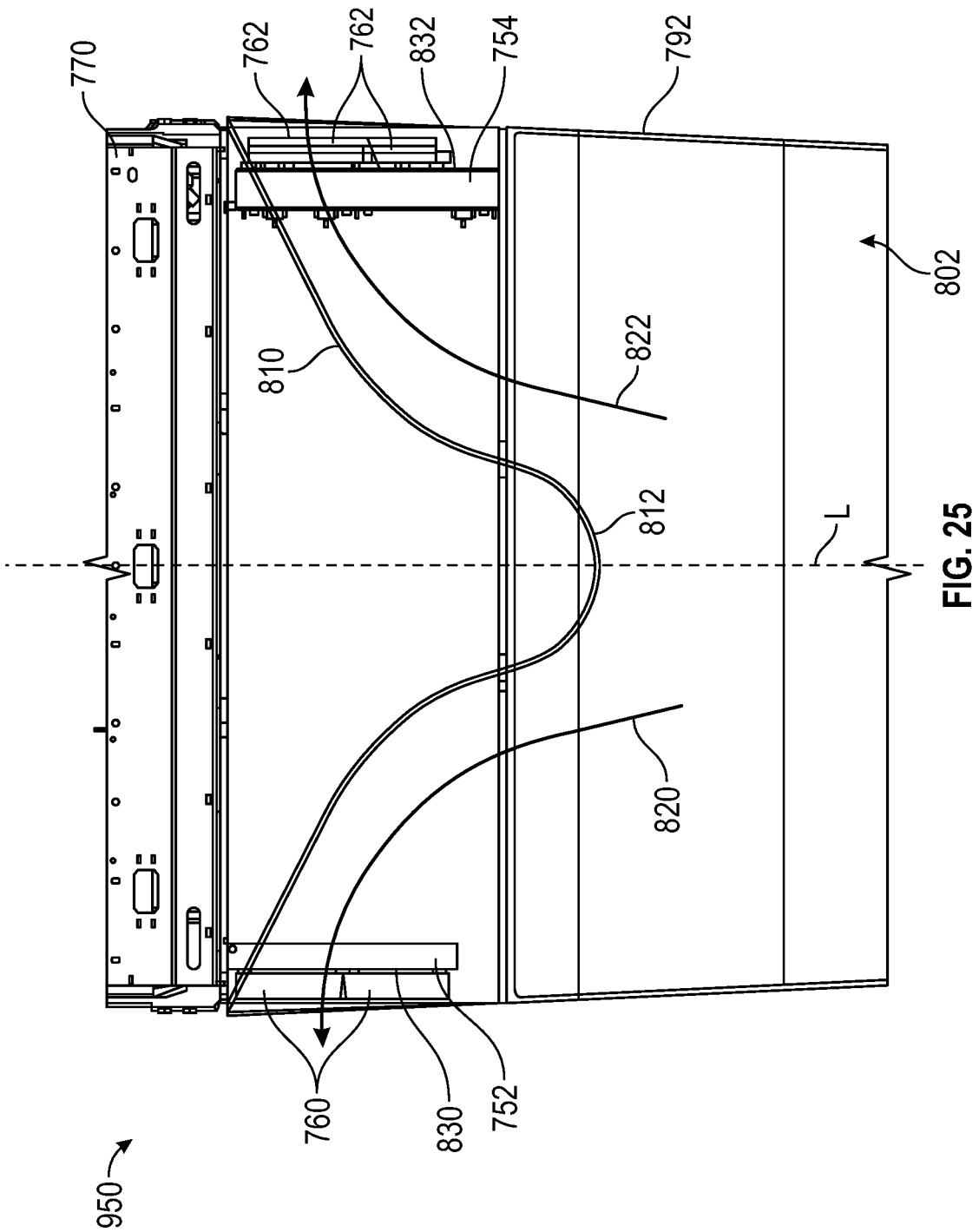

Referring to FIGS. 24 and 25, a vehicle 950 is shown as an alternative configuration of the vehicle 10. The vehicle 950 may be substantially similar to the vehicle 900, except as otherwise specified. The vehicle 950 may be configured with any of the application kits 80 described herein. In FIGS. 24 and 25, the rear shroud 792 is illustrated as being transparent for ease of viewing components within the radiator volume 800. However, it should be understood that this component may be opaque.

In the vehicle 950, the front shroud 790 is omitted. Instead, the inlet 802 is defined by the top surface 860 of the cab 40, the side edges 864 of the rear shroud 792, and the top edge 866 of the rear shroud 792. The radiator volume 800 is defined between the cab 40, the body 770, and the rear shroud 792.

In operation, airflow through the radiator volume 800 generally follows the paths 820 and 822. The path 820 enters the inlet 802, is diverted by the flow diverter 810, extends through the core 752 and the fans 760, and exits through the outlets 804 on the passenger side of the vehicle 950. The path 822 enters the inlet 802, is diverted by the flow diverter 810, passes through the core 754 and the fans 762, and exits through the outlets 804 on the driver side of the vehicle 950. In the vehicle 950, the frontmost portion 812 of the flow diverter 810 is located at or near the longitudinal centerline L.

As shown in FIGS. 24 and 25, the rear shroud 792 defines a pair of access panels, shown as doors 952. Each of the doors 952 is selectively repositionable between an open position, in which the door 952 permits access to the radiator volume 800 through an aperture defined by the rear shroud 792, and a closed position, in which the door 952 extends across the aperture to prevent access to the radiator volume 800. By way of example, the doors 952 may be hingedly coupled to the rear shroud 792 such that the doors 952 are rotatable about an axis. The doors 952 are positioned along the lateral sides of the rear shroud 792, near the body 770. The doors 952 define at least a portion of the outlets 804. The core 752 and the fans 760 are coupled to a first door 952.

The core 754 and the fans 762 are coupled to a second door 952. Accordingly, a user may simply open the doors 952 to access the cores 752 and 754 for cleaning.

The plane 830 and the plane 832 are each substantially parallel to a vertical axis and to a longitudinal axis. The plane 830 and the plane 832 are laterally offset from one another. In some embodiments, the plane 830 and the plane 832 are equidistant from the longitudinal center line L.

E. Configuration 5—Cowl Position and Thermal Management

Referring to FIGS. 26-28A and 29-43, a vehicle 1000 is shown as an alternative configuration of the vehicle 10. The vehicle 1000 may be substantially similar to the vehicle 750, except as otherwise specified. The vehicle 1000 may be configured with any of the application kits 80 described herein.

As shown, the vehicle 1000 includes a cowl assembly 1010 including a first cowl portion, shown as front shroud 790, and a second cowl portion, shown as rear shroud 792. The front shroud 790 is coupled to the cab 40 and positioned above the cab 40. The rear shroud 792 is coupled to the body 770 of the application kit (e.g., a refuse compartment 130 when the vehicle 1000 is configured as a refuse vehicle) and extends forward, toward the front shroud 790. A space, volume, or compartment, shown as storage compartment 1012, is defined between the body 770, the cab 40, the rear shroud 792, and the chassis 20. Specifically, the storage compartment 1012 is positioned below the rear shroud 792, above the chassis 20, forward of the body 770, and behind the cab 40. In some embodiments, the storage compartment 1012 occupies the same space as the rear portion 782 of the cab 40 shown in FIGS. 18 and 19.

Similar to the arrangement of FIGS. 18 and 19, the front shroud 790 and the rear shroud 792 of the cowl assembly 1010 are movable relative to one another. By way of example, when the body 770 is raised (e.g., by the body actuator 772), the rear shroud 792 is raised relative to the front shroud 790. Raising the rear shroud 792 in this way may facilitate access to components within the front shroud 790 (e.g., for cleaning or maintenance).

Figure 28A:
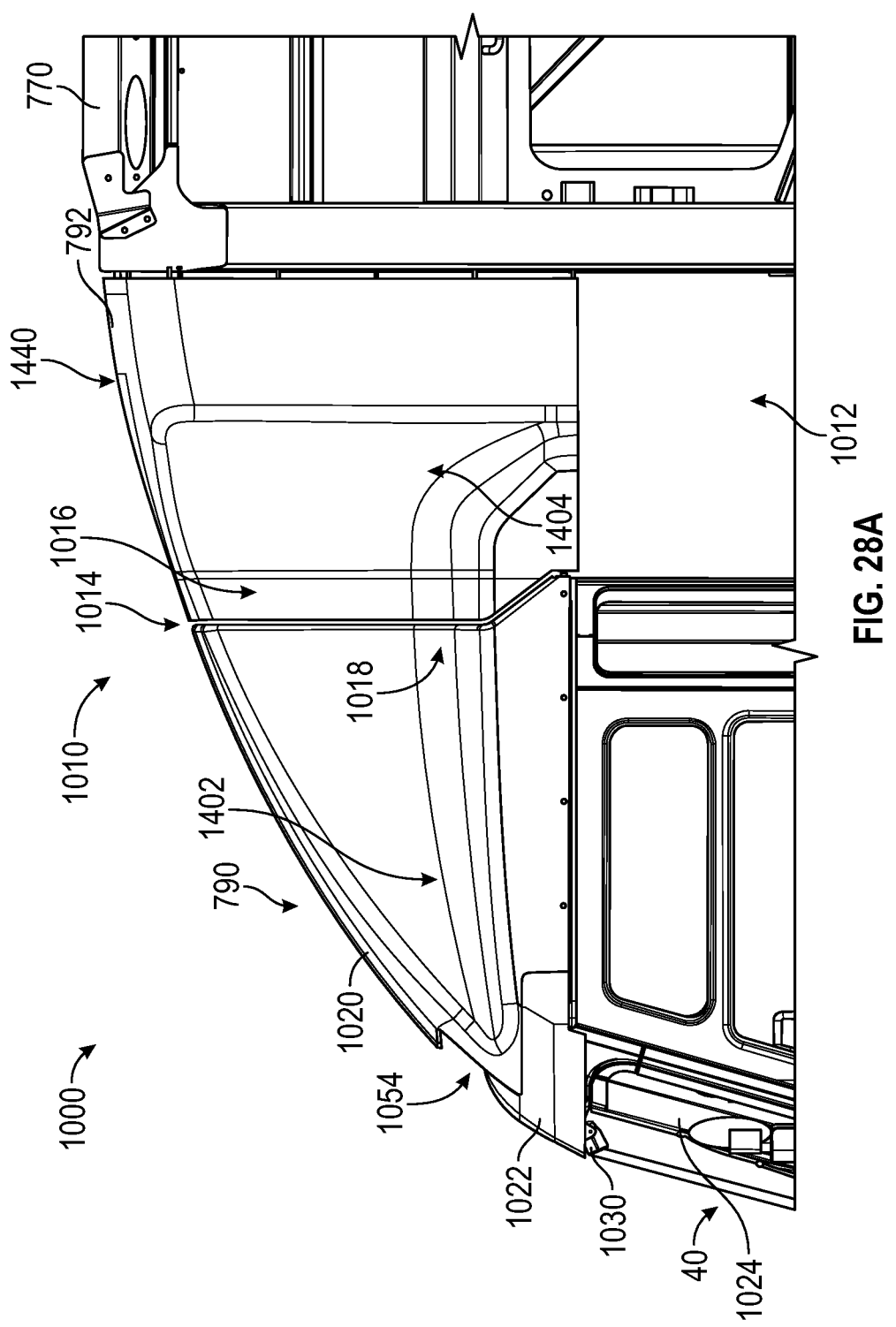
Figure 28B:
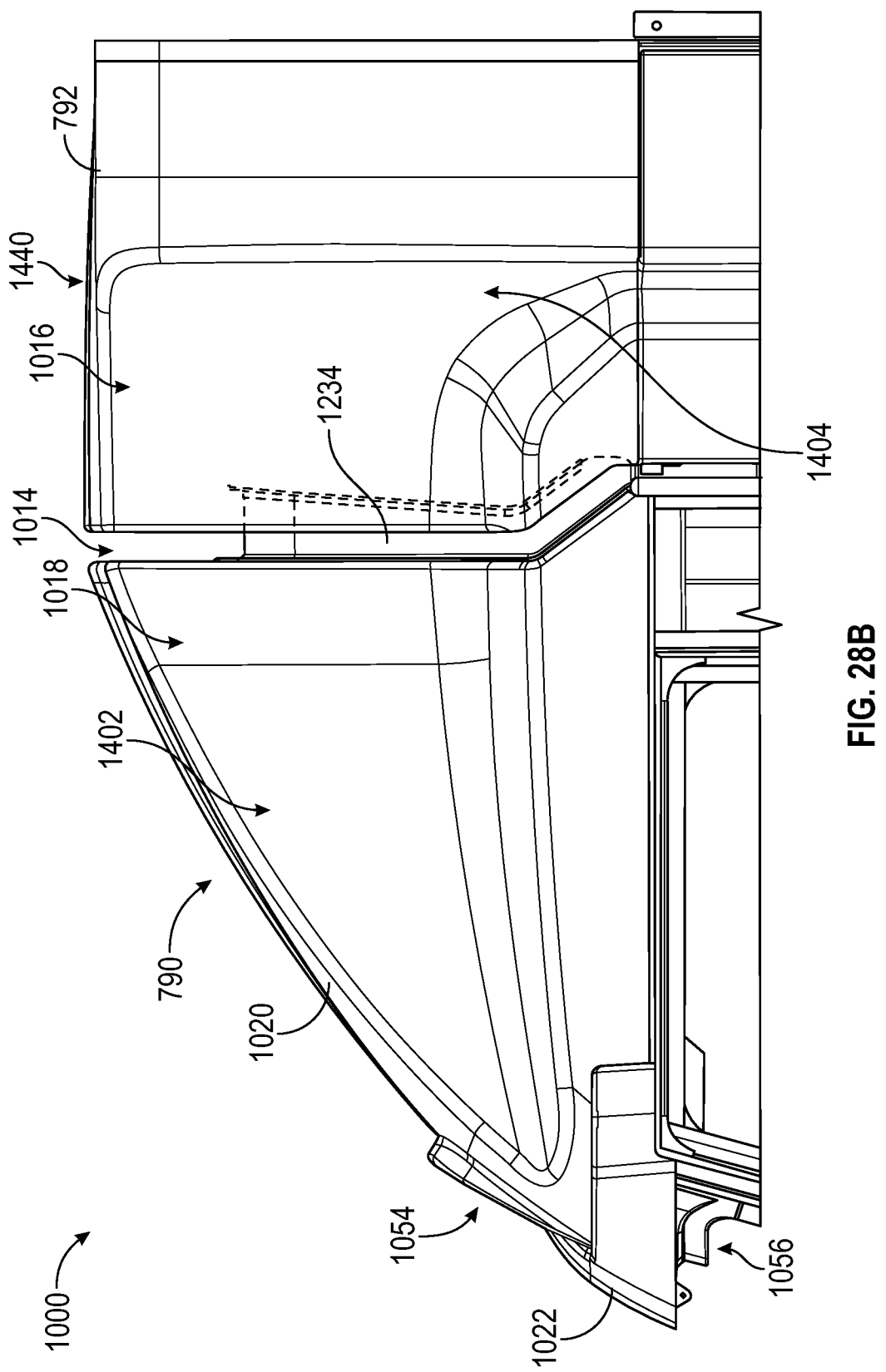
FIGS. 28B-28F are various views of the cowl assembly of FIG. 26 with an alternative drip channel assembly.
Figure 28C:
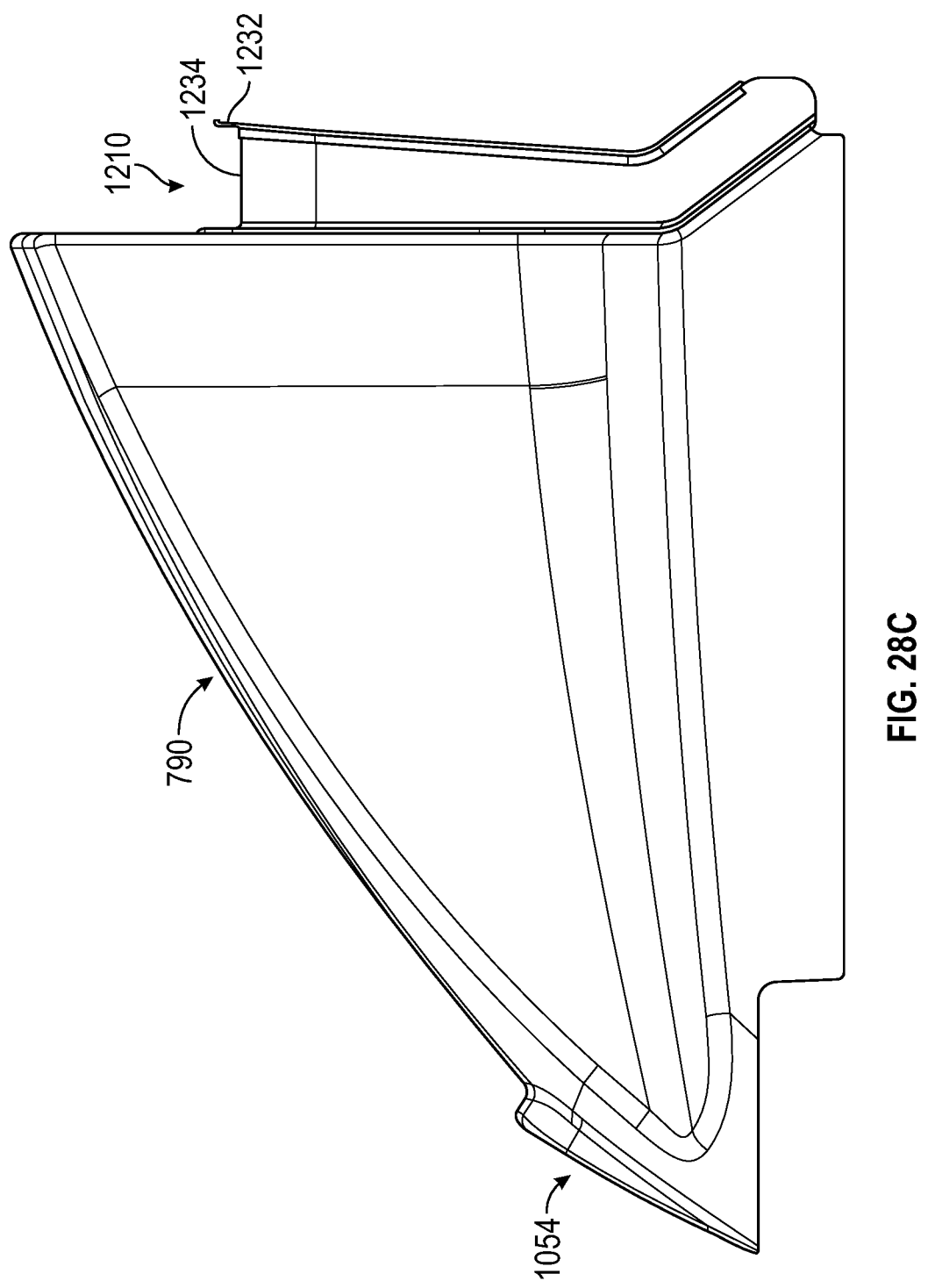
Figure 28D:
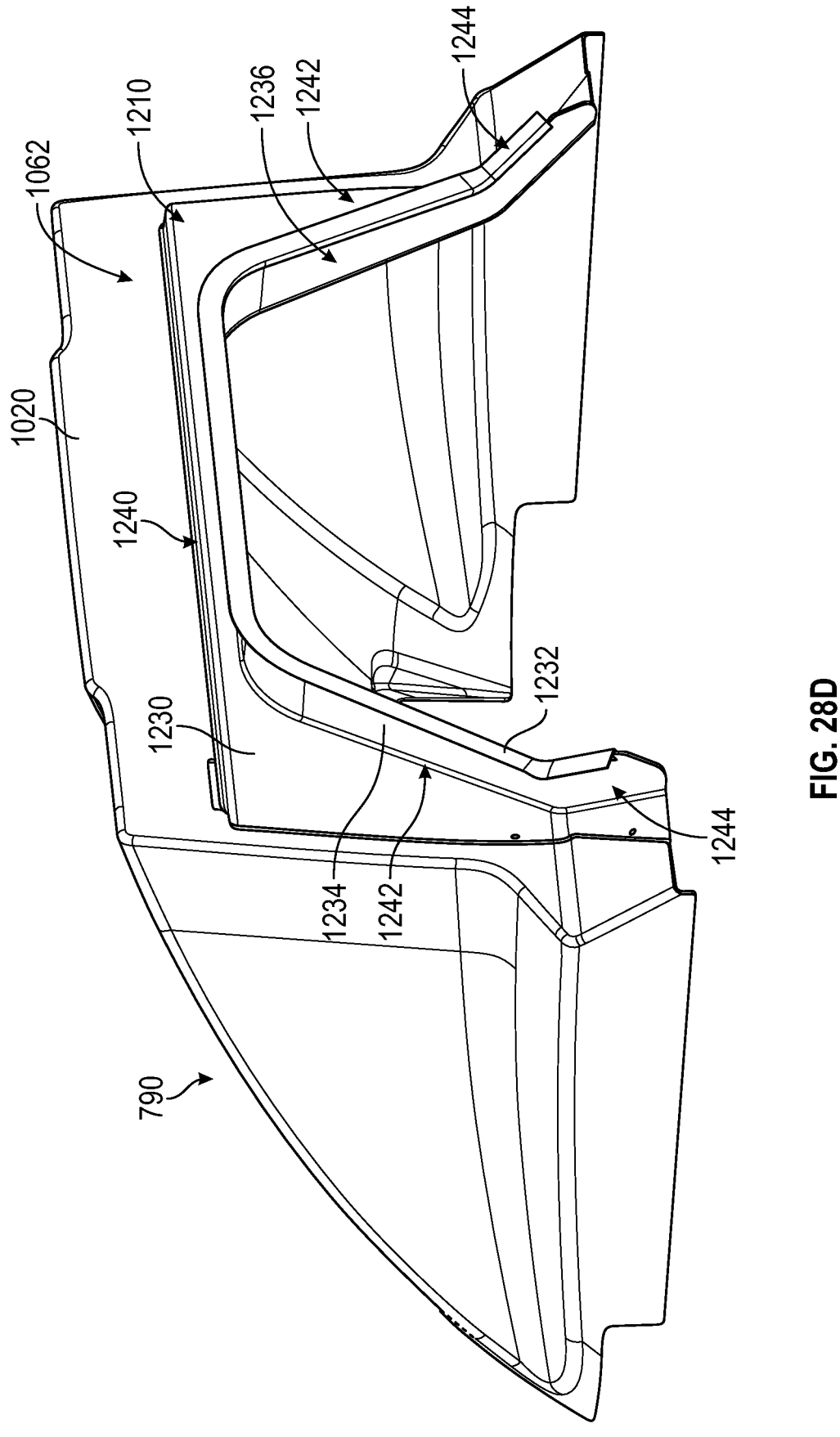
Figure 28E:
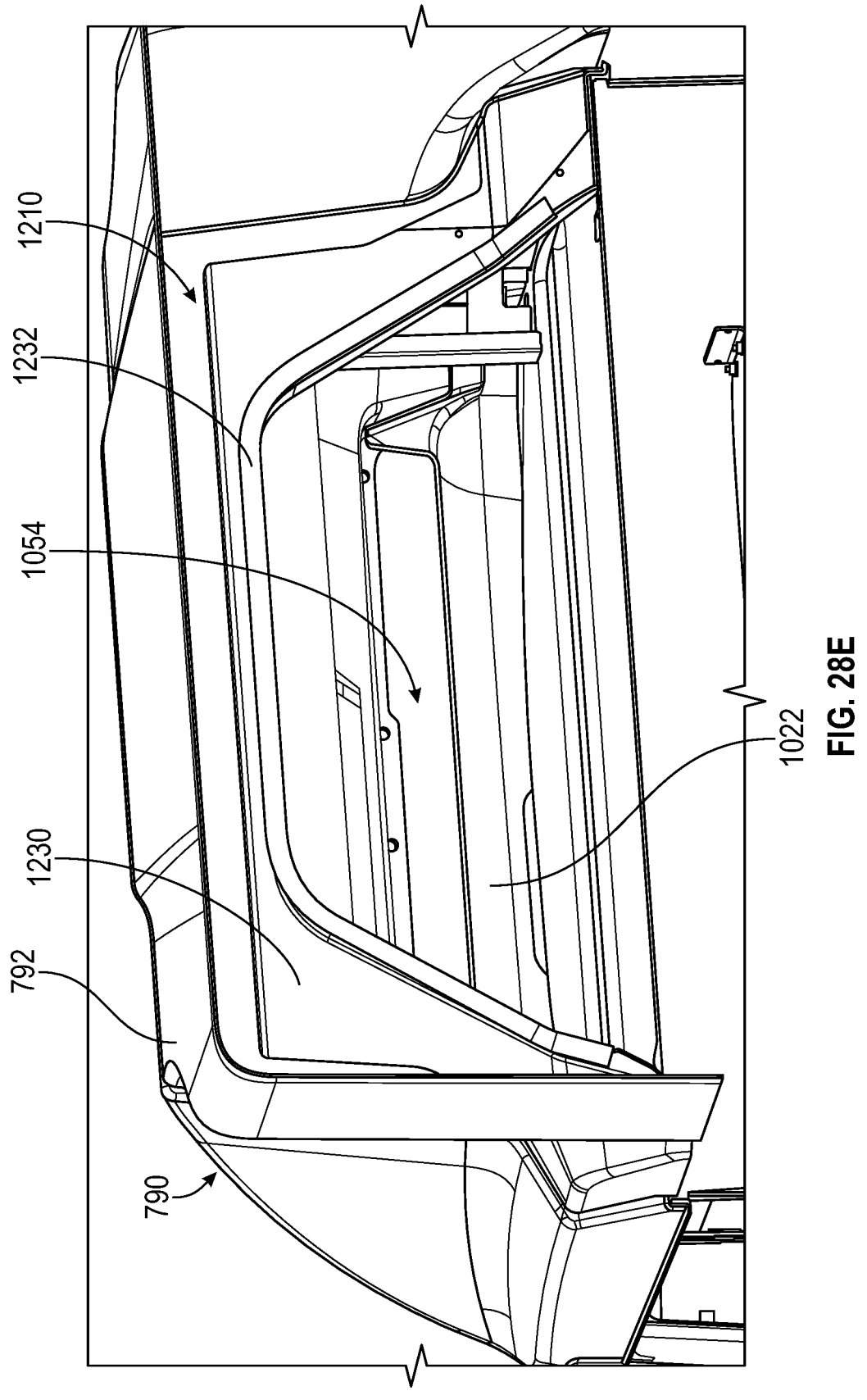

As best shown in FIG. 28A, a space or gap, shown as body gap 1014, is formed between the front shroud 790 and the rear shroud 792. The body gap 1014 extends laterally through the entirety of the cowl assembly 1010, from a left side of the cowl assembly 1010 to a right side of the cowl assembly 1010. The body gap 1014 extends vertically through the entirety of the cowl assembly 1010, from a top side of the cowl assembly 1010 to a bottom side of the cowl assembly 1010. The body gap 1014 extends from immediately behind the cab 40, upward and forward for a first distance, and vertically for a second distance to the top surface of the cowl assembly 1010. Accordingly, the front shroud 790 and the rear shroud 792 form corresponding overlapping sections. Specifically, rear shroud 792 forms an overhanging portion 1016 that extends forward from the rear shroud 792, and the front shroud 790 forms a recess 1018 that receives the overhanging portion 1016. The overhanging portion 1016 extends over the front shroud 790 such that upward movement of the overhanging portion 1016 is permitted.

Referring to FIGS. 26-28A and 29, the front shroud 790 is an assembly including a main portion or fixed portion, shown as hood 1020, and a replaceable portion or removable portion, shown as visor 1022. The hood 1020 is fixedly coupled to the roof of the cab 40, such that the hood 1020 remains during normal maintenance procedures. The hood 1020 is positioned directly above the cab 40 and extends along the body gap 1014. The visor 1022 is removably coupled to the hood 1020 and the cab 40, such that the visor 1022 can be removed and replaced (e.g., if the visor 1022 becomes damaged, to exchange the visor 1022 with a different aesthetic appearance or made from a different material, etc.). The visor 1022 is positioned at the front of the cab 40, directly above a front windscreen or windshield 1024 of the cab 40. The visor 1022 extends between the hood 1020 and the windshield 1024. This position at the front of the vehicle 1000 may make the visor 1022 more likely (e.g., than the hood 1020) to come into contact with debris, obstacles, or other objects that may contact the visor 1022, causing damage. By making this front portion of the cowl assembly 1010 easily replaceable, any damage caused to the front portion of the cowl assembly 1010 can be easily and quickly repaired. The visor 1022 also extends above and forward of the windshield 1024, protecting the windshield 1024 from debris falling downward toward the windshield 1024.

In some embodiments, the cab 40 includes a pair of guards or rails, shown as bars 1026. The bars 1026 are arranged substantially vertically, extending across the windshield 1024. The bars 1026 are laterally offset from one another. The bars 1026 may protect the windshield 1024 from contact with other objects. By way of example, the bars 1026 may prevent a refuse container from coming into contact with the windshield 1024.

The vehicle 1000 further includes a sensor, imaging device, or viewer, shown as front camera 1030, coupled to the cab 40. The front camera 1030 may provide image data regarding (e.g., showing) an area forward of the vehicle 1000. The image data may be utilized by a control system of the vehicle 10 (e.g., to provide information that is used by a controller to control operation of the vehicle 1000, to provide a real-time video output to an operator, etc.). As shown, the front camera 1030 is positioned along a front side of the cab 40, above the windshield 1024, and below the visor 1022. The position of the visor 1022 above the front camera 1030 causes the visor 1022 to protect the front camera 1030 from falling rain and debris, preventing damage to the front camera 1030 and keeping the viewing portion (e.g., the lens) of the front camera 1030 clean. The visor 1022 includes a recessed portion, cutout, or notch, shown as camera cutout 1032, that is positioned around the front camera 1030. The camera cutout 1032 may provide clearance around the front camera 1030 to prevent the visor 1022 obstructing the view of the front camera 1030. In some embodiments, the front camera 1030 and the camera cutout 1032 are both approximately laterally centered relative to the cab 40. In some embodiments, the front camera 1030 is positioned between the bars 1026 such that the bars 1026 protect the front camera 1030 from contact with other objects.

Referring to FIGS. 30-33, the vehicle 1000 includes a cooling assembly, shown as core assembly 1040, positioned within a radiator volume 800 defined by the cowl assembly 1010. Specifically, the core assembly 1040 is positioned between the roof of the cab 40 and the front shroud 790. The core assembly 1040 includes a core 752 and a core 754 each coupled to a subframe, shown as core frame 1042. The core frame 1042 is pivotally coupled to the cab 40 by a pair of couplers, shown as hinges 1044, such that the core assembly 1040 is rotatable relative to the cab 40 about a substantially vertical axis, shown as axis of rotation 1046. In other embodiments, the core frame 1042 is pivotally coupled to the body 770 by the hinges 1044. In such an embodiment, the core assembly 1040 may move relative to the cab 40 as the body 770 moves relative to the cab 40. The core 752 and the core 754 may be fixedly coupled to the core frame 1042, such that the core assembly 1040 moves together as one assembly about the axis of rotation 1046. The axis of rotation 1046 is laterally offset from the center of the vehicle 1000 to be positioned near the end of the core assembly 1040. As shown, the axis of rotation 1046 is offset to the left. In other embodiments, the arrangement is mirrored about a longitudinal center plane, such that the axis of rotation 1046 is offset to the right.

Figure 30:
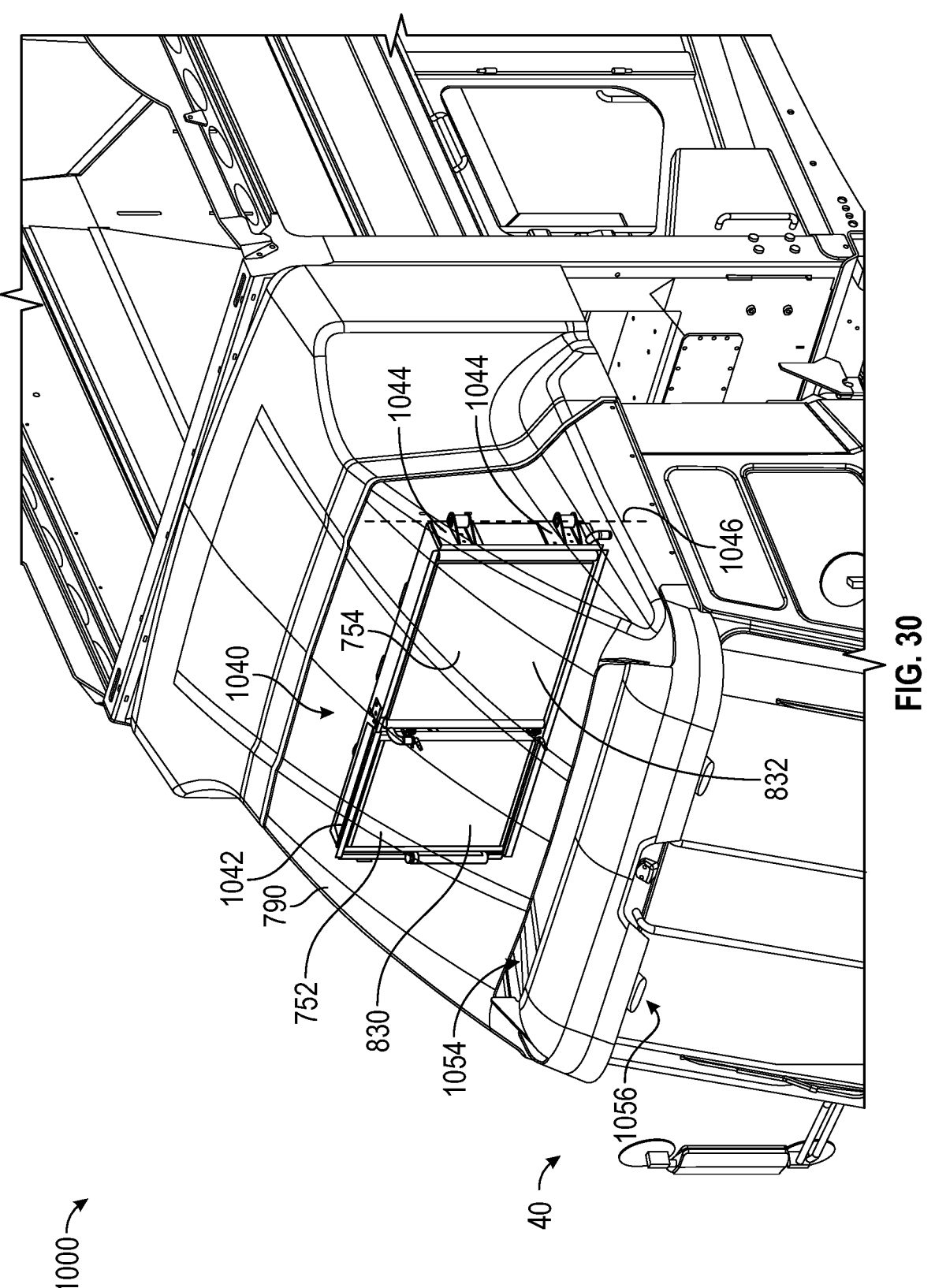
FIG. 30 is a perspective view of the vehicle of FIG. 26 showing a core assembly positioned within the cowl assembly.
Figure 34:
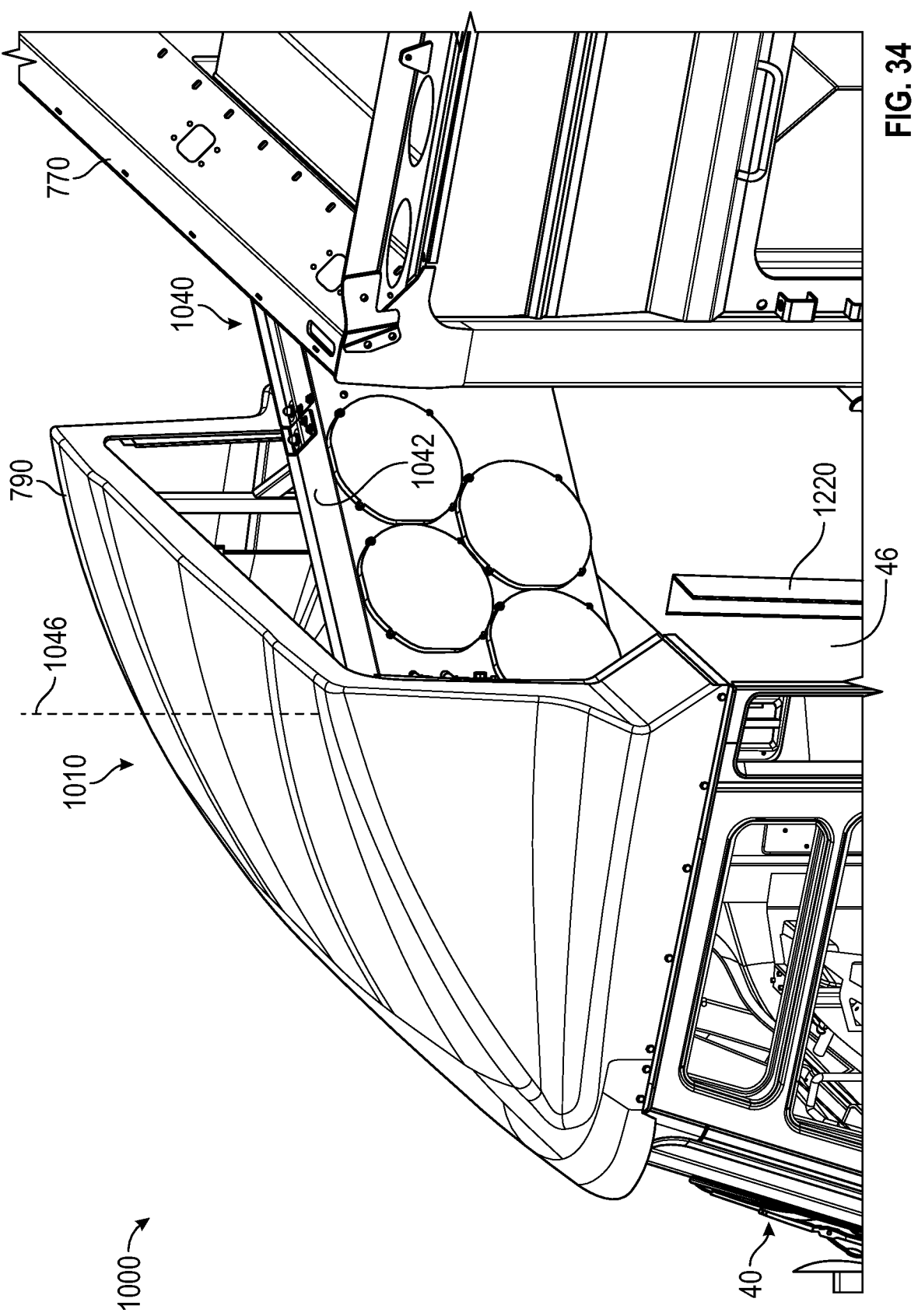
Figure 35:
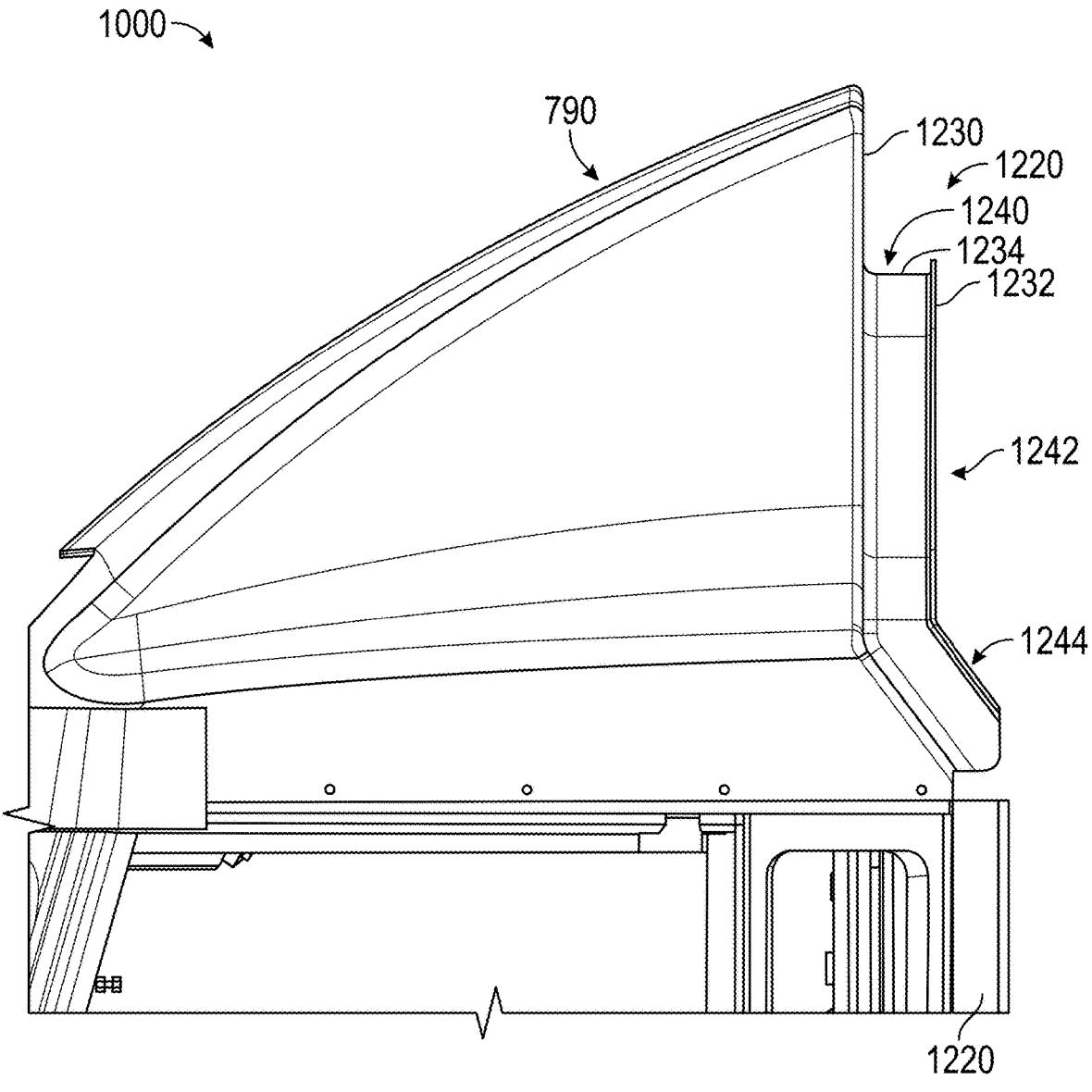
Figure 36:
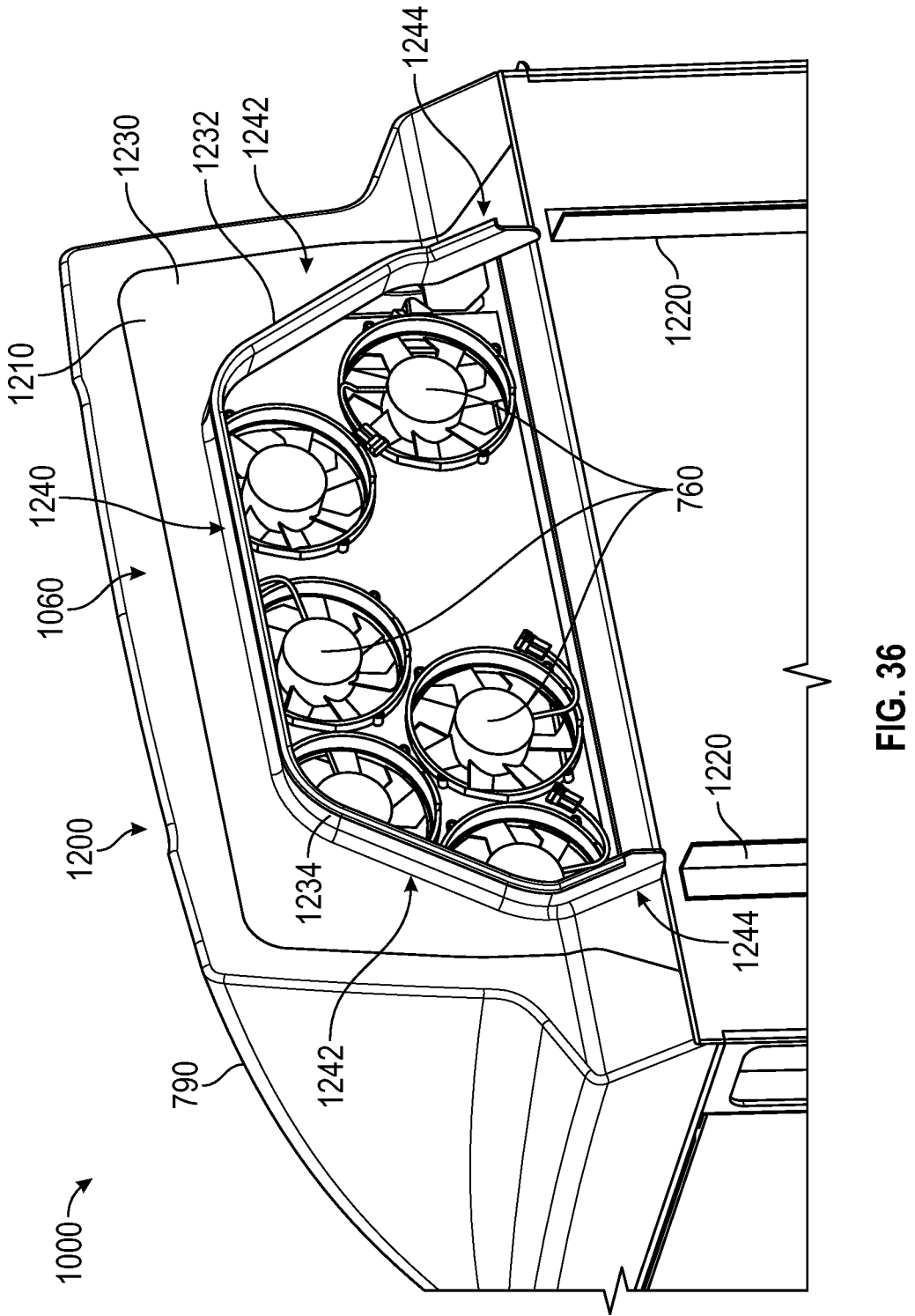
Figure 37:
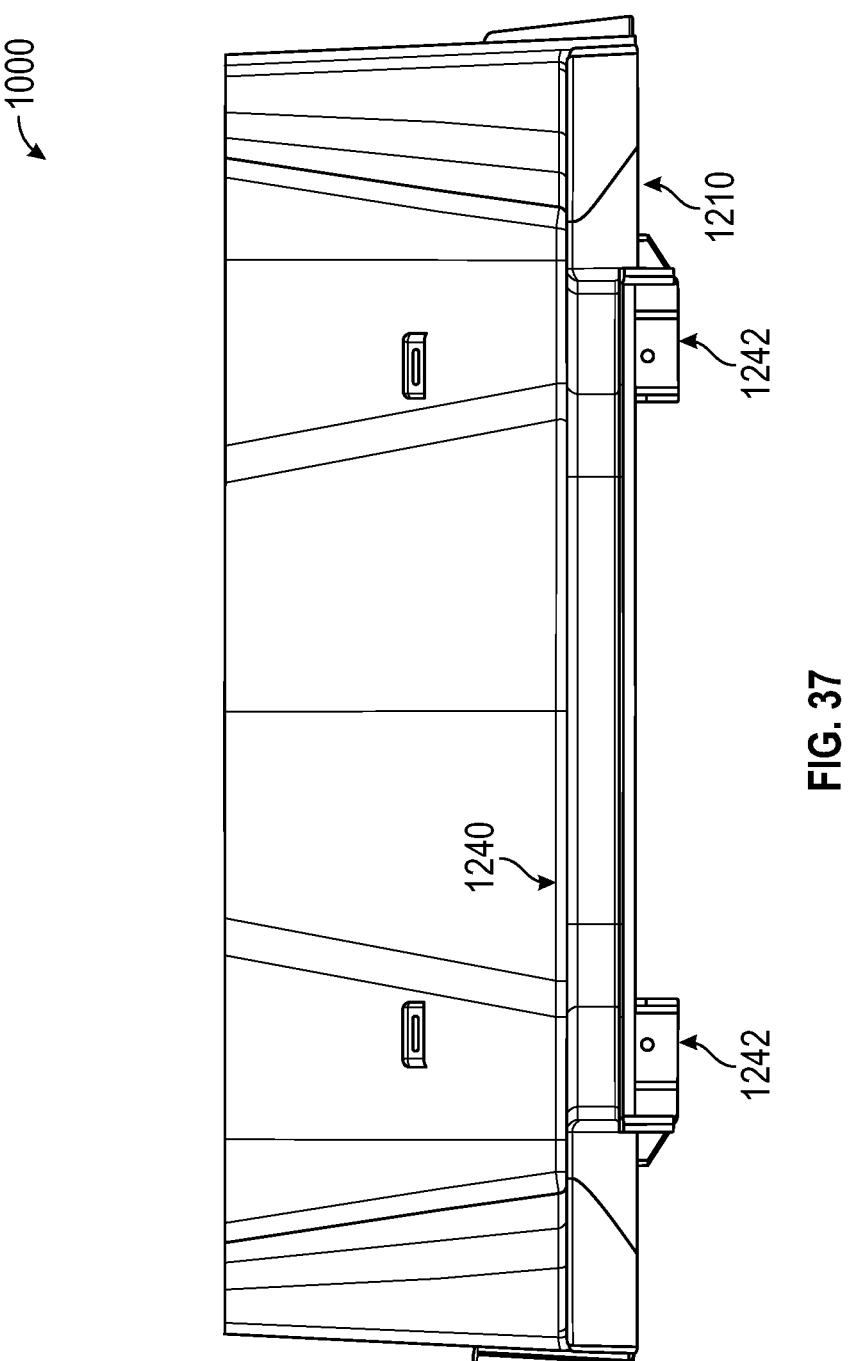

The core assembly 1040 is selectively repositionable about the axis of rotation 1046 between a default position, stored position, or use position, shown in FIG. 30, and an extended position or maintenance position, shown in FIG. 34. The core assembly 1040 may normally remain in the use position (e.g., unless the vehicle 1000 is undergoing maintenance). By way of example, the core assembly 1040 may include a latch, fastener, or another type of coupler that selectively limits (e.g., prevents) movement of the core assembly 1040 out of the use position. The core assembly may be released by the coupler and rotated backward toward the maintenance position. The maintenance position may facilitate access by a user (e.g., through the storage compartment 1012) to both the front and rear sides of the core assembly 1040 to facilitate cleaning and/or maintenance. The maintenance position may also facilitate access to the portion of the radiator volume 800 defined between the front shroud 790 and the cab 40.

Referring to FIG. 30, in the use position, the core assembly 1040 extends in a substantially vertical and lateral plane that is substantially perpendicular to a longitudinal axis. Specifically, the plane 830 and the plane 832 extend vertically and laterally and perpendicular to a longitudinal axis. In FIG. 30, the front shroud 790 is shown as being transparent for ease of viewing the core assembly 1040. Referring to FIG. 34, in the maintenance position, the core assembly 1040 rotationally offset about the axis of rotation 1046 (e.g., clockwise as viewed from above) relative to the use position. In the maintenance position, the core assembly 1040 extends rearward, beyond the front shroud 790, such that a space or gap is formed between the core assembly 1040 and the front shroud 790. The core assembly 1040 extends in a substantially vertical plane that is skewed relative to a longitudinal axis. Specifically, the plane 830 and the plane 832 extend vertically and are skewed relative to a longitudinal axis.

Referring to FIGS. 26-28A and 29-33, airflow through the core assembly 1040 generally flows along one of two airflow paths: a path 1050, and a path 1052. The path 1050 and the path 1052 may be consistent between multiple lateral positions, such that the path 1050 and the path 1052 can each reach the core 752 and the core 754. Although the paths 1050 and 1052 generally indicate the direction of airflow through the radiator volume 800, it should be understood that the airflow may deviate from the exact paths shown (e.g., in order to fill the radiator volume 800 with pressurized air, due to turbulent flow, etc.).

The path 1050 enters the radiator volume 800 of the cowl assembly 1010 through a first opening, shown as inlet 1054, that is positioned along a front of the cowl assembly 1010. The inlet 1054 is defined by and between the hood 1020 and the visor 1022. Specifically, the top side of the inlet 1054 is defined by the hood 1020. The left, right, and bottom sides of the inlet 1054 are defined by the visor 1022. In other embodiments, the left side and/or the right side of the inlet 1054 are defined by the hood 1020.

As shown, the inlet 1054 extends laterally and vertically, the width of the inlet 1054 measured laterally being substantially larger (e.g., 5 times larger, 10 times larger, etc.) than the height of the inlet 1054 measured vertically. As shown, the inlet 1054 is generally oriented perpendicular to a longitudinal axis, such that airflow along the path 1050 enters the inlet 1054 longitudinally. In some embodiments, the vertical position of the inlet 1054 is selected such that airflow entering longitudinally through the inlet 1054 is permitted to pass directly to the core assembly 1040 (e.g., without encountering any obstructions). Such an arrangement may facilitate supplying unobstructed airflow to the core assembly 1040 through the inlet 1054 when the vehicle 1000 is traveling forward.

The path 1052 enters the radiator volume 800 of the cowl assembly 1010 through a second opening, shown as inlet 1056, that is positioned along the bottom of the cowl assembly 1010. The inlet 1056 is defined by and between the visor 1022 and the cab 40. Specifically, the top, left, and right sides of the inlet 1056 are defined by the visor 1022. The bottom side of the inlet 1056 is defined by the cab 40. Specifically, the bottom side of the inlet 1056 may be defined by an upper portion of the windshield 1024. As shown, the inlet 1056 extends laterally and longitudinally, the width of the inlet 1056 measured laterally being substantially larger (e.g., 5 times larger, 10 times larger, etc.) than the depth of the inlet 1056 measured longitudinally.

As shown, the inlet 1056 generally extends perpendicular to the front surface of the cab 40, such that the inlet 1056 generally faces downward. The front face of the cab 40 (e.g., the windshield 1024) is generally inclined, such that the front face extends upward as the cab 40 extends rearward. By way of example, the front face of the cab 40 may be offset from vertical by 5 degrees, 10 degrees, 15 degrees, 30 degrees, 45 degrees, etc.). Accordingly, longitudinal airflow (e.g., from the vehicle 1000 traveling forward) strikes the front face of the cab 40 and is directed upward, along the front face, toward the inlet 1056. The visor 1022 is curved to redirect the airflow in a longitudinal direction toward the core assembly 1040. Accordingly, due to the position of the visor 1022, the vehicle 1000 is able to direct airflow from the front face of the cab 40 toward the core assembly 1040, increasing the total airflow through the core assembly 1040 (e.g., the total of the airflow along the path 1050 and the path 1052) and more effectively cooling the core assembly 1040.

Figure 31:
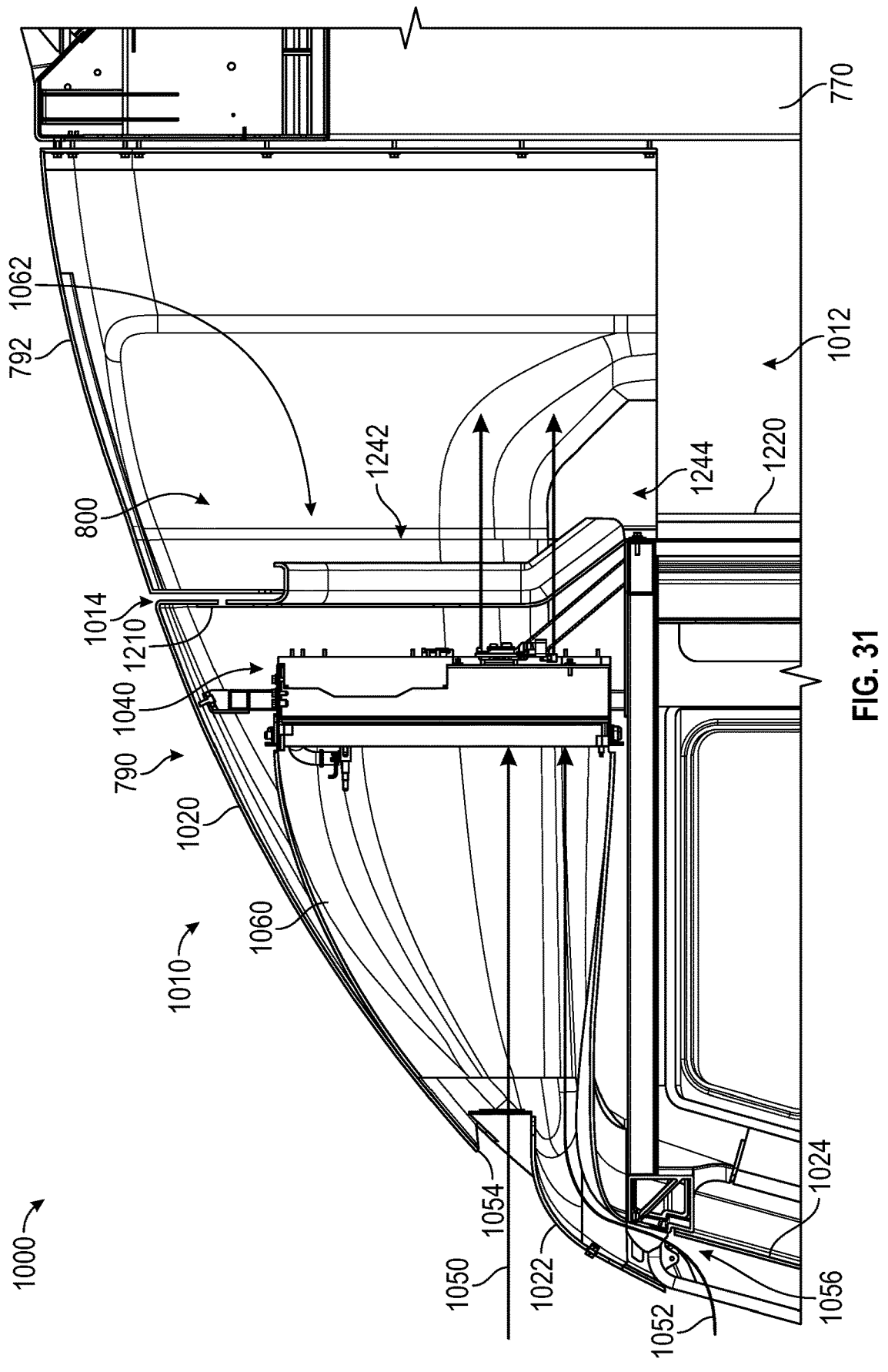
FIG. 31 is a left section view of the vehicle of FIG. 26.

Referring to FIG. 31, the front shroud 790 further includes a flow collector or plenum, shown as sleeve 1060. The sleeve 1060 is positioned within the hood 1020 and coupled to the cab 40. The sleeve 1060 has a first end or opening that is in fluid communication with the inlet 1054 and the inlet 1056. Specifically, the sleeve 1060 is sealed against the hood 1020 and the cab 40 such that substantially all airflow through the inlet 1054 and the inlet 1056 passes into the sleeve 1060 through the first end. The sleeve 1060 has a second end or opening that is in fluid communication with the core assembly 1040. Specifically, the sleeve 1060 is sealed against the core assembly 1040 such that substantially all airflow through the second end of the sleeve 1060 passes into the core 752 or the core 754. Accordingly, the sleeve 1060 may facilitate forcing all of the airflow through the inlet 1054 and the inlet 1056 through the core 752 and/or the core 754. In some embodiments, the cross-sectional area of the sleeve 1060 generally increases as the sleeve 1060 passes rearward, from the inlet 1054 and the inlet 1056 toward the core assembly 1040.

Figure 32:
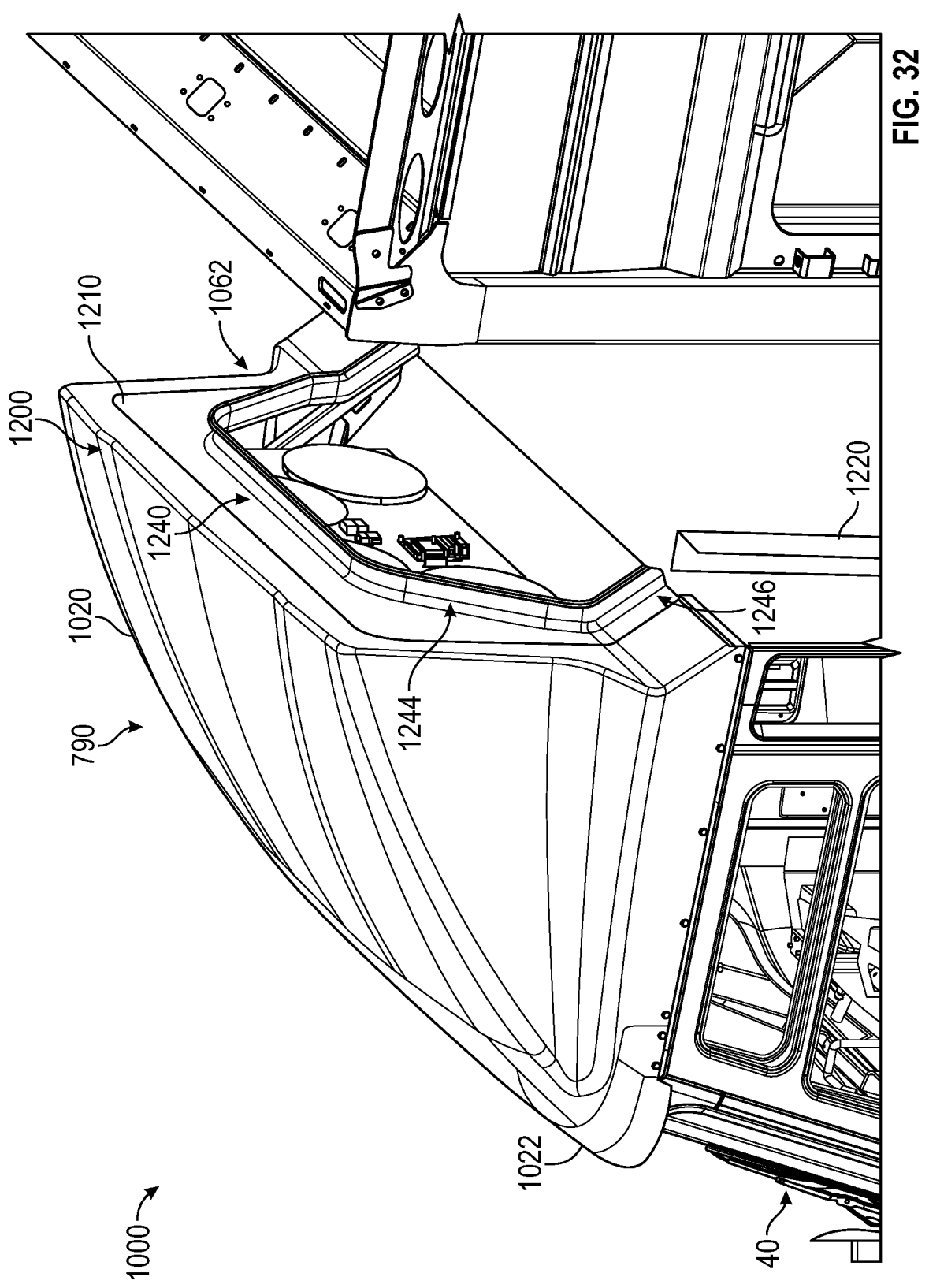
FIGS. 32-37 are various views of the vehicle of FIG. 26 with a rear portion of the cowl assembly removed.
Figure 33:
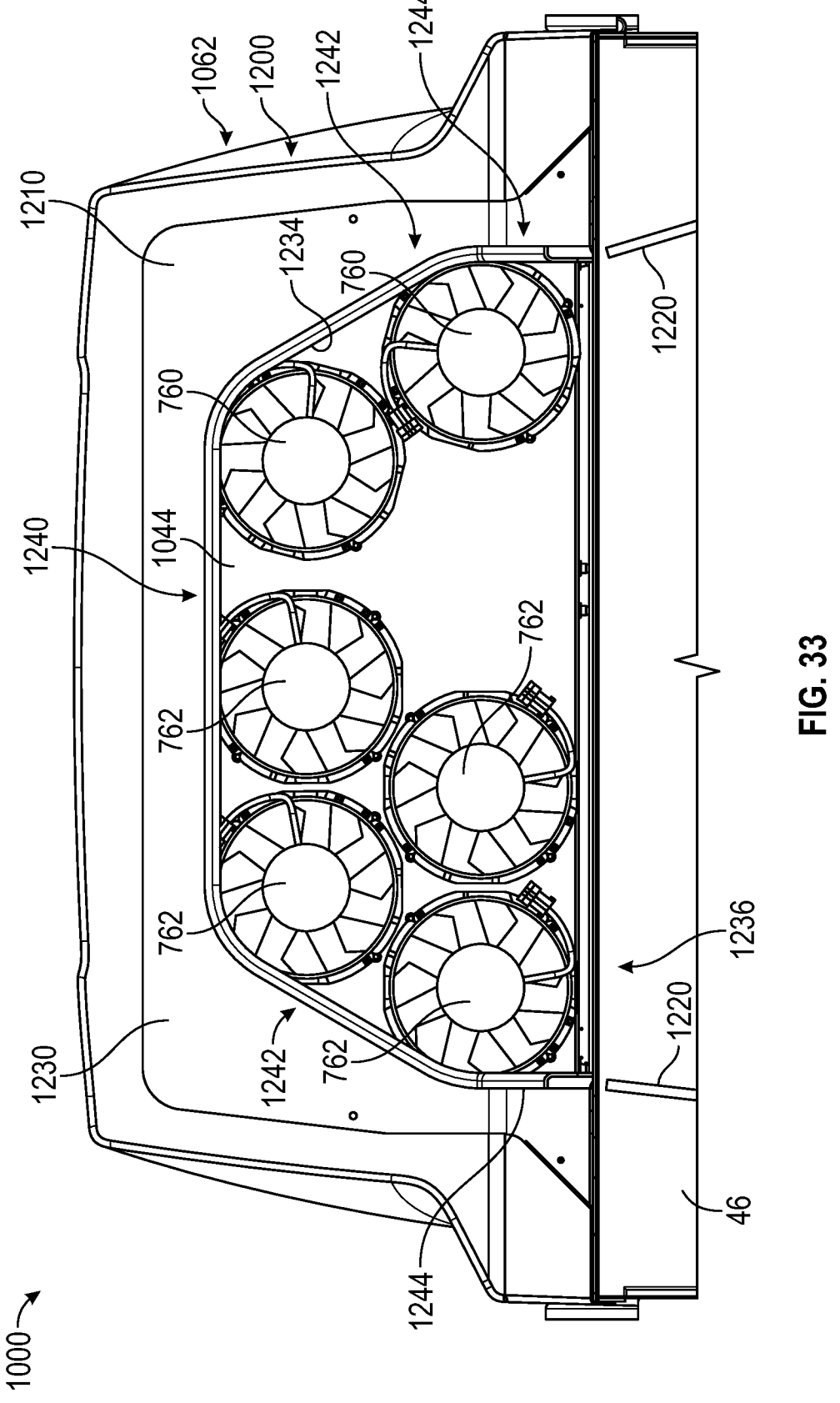

Referring to FIGS. 31-33, an aperture or outlet, shown as outlet 1062, is defined between the hood 1020 and the top of the cab 40. The outlet 1062 is generally oriented parallel to the core assembly 1040. The outlet 1062 is fluidly coupled to the storage compartment 1012. As shown, the fans 760 and the fans 762 are positioned longitudinally between the cores 752 and 754 and the outlet 1062. In operation, the path 1050 extends from outside the vehicle 1000, through the inlet 1054, through the sleeve 1060, through the core 752 and/or the core 754, through the fans 760 and/or the fans 762, and out through the outlet 1062. The path 1052 extends from outside the vehicle 1000, through the inlet 1056, through the sleeve 1060, through the core 752 and/or the core 754, through the fans 760 and/or the fans 762, and out through the outlet 1062. The airflow that exits the outlet 1062 may have an elevated temperature after removing thermal energy from the core assembly 1040. The airflow that exits the outlet 1062 may exit the vehicle 1000 through a variety of paths. By way of example, the airflow may exit through a gap between two or more components (e.g., the body gap 1014, between the rear shroud 792 and the body 770, laterally outward from the side of the storage compartment 1012, downward through the chassis 20, etc.).

Referring to FIGS. 31-37, the vehicle further includes a drainage assembly, rain channel, or fluid diversion system, shown as drip channel assembly 1200. The drip channel assembly 1200 is configured to receive fluid that passes into the vehicle 1000 through the body gap 1014 and direct the received fluid away from certain components of the vehicle 1000. By way of example, the drip channel assembly 1200 may receive and direct water (e.g., from rain, when washing the vehicle 1000, etc.). By way of another example, in an embodiment where the vehicle 1000 is configured as a front-loading refuse vehicle (e.g., the refuse vehicle 100), the lift assembly 140 may raise a refuse container above the body gap 1014 in order to deposit refuse from the container into the hopper volume 132. During such a motion, fluid from the refuse container may drip through the body gap 1014 and into the drip channel assembly 1200. Accordingly, the drip channel assembly 1200 may improve the overall cleanliness of the vehicle 1000 and prevent fluid from reaching components that may be sensitive to contaminants or difficult to clean. By way of example, the drip channel assembly 1200 may prevent fluid from passing through the outlet 1062 and reaching the core assembly 1040, which may be difficult to clean, and which may be adversely affected by contamination from the fluid.

The drip channel assembly 1200 includes a first section, portion, or service panel, shown as upper channel portion 1210, and a pair of second sections or portions, shown as lower channel portions 1220. The upper channel portion 1210 is positioned above the cab 40 and is approximately laterally centered relative to the cab 40. The lower channel portions 1220 are each positioned below an end of the upper channel portion 1210. The upper channel portion 1210 directs fluid downward and laterally outward from a longitudinal centerline of the vehicle 1000. The lower channel portions 1220 are each positioned to be in fluid communication with an end of the upper channel portion 1210, such that fluid exiting the upper channel portion 1210 is received by one of the lower channel portions 1220. The lower channel portions 1220 each then direct the fluid further downward and laterally outward.

The upper channel portion 1210 includes a first flange or inner flange, shown as backing plate 1230, a second flange, shown as outer flange 1232, and a connecting portion, shown as channel bottom 1234. Together, the backing plate 1230, the outer flange 1232, and the channel bottom 1234 form a channel, gutter, trough, or drain of the upper channel portion 1210 having a U-shaped cross section. In some embodiments, the backing plate 1230, the outer flange 1232, and the channel bottom 1234 are integrally formed as a single, continuous piece. In other embodiments, the backing plate 1230, the outer flange 1232, and/or the channel bottom 1234 are formed separately and coupled to one another (e.g., using fasteners, using adhesive, etc.). The backing plate 1230 is removably coupled (e.g., by one or more fasteners) to the hood 1020 of the front shroud 790. The backing plate 1230 extends in a substantially vertical and lateral plane. The backing plate 1230 extends along the periphery of the outlet 1062 defined by the hood 1020, sealing the outlet 1062. The channel bottom 1234 extends reward from a bottom edge of the backing plate 1230. The channel bottom 1234 defines an aperture 1236, through which the airflow through the outlet 1062 is forced by the backing plate 1230. The aperture 1236 has a reduced cross-sectional area relative to the outlet 1062, but generally surrounds the fans 760 and 762. The outer flange 1232 is positioned at a distal end of the channel bottom 1234 and extends upward from the channel bottom 1234. In some embodiments, the backing plate 1230, the channel bottom 1234, and the outer flange 1232 are formed as a single, continuous piece.

The backing plate 1230, the channel bottom 1234, and the outer flange 1232 form the channel of the upper channel portion 1210, which includes a center portion 1240, a pair of intermediate portions or middle portions 1242, and a pair of drip portions or end portions 1244. The center portion 1240 is approximately laterally centered and extends laterally outward. The center portion 1240 is generally horizontal. In some embodiments, the center portion 1240 has an arc shape or a pair of pitched portions such that the center portion 1240 slopes downward as the center portion 1240 extends laterally outward from the center of the vehicle 1000.

Each end of the center portion 1240 meets one of the middle portions 1242. The middle portions 1242 are generally sloped downward and laterally outward. In some embodiments, the slopes of the middle portions 1242 are significantly steeper than the slope of the center portion 1240 (e.g., 30 to 60 degrees versus 0 to 10 degrees). In some embodiments, the center portion 1240 and the middle portions 1242 lie in a common lateral and vertical plane such that the center portion 1240 and the middle portions 1242 do not extend longitudinally forward or rearward (e.g., have a substantially constant longitudinal position).

The end of each middle portion 1242 meets one of the end portions 1244. The end portions 1244 are generally sloped downward and longitudinally rearward. In some embodiments, the lateral slopes of the end portions 1244 are significantly steeper than the slope of the center portion 1240 (e.g., 30 to 60 degrees versus 0 to 10 degrees). In some embodiments, each end portion 1244 lies in a longitudinal and vertical plane such that the end portions 1244 do not extend laterally inward or outward (e.g., have a substantially constant lateral position). The shapes and sizes of the center portion 1240, the middle portions 1242, and the end portions 1244 may be selected to match the shape and size of the body gap 1014, such that fluid entering the body gap 1014 at any point along the length of the body gap 1014 is captured by the channel of the upper channel portion 1210.

Figure 28F:
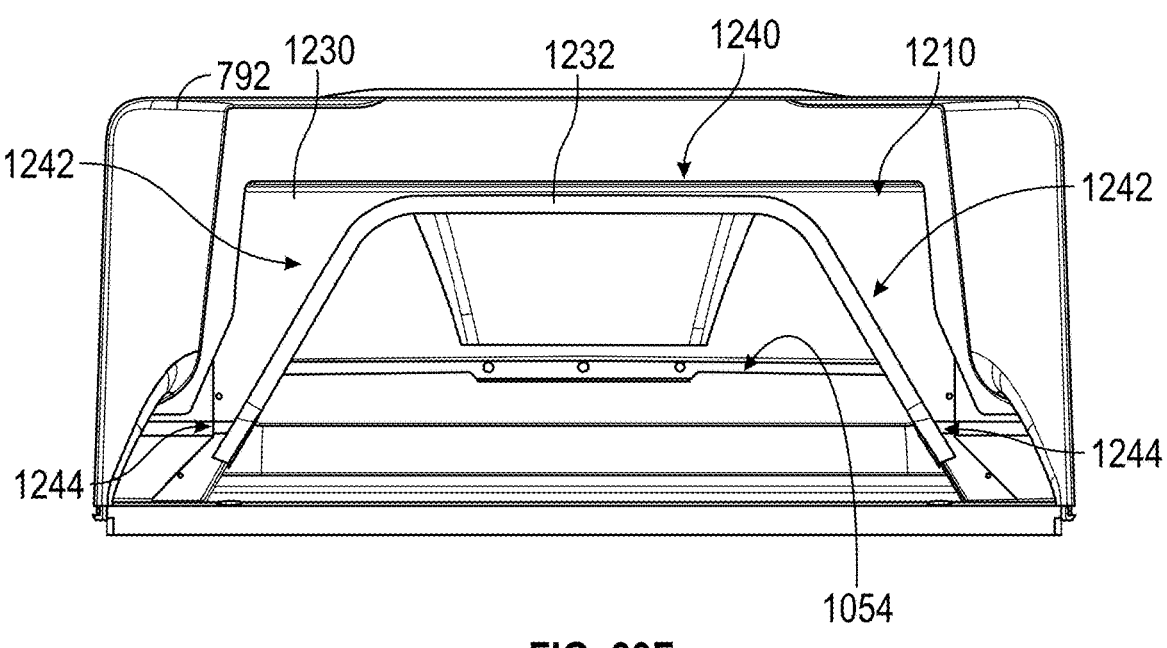
Figure 28G:
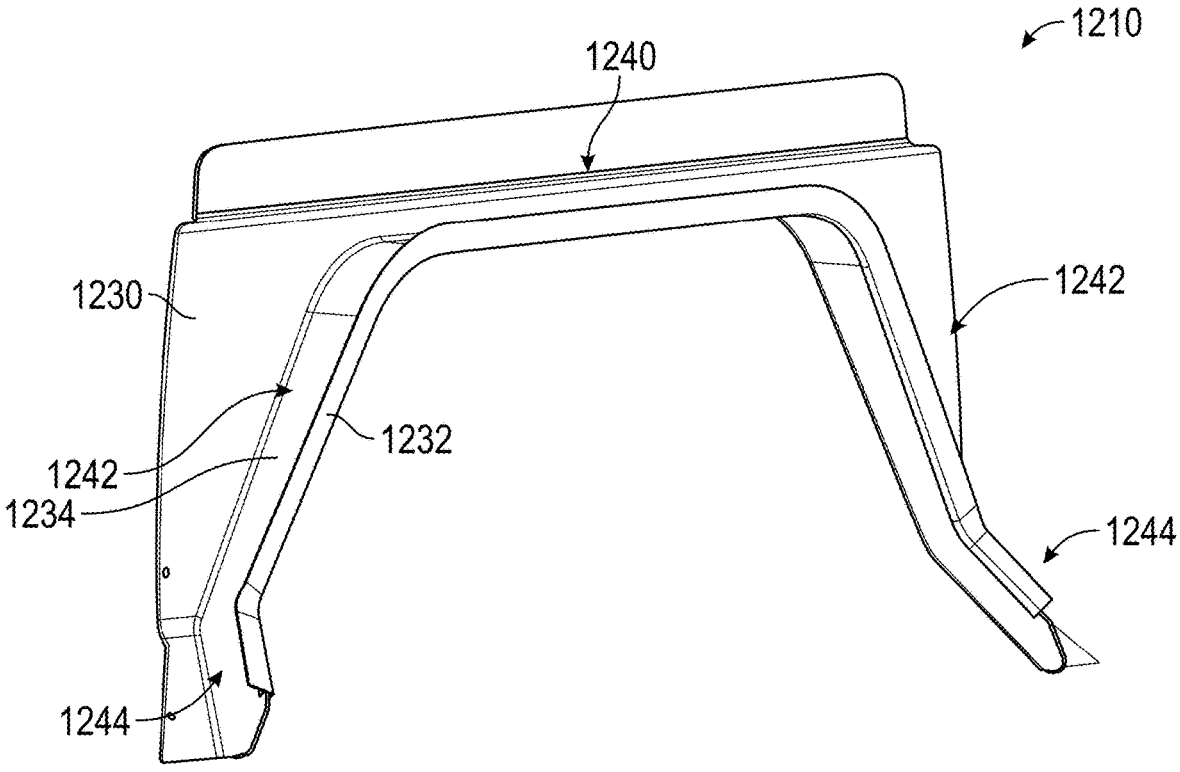
FIGS. 28G and 28H are various views of the drip channel assembly of FIG. 28B.
Figure 28H:
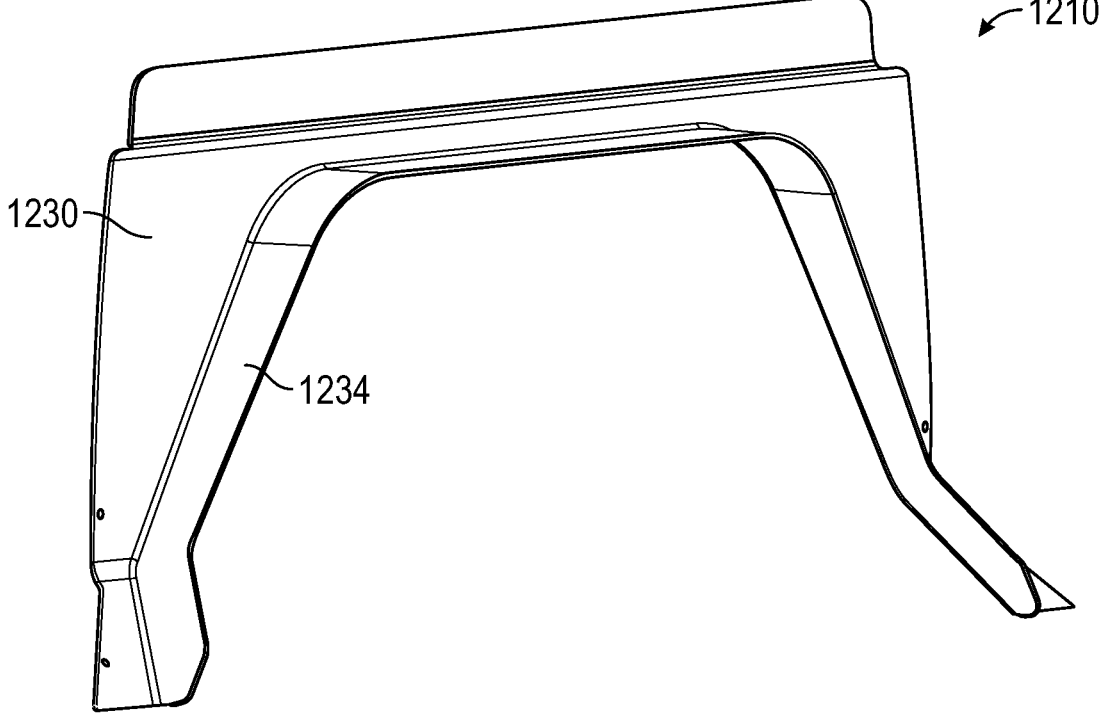
Figure 29:
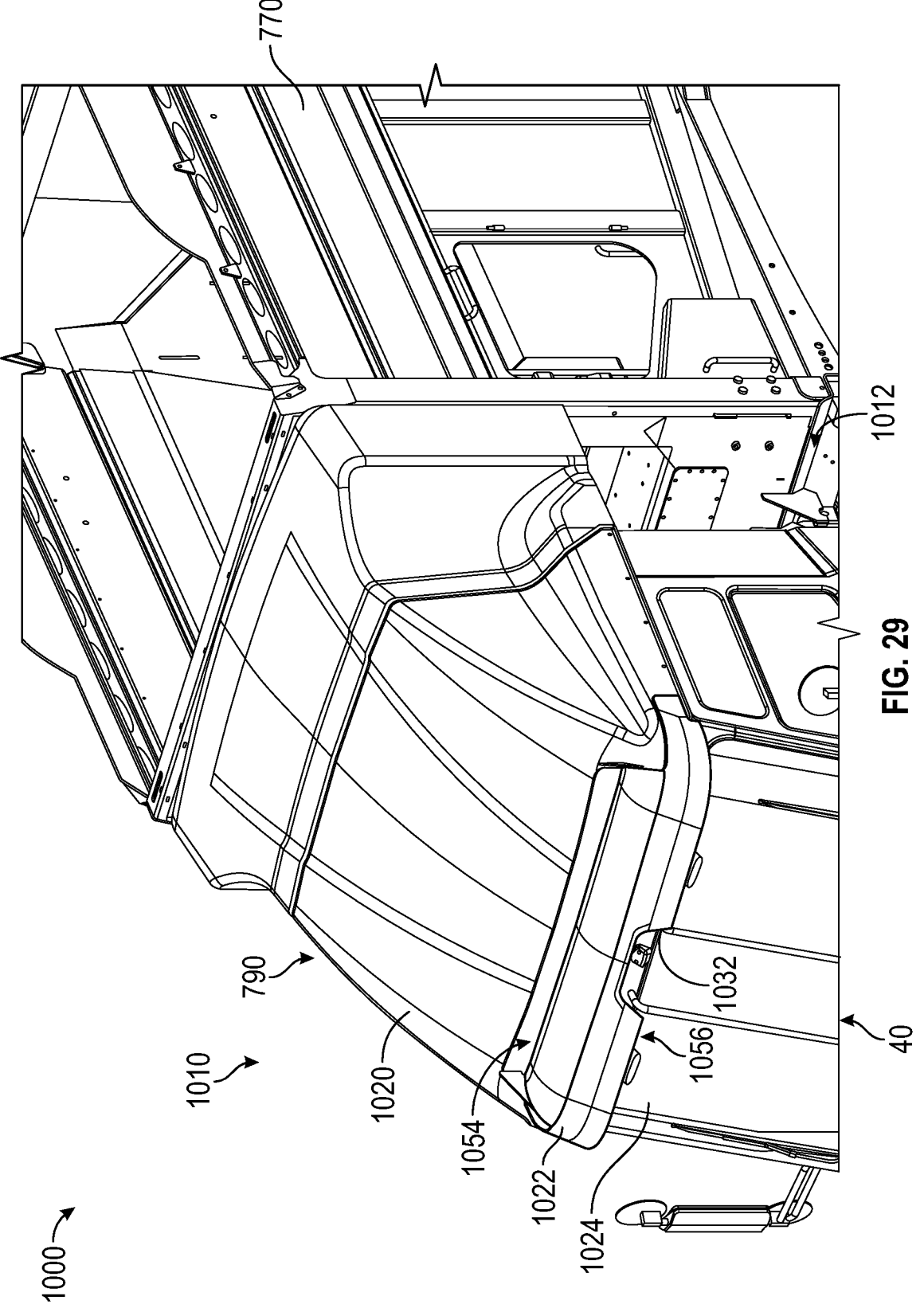
FIG. 29 is a perspective view of the vehicle of FIG. 26 showing a visor of the cowl assembly.

FIGS. 28B-28H illustrate an alternative configuration of the upper channel portion 1210. This alternative upper channel portion 1210 may be substantially similar to the upper channel portion 1210 shown in FIG. 35, except as otherwise specified herein, and may be utilized in place of the upper channel portion 1210 of FIG. 35. In the upper channel portion 1210 of FIGS. 28B-28H, the channel bottom 1234 and the outer flange 1232 are formed as separate pieces that are removably coupled to one another (e.g., by one or more fasteners). Such a configuration may facilitate manufacturing of the upper channel portion 1210. In the configuration of FIGS. 28B-28H, the center portion 1240 is wider (e.g., as measured perpendicular to the outer flange 1232) than the end portions 1244. The middle portions 1242 taper from the relatively large width of the center portion 1240 to the relatively small width of the end portions 1244. The end portions 1244 are generally sloped downward, longitudinally rearward, and laterally outward. In some embodiments, the lateral outward slopes of the end portions 1244 match (e.g., are substantially equal to) the lateral outward slopes of the middle portions 1242 (e.g., as shown in FIG. 28F).

The lower channel portions 1220 are positioned directly beneath the end portions 1244, such that fluid that drips off of the end portions 1244 is received by the lower channel portions 1220. The lower channel portions 1220 are each coupled (e.g., fixedly, removably, etc.) to a rear wall 46 of the cab 40. By way of example, the lower channel portions 1220 may be fastened or welded to the rear wall 46 of the cab 40. The lower channel portions 1220 extend rearward from the rear wall 46 of the cab 40. In some embodiments, the lower channel portions 1220 each have a U-shaped cross section, similar to the channel of the upper channel portion 1210. In such an embodiment, the U-shaped cross section opens laterally outward to facilitate capturing and retaining fluid drippings. The lower channel portions 1220 each slope downward and laterally outward. In some embodiments, the lower channel portions 1220 terminate near the bottom of the cab 40 and/or near the outer walls (e.g., left and right walls) of the cab 40.

In operation, fluid may pass through the body gap 1014. If the fluid is near the longitudinal center of the vehicle 10, the fluid is captured within the center portion 1240. If the fluid is to the left of center upon contact with the center portion 1240, gravity will force the fluid to flow laterally outward to the left. If the fluid is to the right of center upon contact with the center portion 1240, gravity will force the fluid to flow laterally outward to the right. The fluid may pass through the middle portion 1242 and the end portion 1244 and subsequently fall onto one of the lower channel portions 1220. The lower channel portions 1220 then direct the fluid even further laterally outward, away from any components that might be sensitive to contaminants. If the fluid initially enters the body gap 1014 farther from the longitudinal center of the vehicle 10, the fluid may fall onto a middle portion 1242, an end portion 1244, or a lower channel portion 1220 and be directed accordingly.

Referring to FIGS. 32 and 34, when installed, the upper channel portion 1210 may obstruct access to the core assembly 1040. Additionally, the upper channel portion 1210 may obstruct movement of the core assembly 1040, preventing the core assembly 1040 from reaching the maintenance position. In order to facilitate maintenance and cleaning of the core assembly 1040, the upper channel portion 1210 may be removably coupled to the front shroud 790 and/or the cab 40. By way of example, the front shroud 790 may be removably coupled to the front shroud 790 by a series of fasteners. By removing the fasteners, the upper channel portion 1210 may be disconnected from the front shroud 790 and removed. This removed state may facilitate movement of the core assembly 1040 and free access to the core assembly 1040 by a user. Additionally, removing the upper channel portion 1210 may facilitate cleaning the upper channel portion 1210. Once the cleaning and maintenance have been completed, the upper channel portion 1210 may be reattached to the front shroud 790. In other embodiments, the upper channel portion 1210 is fixedly and permanently coupled to the front shroud 790. By way of example, the upper channel portion 1210 may be formed as a single, continuous piece with the front shroud 790.

Figure 38:
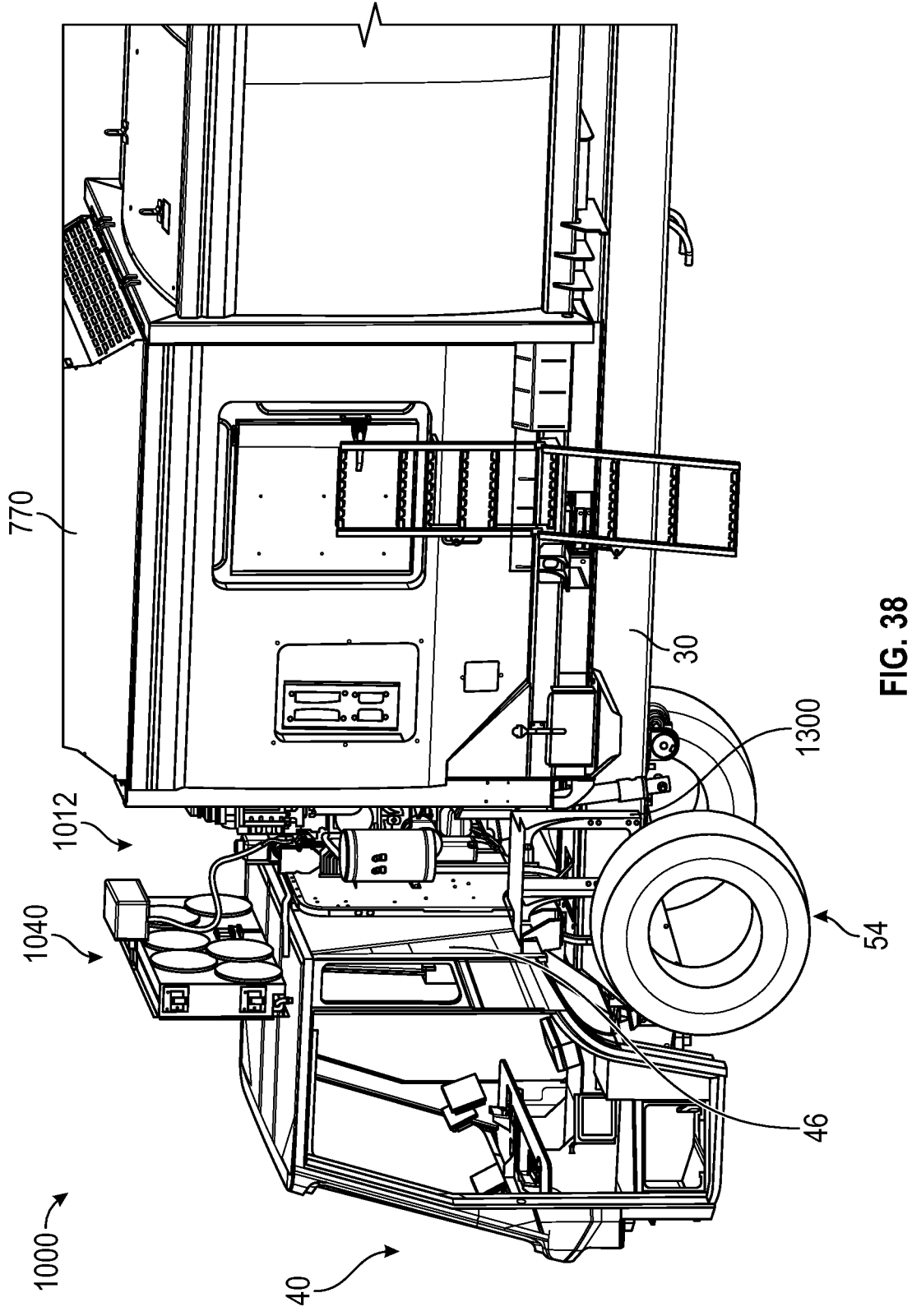
FIG. 38 is a perspective view showing the vehicle of FIG. 26 including a step assembly.
Figure 39:
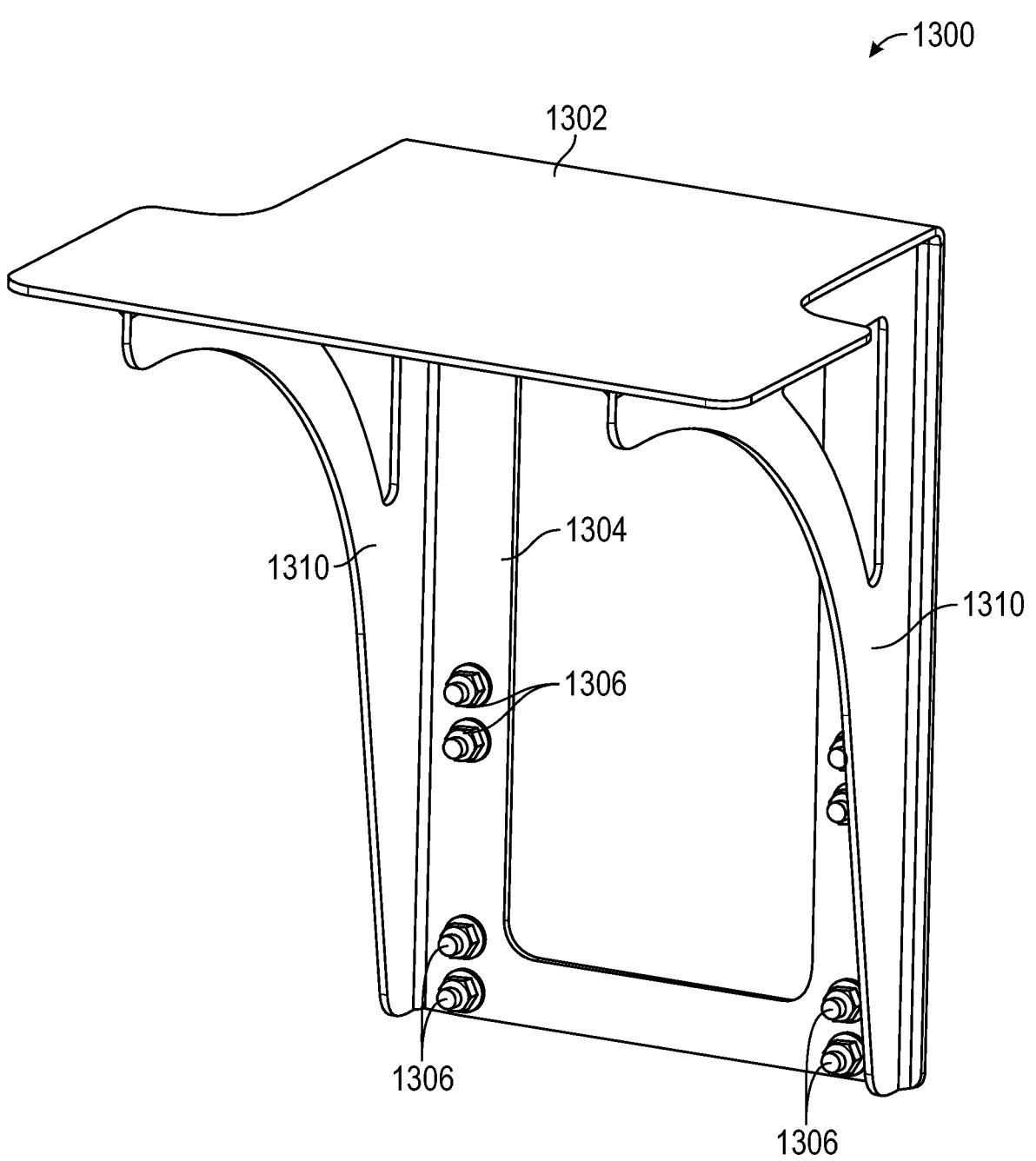
FIG. 39 is a perspective view of the step assembly of FIG. 38.

Referring to FIGS. 38 and 39, to further facilitate user access to the core assembly 1040, the vehicle 1000 includes a maintenance step or service step, shown as step assembly 1300. The step assembly 1300 is coupled to the front rail portion 30 (e.g., fixedly coupled, coupled by one or more fasteners, etc.). As shown, the step assembly 1300 is positioned between the rear wall 46 of the cab 40 and the body 770. The step assembly 1300 extends above the front rail portion 30 and below the roof of the cab 40. The step assembly 1300 extends directly above a wheel and tire assembly 54 of the front axle 50. Accordingly, the step assembly 1300 is generally positioned within the storage compartment 1012. Although the step assembly 1300 is shown on one side of the vehicle 1000 (e.g., a driver side), the step assembly 1300 may additionally or alternatively be positioned on the opposite side of the vehicle 1000 (e.g., a passenger side).

The step assembly 1300 includes a step surface or top member, shown as top plate 1302. The top plate 1302 extends in a generally horizontal plane and provides a surface onto which a user can step. Extending downward from the top plate 1302 along the back of the step assembly 1300 is an attachment plate or back member, shown as back plate 1304. The back plate 1304 is configured to be directly coupled to the front rail portion 30 to couple the step assembly 1300 to the chassis 20. In some embodiments, the back plate 1304 defines a series of apertures that each receive a fastener, shown as bolt 1306, to couple the step assembly 1300 to the chassis 20. The bolts 1306 may be received by corresponding threaded apertures defined by the chassis 20. Additionally or alternatively, the step assembly 1300 may be welded to the chassis 20.

A pair of support members, shown as gusset plates 1310, extend between the back plate 1304 and the top plate 1302. The gusset plates 1310 may be substantially perpendicular to the top plate 1302 and the back plate 1304. The gusset plates 1310 transfer forces from the top plate 1302 to the back plate 1304, strengthening the step assembly 1300. In some embodiments, the gusset plates 1310, the top plate 1302, and the back plate 1304 are fixedly coupled to one another. In some embodiments, the gusset plates 1310, the top plate 1302, and the back plate 1304 form a single, continuous piece.

A user may stand on the step assembly 1300 when accessing the core assembly 1040. By way of example, the user may step directly onto the step assembly 1300 from the ground. By way of another example, the user may first step onto the wheel and tire assembly 54 and then onto the step assembly 1300. By placing the step assembly 1300 directly above a wheel and tire assembly 54, the wheel and tire assembly 54 may facilitate the user climbing the vehicle 1000 without requiring an additional step.

F. Configuration 5—Cowl Clearance for Lift Assembly of Front-Loading Refuse Vehicle During operation, the vehicle 1000 may experience various loadings that cause the body 770 to move relative to the cab 40. By way of example, if the vehicle 1000 drives over a bump or depression in a road surface, the body 770 may rotate relative to the cab 40 about a longitudinal axis. Because the front shroud 790 is coupled to the cab 40 and the rear shroud 792 is coupled to the body 770, this relative movement of the cab 40 and the body 770 causes a corresponding relative movement of the front shroud 790 and the rear shroud 792. The body gap 1014 may be sized to prevent or minimize contact between the front shroud 790 and the rear shroud 792 when such relative movement occurs.

When the vehicle 1000 is configured as a front-loading refuse vehicle (e.g., the refuse vehicle 100), the lift arms 142 are coupled to the body 770 (e.g., the refuse compartment 130). At various points of operation (e.g., when lifting or lowering a refuse container, when the lift arms 142 are between a fully raised position and a fully lowered position), the lift arms 142 may be positioned adjacent the cab 40. Accordingly, when the chassis 20 twists about the longitudinal axis, the lift arms 142 may move relative to the cab 40, bringing the lift arms 142 closer to the cab 40. In other vehicles, such a twisting movement could cause the lift arms of a refuse vehicle to come into contact with the cab 40, causing damage to the cab and/or the arms.

Instead, the cowl assembly 1010 is specifically configured to avoid contact between the lift arms 142 in the event that the body 770 twists relative to the cab 40. Specifically, the cowl assembly 1010 defines cowl recesses 1400 positioned at the top left and top right corners of the cowl assembly 1010. These cowl recesses 1400 reduce the size of the cowl assembly 1010, moving the extremities of the cowl assembly 1010 away from the path of the lift arms 142, even when the body 770 twists relative to the cab 40.

Figure 26:
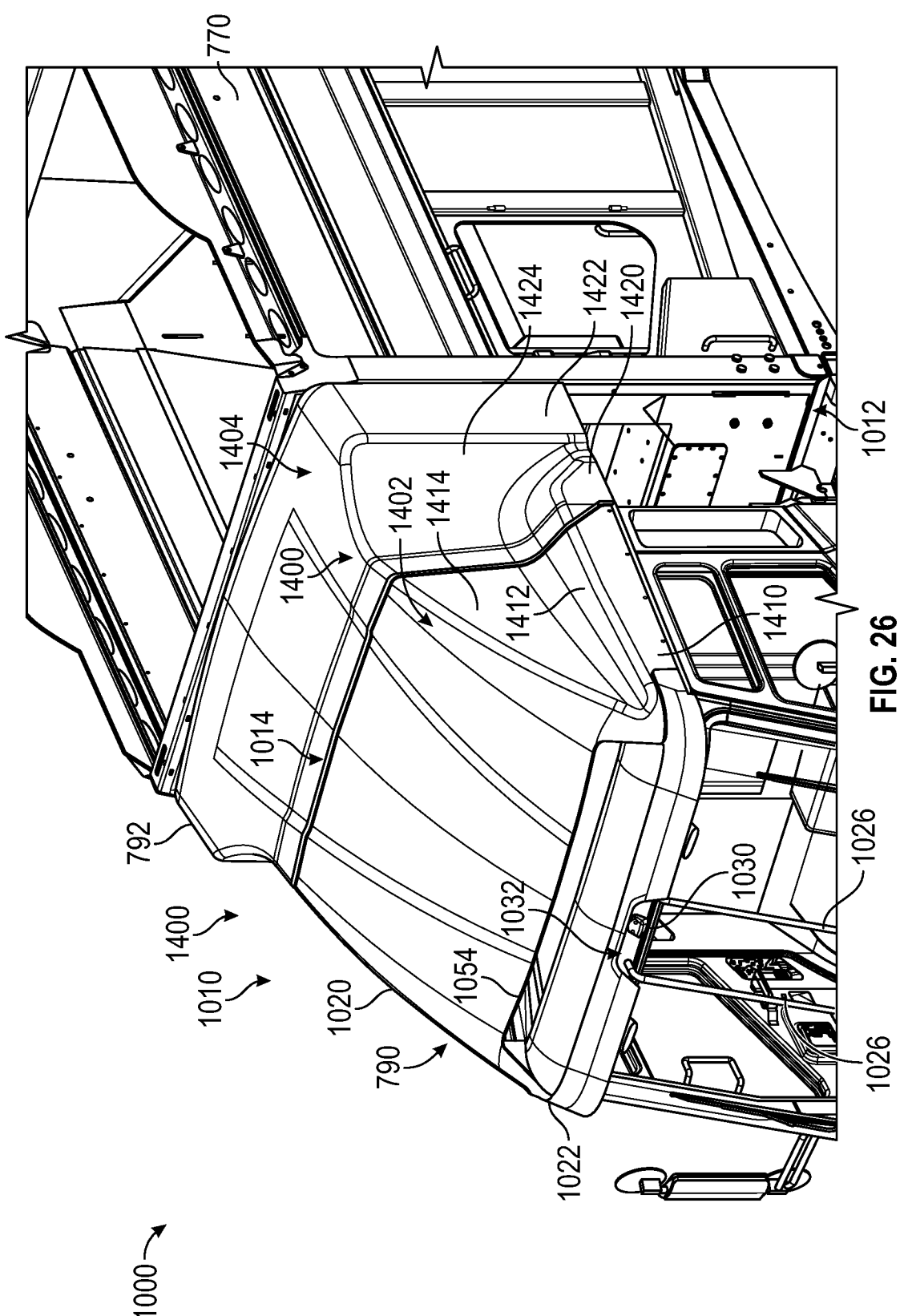
Figure 27:
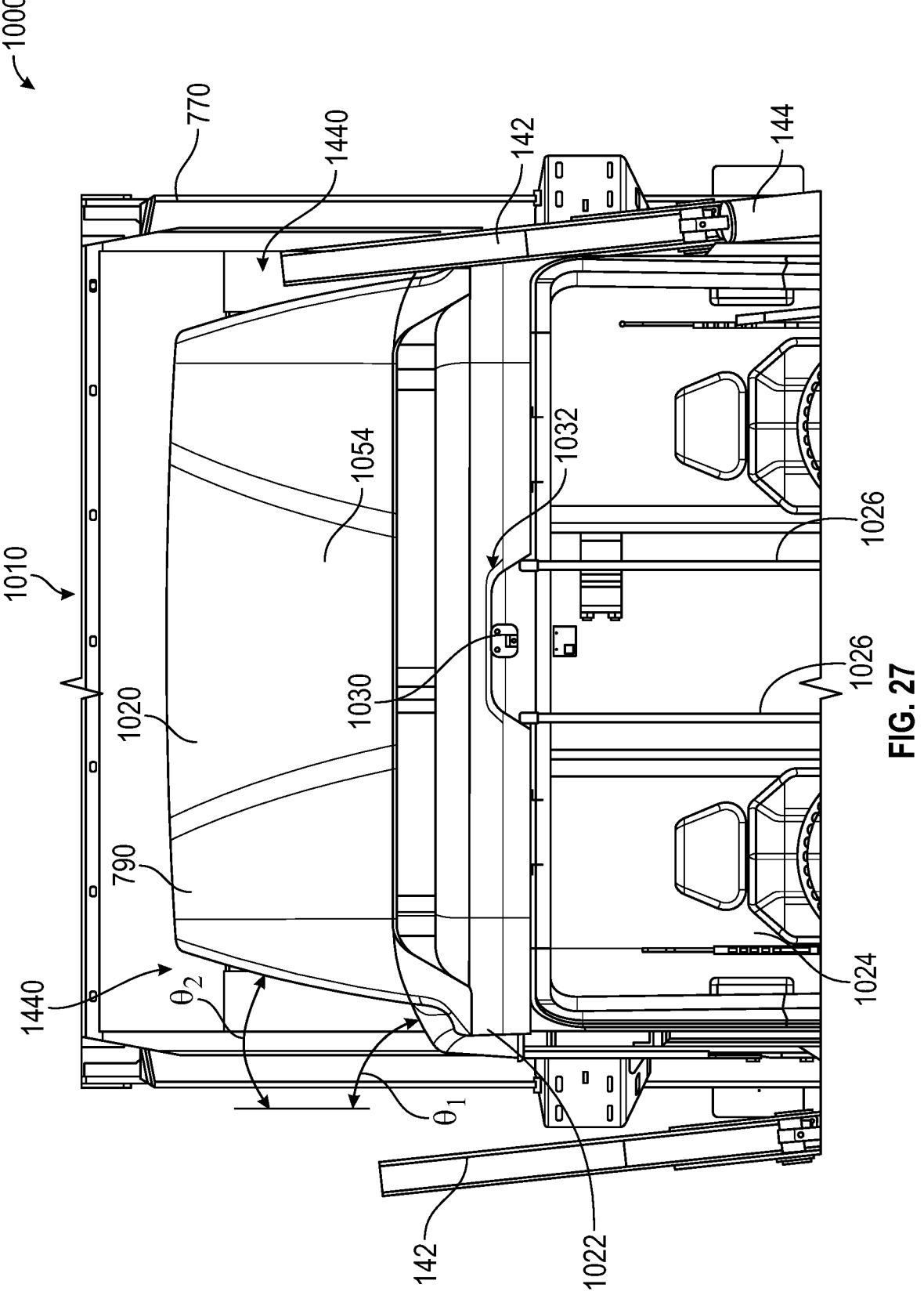

As shown in FIGS. 26 and 27, each cowl recess 1400 includes a front recess portion 1402 defined by the front shroud 790 and a rear recess portion 1404 defined by the rear shroud 792. The front recess portion 1402 is positioned forward of the rear recess portion 1404. The front recess portion 1402 is continuous with the rear recess portion 1404, and together the front recess portion 1402 and the rear recess portion 1404 define the cowl recess 1400.

The front shroud 790 includes a first surface, shown as cab interface surface 1410, a second surface, shown as transition surface 1412, and a third surface, shown as side surface 1414. The cab interface surface 1410 is positioned along a top edge of the cab 40. The cab interface surface 1410 may meet the top of the cab 40 to form a smooth transition from the cab 40 to the front shroud 790. In some embodiments, a gap is formed between the interface surface 1410 to permit fluid to drain between the interface surface 1410 and the cab 40. In such embodiments, the interface surface 1410 may be the closest surface of the front shroud 790 to the cab 40. The cab interface surface 1410 is substantially vertical and extends longitudinally along the front shroud 790. The cab interface surface 1410 may taper laterally outward as the cab interface surface 1410 extends rearward.

The transition surface 1412 is positioned above the cab interface surface 1410 and is continuous with the cab interface surface 1410. The transition surface 1412 is oriented at an angle $\theta_1$ relative to a vertical axis. The transition surface 1412 extends upward and laterally inward from the cab interface surface 1410. In some embodiments, the angle $\theta_1$ is between 45 degrees and 90 degrees (i.e., horizontal). The transition surface 1412 may extend gradually upward as the transition surface 1412 extends rearward.

The side surface 1414 is positioned above the transition surface 1412 and is connected with the transition surface 1412 through a concave filleted surface. Together, the side surface 1414, the transition surface 1412, and the concave filleted surface define the front recess portion 1402. The side surface 1414 is oriented at an angle $\theta_2$ relative to a vertical axis. The side surface 1414 extends upward and laterally inward from the transition surface 1412. In some embodiments, the angle $\theta_2$ is less than the angle $\theta_1$ such that the side surface 1414 is more steeply inclined than the transition surface 1412. In some embodiments, the angle $\theta_2$ is between 0 degrees (i.e., vertical) and 45 degrees.

The rear shroud 792 includes a first surface, shown as cab interface surface 1420, a second surface, shown as body interface surface 1422, and a third surface, shown as transition surface 1424. The cab interface surface 1420 is aligned with the cab interface surface 1410. The cab interface surface 1420 generally continues the same shape, size, and orientation as the cab interface surface 1410, such that the cab interface surface 1420 generally acts as a continuation of the cab interface surface 1410 on the opposite side of the body gap 1014. The cab interface surface 1420 is substantially vertical and extends longitudinally along the rear shroud 792. The cab interface surface 1420 may taper laterally outward as the cab interface surface 1420 extends rearward.

The body interface surface 1422 is positioned along a front edge of the body 770. The body interface surface 1422 may meet the left or right side of the cab 40 to form a smooth transition from the cab 40 to the rear shroud 792. The body interface surface 1422 is substantially vertical and extends longitudinally along the front shroud 790. The body interface surface 1422 may taper laterally outward as the body interface surface 1422 extends rearward.

The transition surface 1424 generally provides a smooth transition between the cab interface surface 1420, the body interface surface 1422, the transition surface 1412, and the side surface 1414. The cab interface surface 1420, the body interface surface 1422, the transition surface 1412, and the side surface 1414 have different lateral positions, and the transition surface 1424 provides a curved (e.g., filleted) surface to smoothly transition between each of the surfaces.

FIGS. 27 and 40-43 illustrate how the cowl recesses 1400 facilitate relative movement of the body 770 and the cab 40 without the lift assembly 140 contacting the cowl assembly 1010. In each of these figures, the lift assembly 140 is in a lowered position, bringing the lift arms 142 and the corresponding actuators in close proximity to the cowl assembly 1010.

Figure 40:
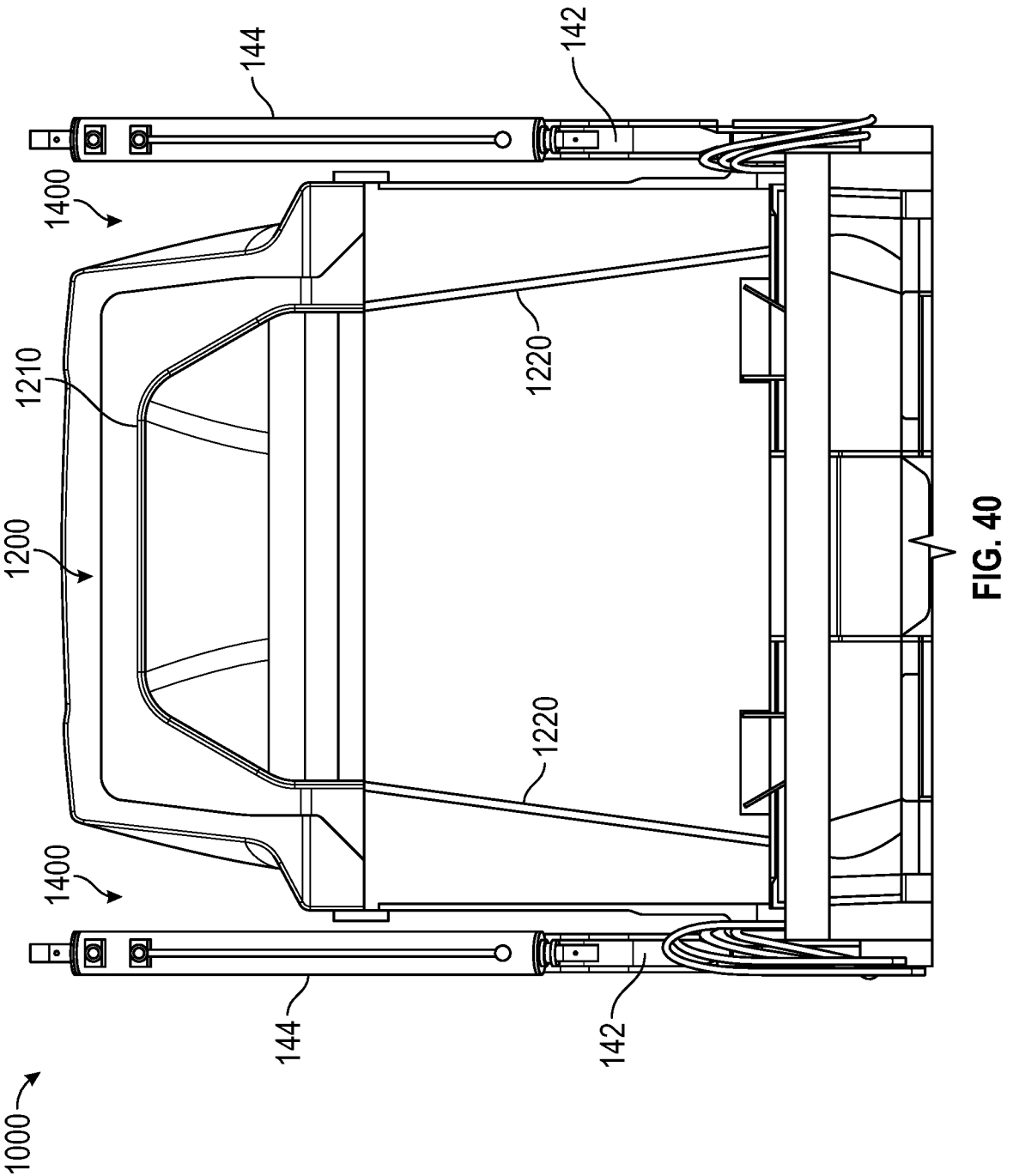
FIGS. 40 and 41 are various views of the vehicle of FIG. 26 in an unstressed state.
Figure 41:
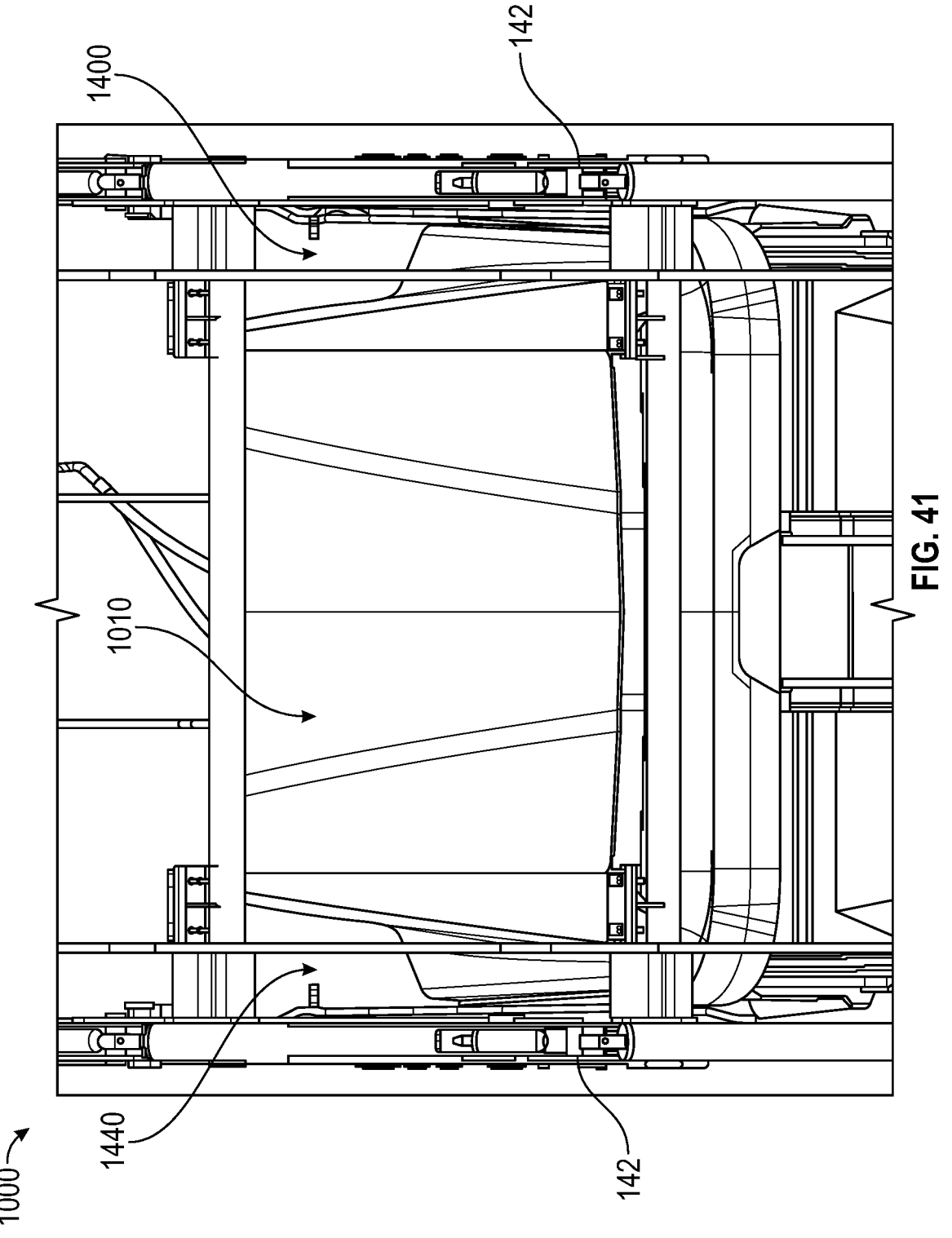

FIGS. 40 and 41 illustrate the vehicle 1000 in a neutral or unstressed state in which the body 770 is minimally twisted relative to the cab 40 (e.g., in which the frame rails of the chassis 20 are straight). In this state, the cowl assembly 1010 is approximately centered between the lift arms 142, and the lift arms 142 are not received by the cowl recesses 1400. Accordingly, in the neutral state, clearance between the lift arms 142 and the cowl assembly 1010 can be achieved, even without the cowl recesses 1400.

Figure 42:
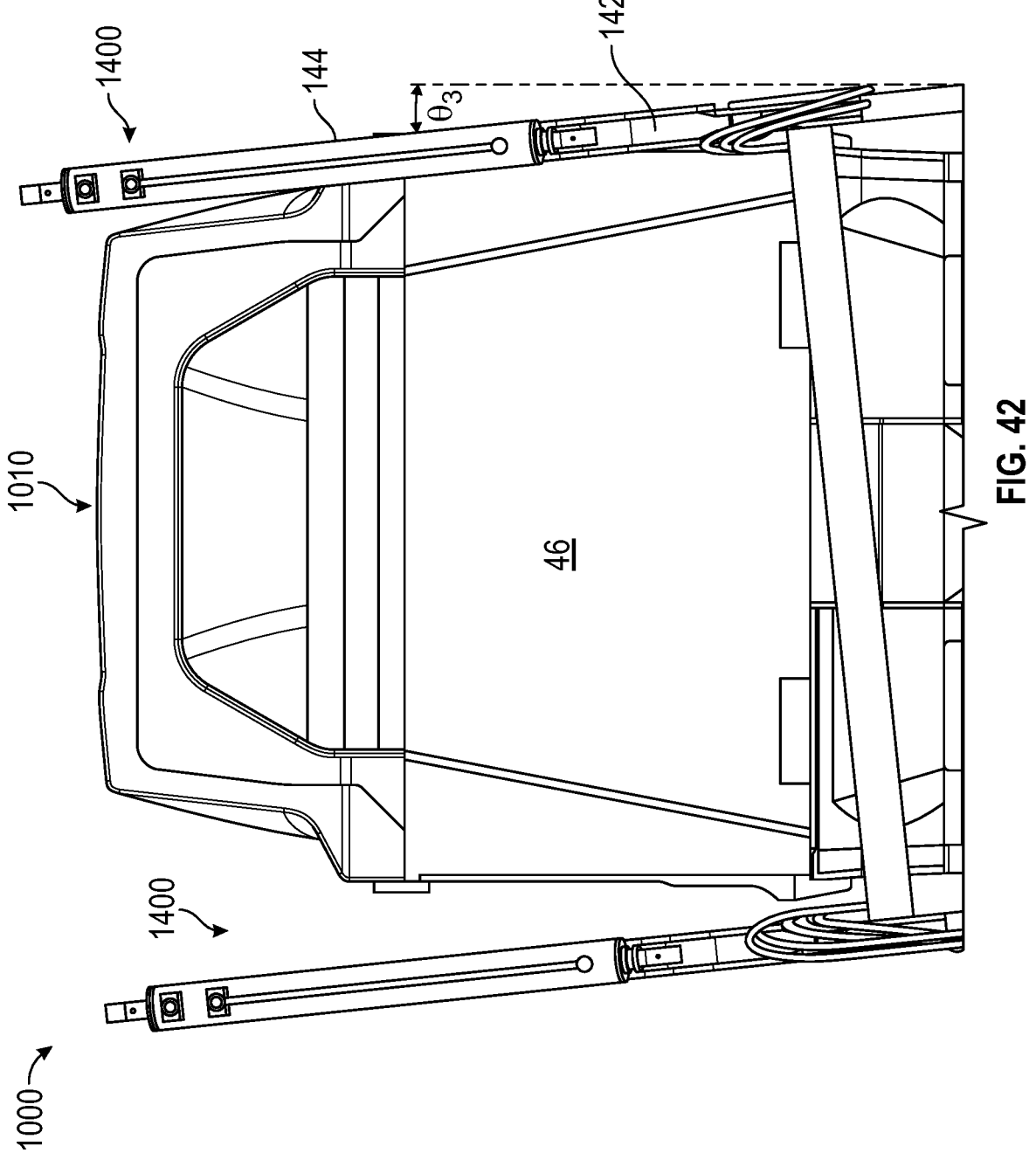
FIGS. 42 and 43 are various views of the vehicle of FIG. 26 in a twisted state.
Figure 43:
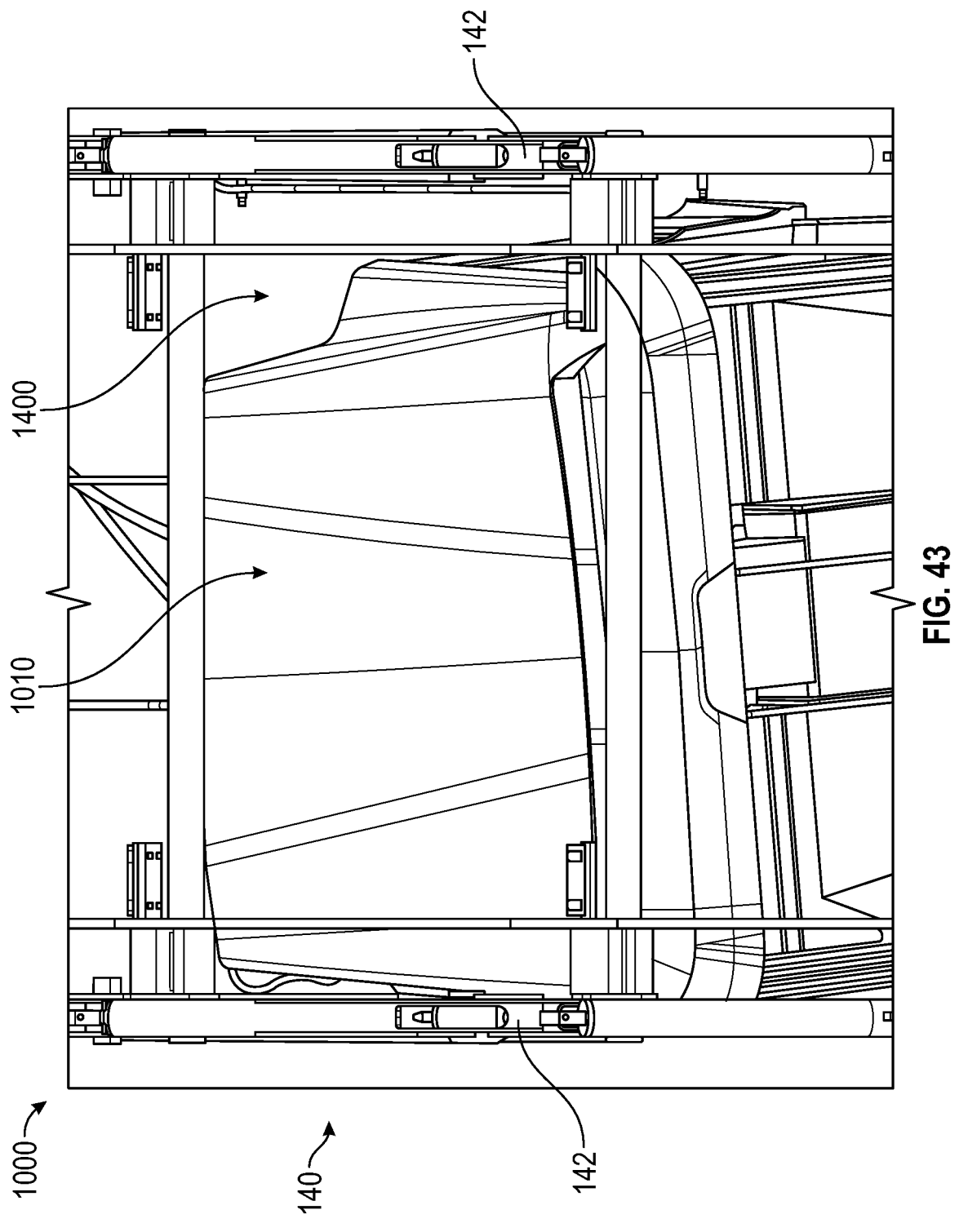

FIGS. 27, 42, and 43 illustrate the vehicle 1000 in a stressed or twisted state in which the chassis 20 twists, causing relative movement between (a) the body 770 and the lift assembly 140 and (b) the cab 40. Specifically, (a) the body 770 and the lift assembly 140 rotates relative to (b) the cab 40 about a longitudinal axis (e.g., laterally centered on the vehicle 10, positioned below the cab 40, positioned within the chassis 20, positioned below the body 770, etc.). Specifically, as shown in FIG. 42, the relative angle of twist between the body 770 and the cab 40 is shown as angle $\theta_3$. The angle $\theta_3$ shown in FIG. 42 may represent the maximum twist angle that the vehicle 1000 would experience in normal operation. By way of example, the angle $\theta_3$ may be between 1 degree and 30 degrees, between 5 degrees and 20 degrees, between 10 degrees and 15 degrees, etc.

As shown in FIGS. 27, 42, and 43, in the twisted state, the lift assembly 140 (e.g., one of the lift arms 142) is received within one of the cowl recesses 1400. Specifically, one of the lift arms 142 is received within the cowl recess 1400 on the driver side of the vehicle 1000. It should be understood that the cowl recesses 1400 may be symmetrical with one another, such that the vehicle 1000 is capable of addressing an opposite twisting state (e.g., one of the lift arms 142 is received within a cowl recess 1400 on the passenger side of the vehicle 1000). The cowl recess 1400 is sufficiently sized that the lift assembly 140 does not contact the cowl assembly 1010 in the twisted state. By way of example, in some embodiments, the angle $\theta_3$ is greater than or equal to the angle $\theta_2$ to provide angular clearance for the lift arms 142.

Because the rear shroud 792 is coupled directly to the body 770, the rear shroud 792 moves with the body 770 in the event of a twisting of the chassis 20. Accordingly, even if the cab 40 twists about the longitudinal axis relative to the body 770, the rear shroud 792 remains stationary relative to the body 770. As such, the lateral positions of the lift arms 142 relative to the rear shroud 792 remain substantially constant throughout operation of the vehicle 1000. Because of this consistent positioning, the rear recess portion 1404 may be shallower than the front recess portion 1402 while still avoiding contact between the lift arms 142 and the rear shroud 792. In other words, a lateral width of the rear shroud 792 adjacent the lift arms 142 (e.g., a distance between the body interface surfaces 1422) may be larger than a lateral width of the front shroud 790 adjacent the lift arms 142 (e.g., a distance between the side surfaces 1414) for a given position of the lift assembly 140.

However, it may be advantageous (e.g., for aesthetics, for improved aerodynamics, etc.) for the surfaces of the front recess portion 1402 to be continuous with the surfaces of the rear recess portion 1404. The transition surface 1424 may facilitate this continuous transition between the surfaces. By way of example, the transition surface 1424 may align with the corresponding side surface 1414, transition surface 1412, and cab interface surface 1410.

Transition Door Assembly

Figure 44:
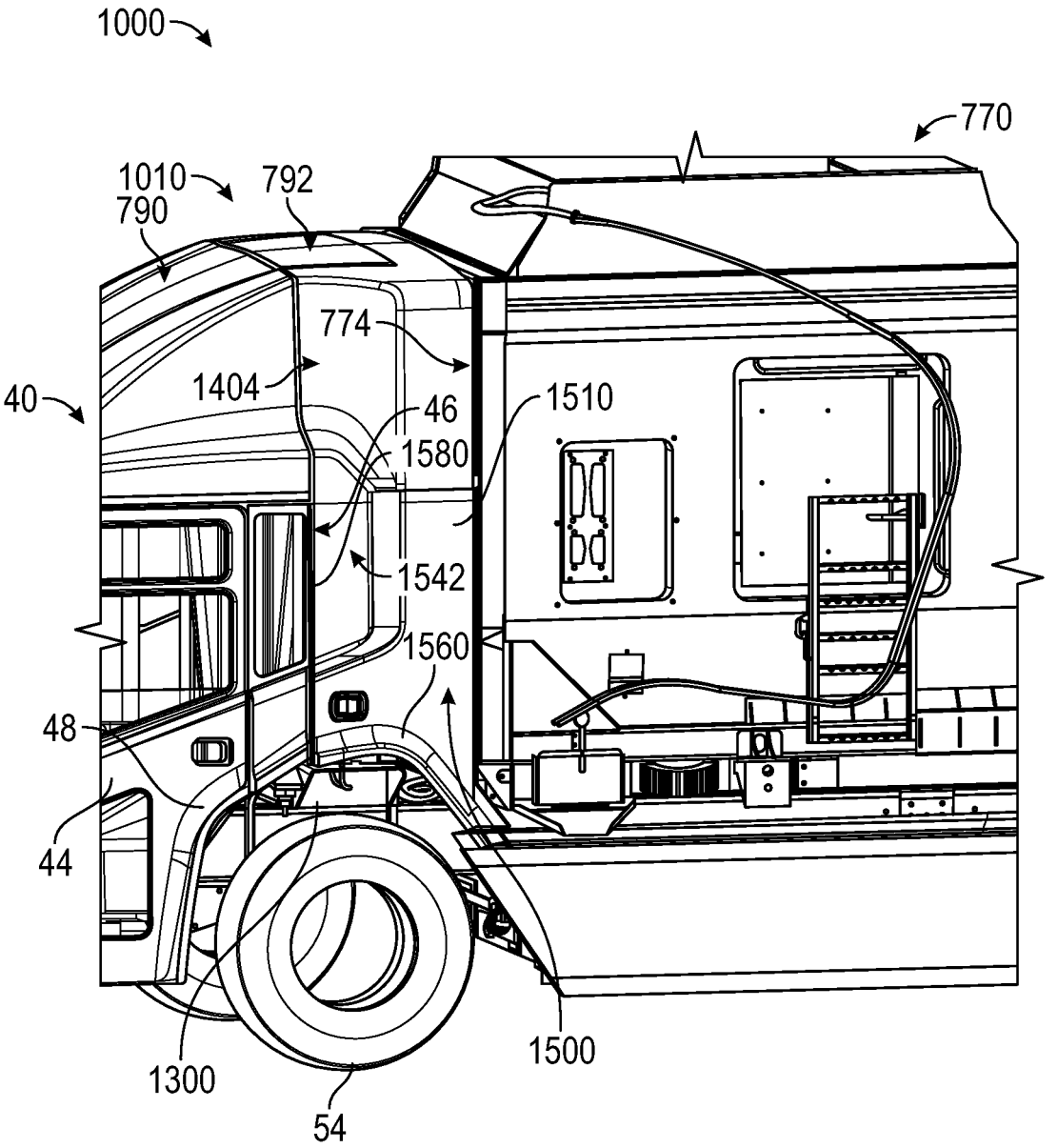
FIG. 44 is a perspective view of the vehicle of FIG. 26 including a transition door assembly, according to an exemplary embodiment.
Figure 45:
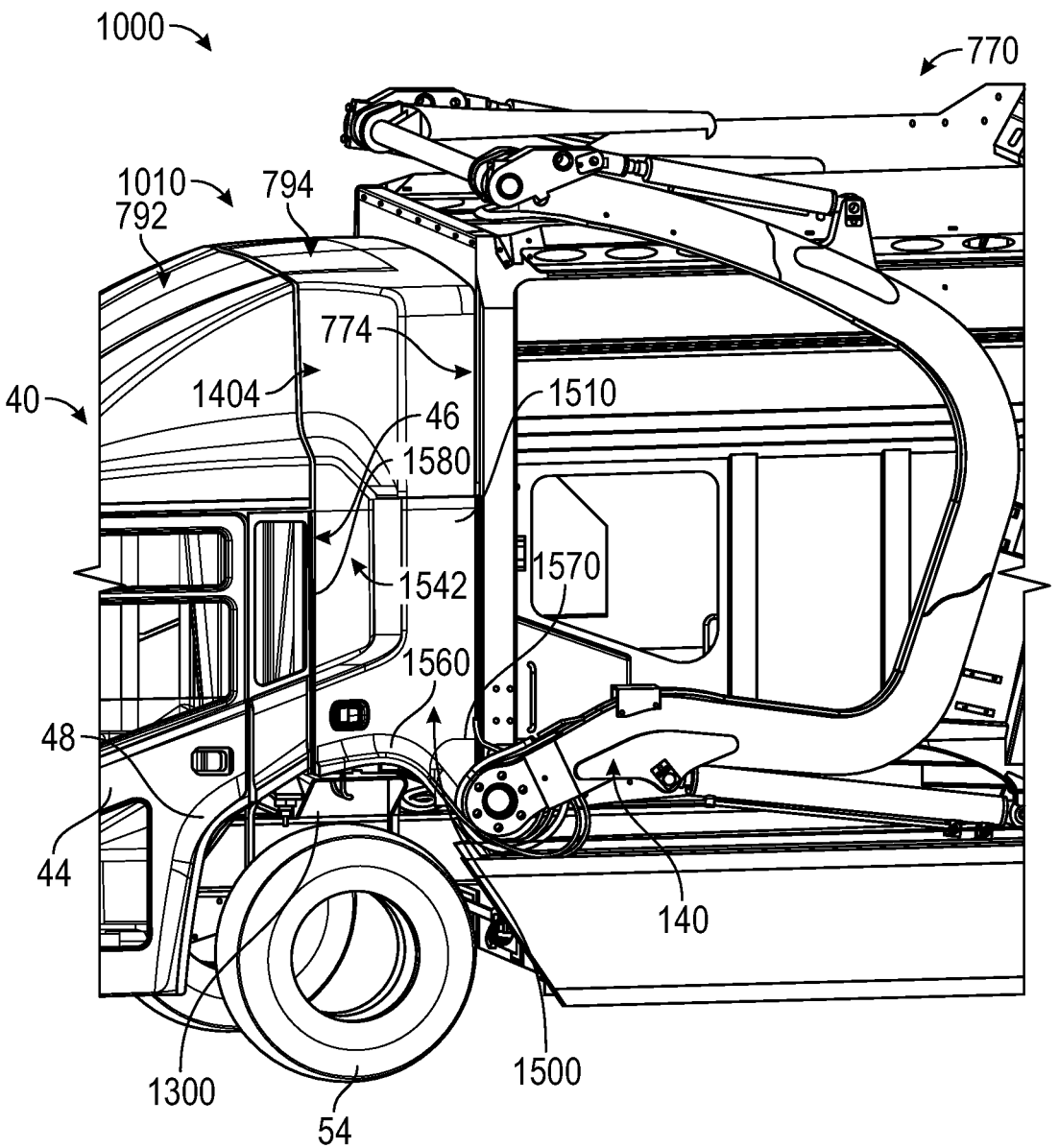
FIG. 45 is a perspective view of the vehicle of FIG. 44 including the transition door assembly, according to another exemplary embodiment.

As shown in FIGS. 44 and 45, the vehicle 1000 includes a side or transition door system, shown as transition door assembly 1500, positioned between the cab 40 and the body 770. More specifically, the transition door assembly 1500 is positioned (i) between the rear wall 46 of the cab 40 and the front wall 774 of the body 770, (ii) rearward of the cab door 44 of the cab, (iii) beneath the rear shroud 792 of the cowl assembly 1010, (iv) forward of the lift assembly 140 (if a front-loading refuse vehicle including the lift assembly 140 like shown in FIG. 45), and (v) above and in front of the step assembly 1300.

As shown in FIGS. 44-55, the transition door assembly 1500 includes (i) a door panel, shown as transition door 1510, (ii) a support assembly, shown as support structure 1600, and (iii) a latch and actuator system, shown as latch and actuator assembly 1700. As shown in FIGS. 46-51, the transition door 1510 has a first edge, shown as upper edge 1512, a second edge, shown as bottom edge 1514, a third edge, shown as rear edge 1516, and a fourth edge, shown as front edge 1518. As shown in FIGS. 46-49, the transition door 1510 includes a first panel portion, shown as main door panel portion 1520, a second panel portion, shown as recessed door panel portion 1530, and a third panel portion, shown as angled door panel portion 1540, extending between the main door panel portion 1520 and the recessed door panel portion 1530. The angled door panel portion 1540 is angled inward toward the center of the vehicle 1000 such that the recessed door panel portion 1530 is offset inward relative to the main door panel portion 1520, defining a recessed cavity, shown as recess 1542. According to the exemplary embodiment shown in FIGS. 44 and 45, the transition door 1510 is aligned with the rear shroud 792 of the cowl assembly 1010 such that the recess 1542 at least partially corresponds to and aligns with the rear recess portion 1404 defined by the rear shroud 792.

Figure 46:
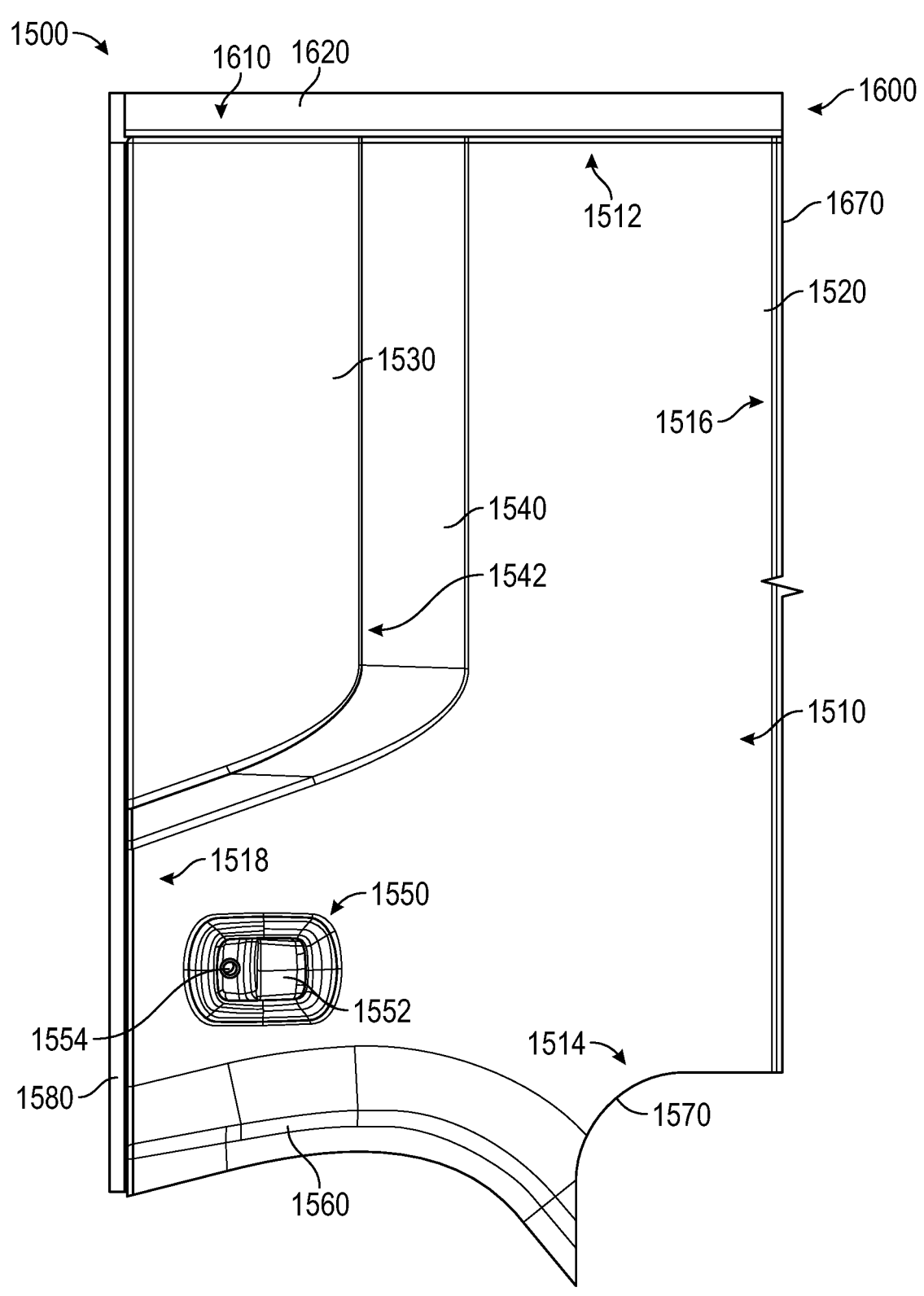
FIG. 46 is a front view of the transition door assembly of FIGS. 45 and 46, according to an exemplary embodiment.
Figure 47:
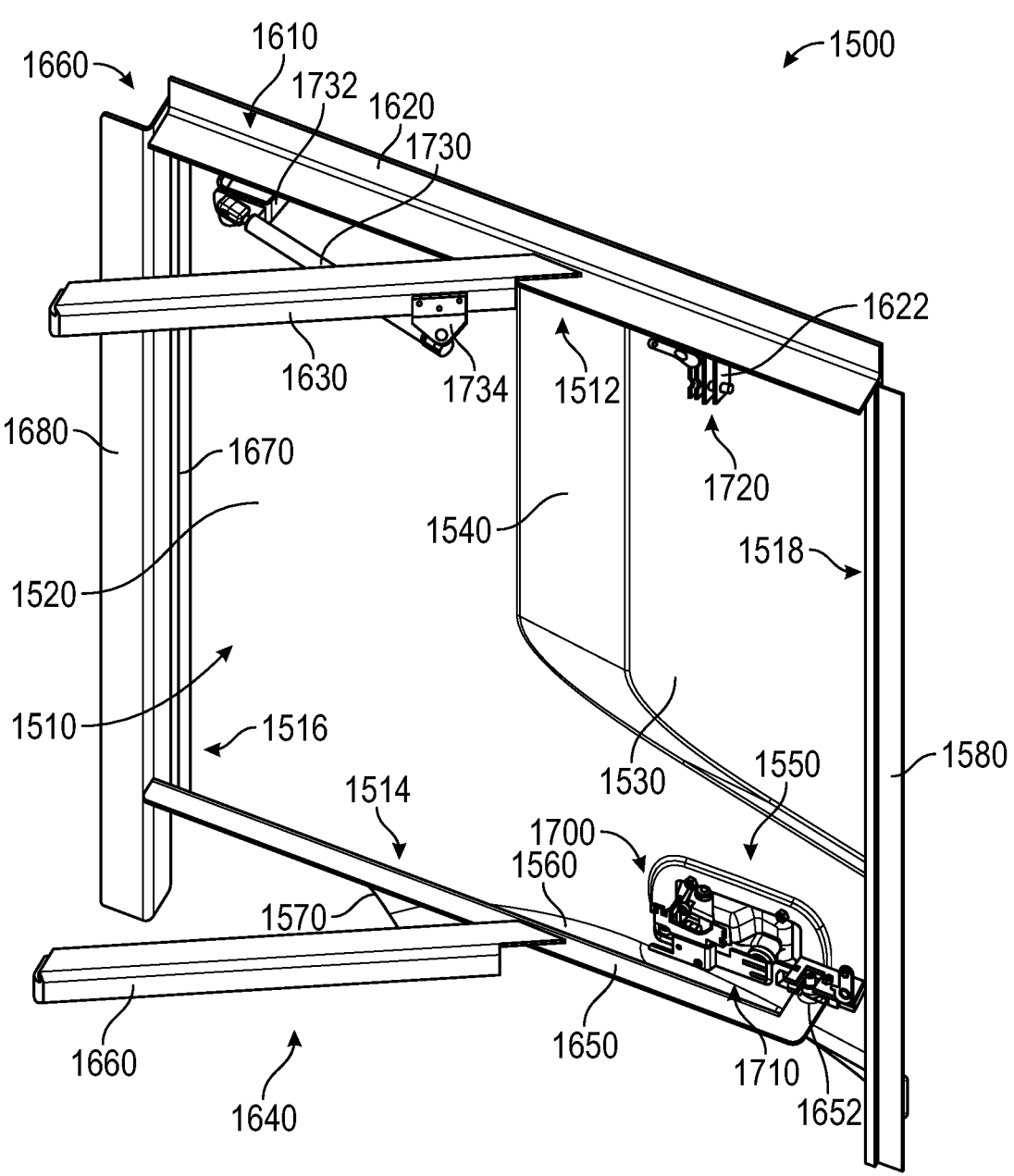
FIG. 47 is a rear perspective view of the transition door assembly of FIG. 46, according to an exemplary embodiment.
Figure 48:
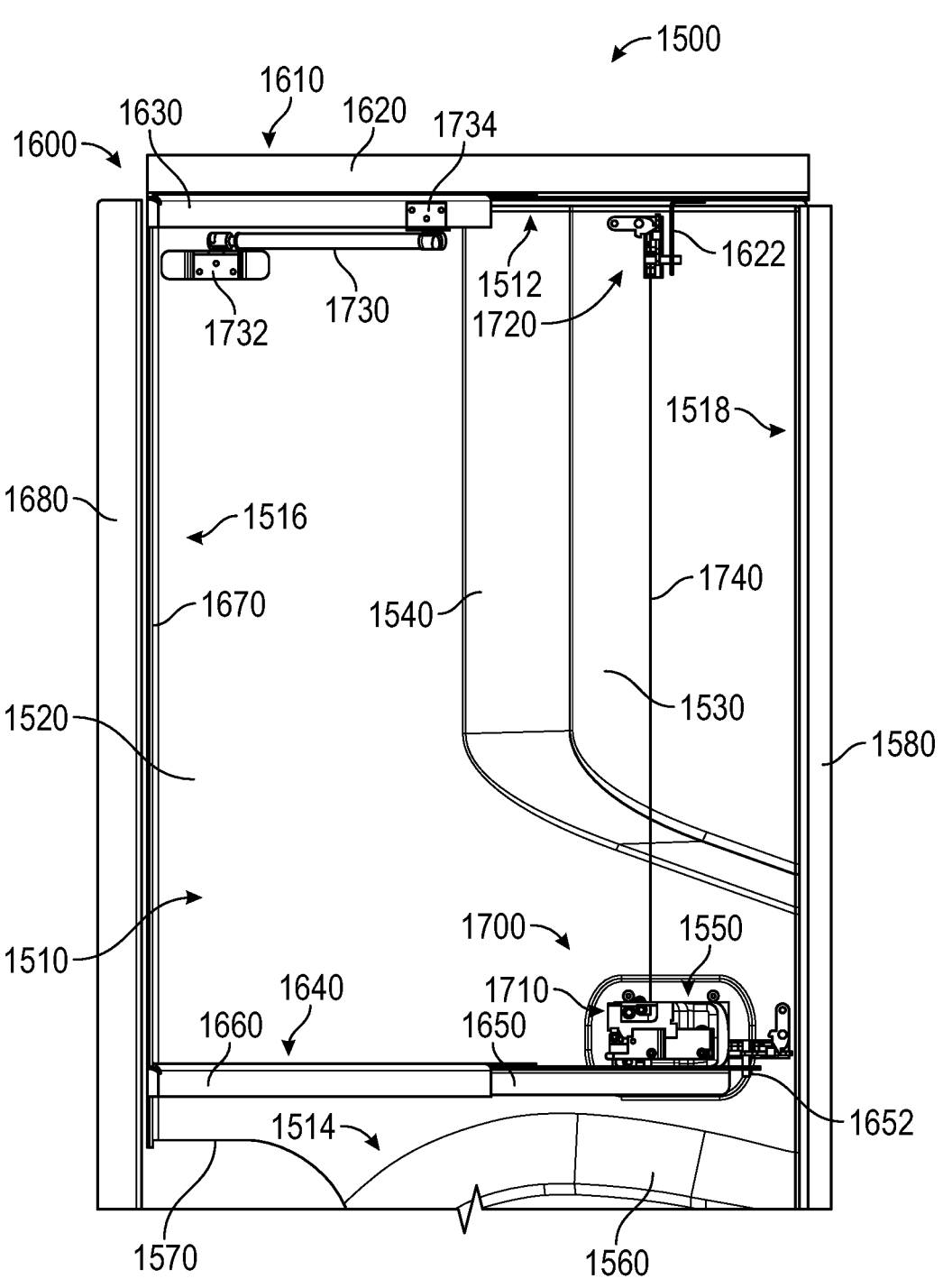
FIG. 48 is a rear view of the transition door assembly of FIG. 46, according to an exemplary embodiment.
Figure 53:
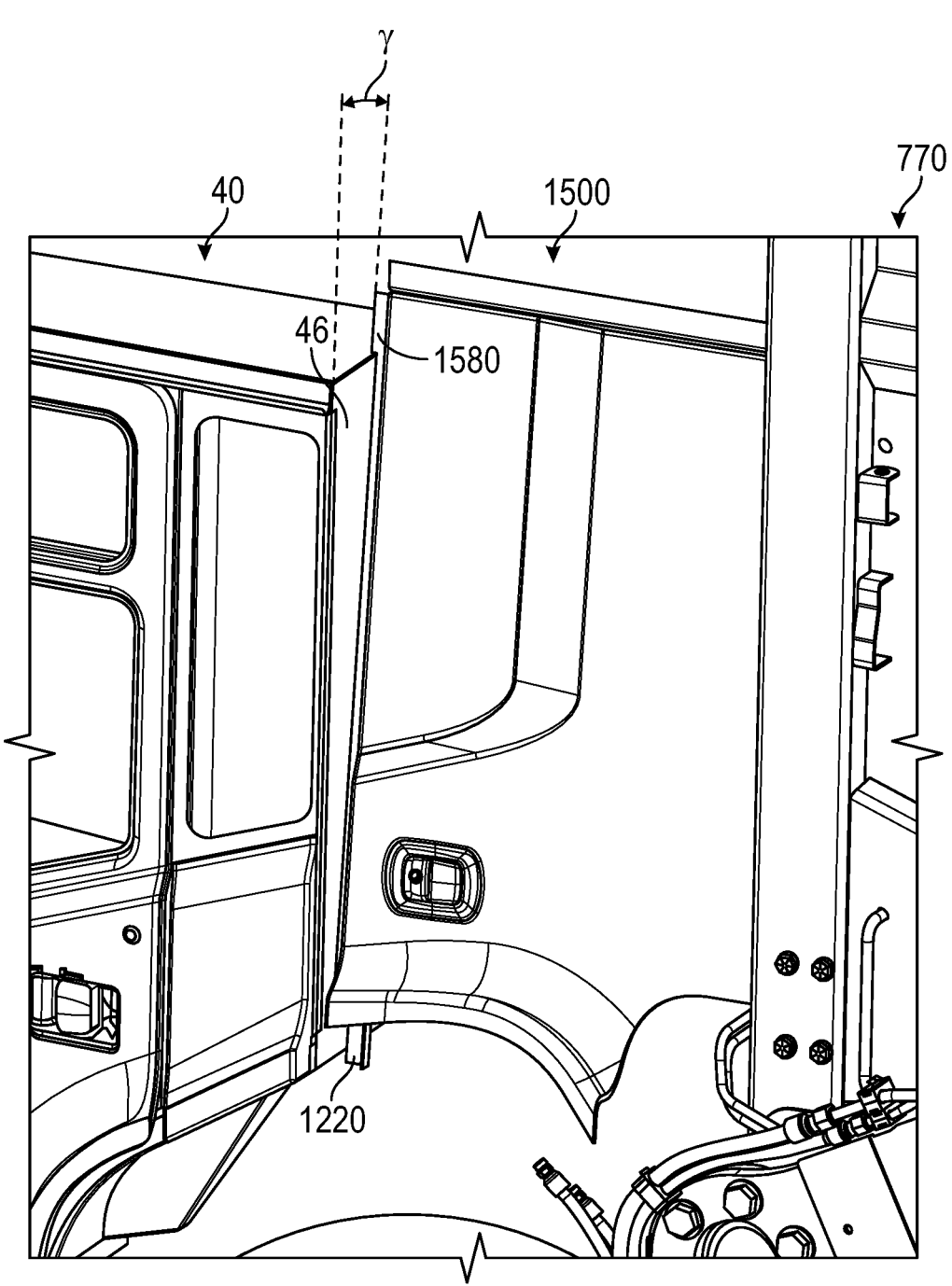
FIG. 53 is a perspective view of the transition door assembly articulating relative to a cab of the vehicle of FIG. 45, according to an exemplary embodiment.
Figure 54:
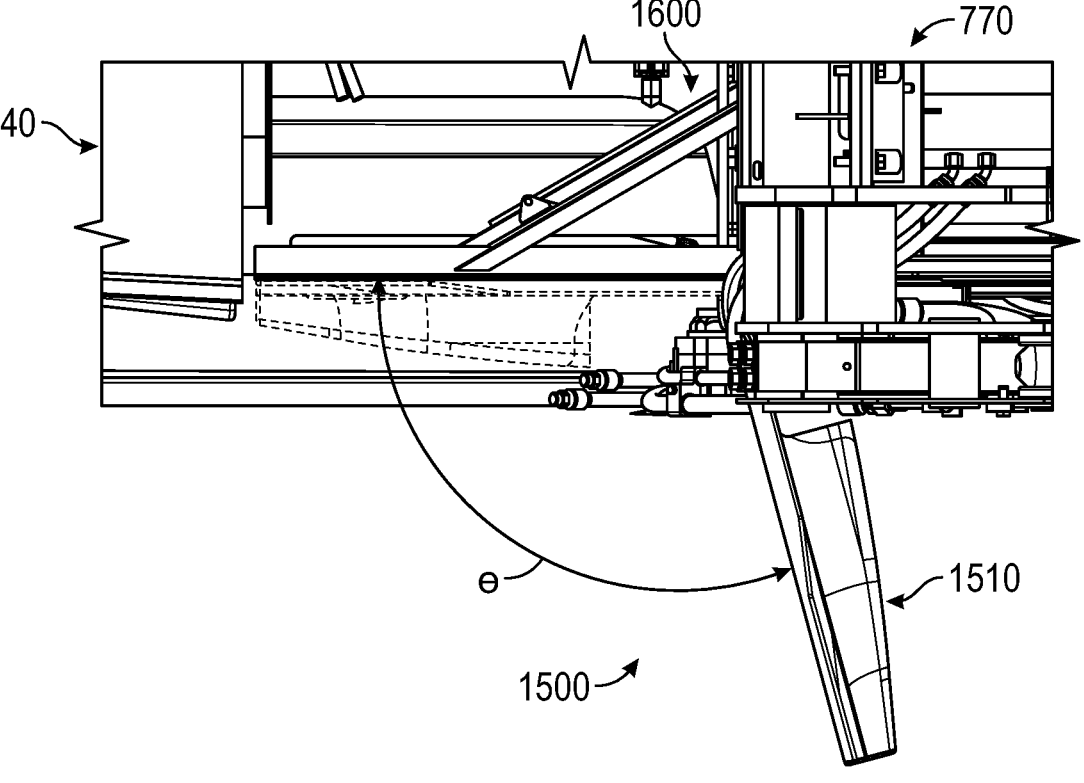
FIG. 54 is a top view of the transition door assembly of FIG. 45 with a door thereof in a fully open position, according to an exemplary embodiment.

As shown in FIGS. 46-48, the transition door 1510 includes a handle actuator assembly, shown as handle assembly 1550, positioned along the main door panel portion 1520 of the transition door 1510. As shown in FIG. 46, the handle assembly 1550 includes a handle actuator, shown as door handle 1552, and a locking mechanism, shown as door lock 1554. According to an exemplary embodiment, actuating the door handle 1552 is configured to release the transition door 1510 from the support structure 1600 such that the transition door 1510 can be repositioned from a closed orientation (as shown in FIGS. 44,45,50,51, and 53) to an open orientation (as shown in FIG. 54), as described in more detail herein. According to an exemplary embodiment, the door lock 1554 is configured to facilitate selectively locking the transition door 1510 in the closed orientation. In some embodiments, the handle assembly 1550 does not include the door handle 1552 and/or the door lock 1554 (see, e.g., FIG. 56).

As shown in FIGS. 44-48 and 50, a bottom edge of the cab door 44 defines a first portion, shown as front fender portion 48, of a portion of a wheel fender and/or wheel well of the vehicle 1000 and the bottom edge 1514 of the transition door 1510 defines a second portion, shown as rear fender portion 1560, of a portion of the wheel fender and/or wheel well of the vehicle 1000. Accordingly, as shown in FIGS. 44 and 45, the front fender portion 48 of the cab door 44 and the rear fender portion 1560 of the transition door 1510 cooperate to provide the wheel fender and/or wheel well for the vehicle 1000. As shown in FIGS. 45-48 and 50, the bottom edge 1514 and the rear edge 1516 of the transition door 1510 define a cutout, shown as arm notch 1570, positioned such that the transition door 1510 clears a portion of the lift assembly 140 (i.e., the pivoting connection point of the lift arms 142 to the body 770) when the transition door 1510 is pivoted into the open orientation. In some embodiments, as shown in FIG. 44, the transition door 1510 does not define the arm notch 1570 (e.g., when the vehicle 1000 does not include the lift assembly 140, in a side-loading refuse vehicle implementation, etc.). As shown in FIGS. 44-48, 50, and 51, the transition door 1510 includes an elastic seal, shown as wiper 1580, positioned along the front edge 1518 of the transition door 1510. According to an exemplary embodiment, the wiper 1580 is manufactured from an elastic material such as rubber or other suitable material.

As shown in FIGS. 46-52, the support structure 1600 includes (i) a first support assembly, shown as upper support assembly 1610, (ii) a second support assembly, shown as lower support assembly 1640, (iii) a pivotable coupler or hinge, shown a piano hinge 1670, and, in some embodiments (e.g., in a side-loader embodiment), (iv) a bracket, shown as L-channel bracket 1680. In some embodiments, the support structure 1600 does not include the lower support assembly 1640 (see, e.g., FIG. 56).

Figure 49:
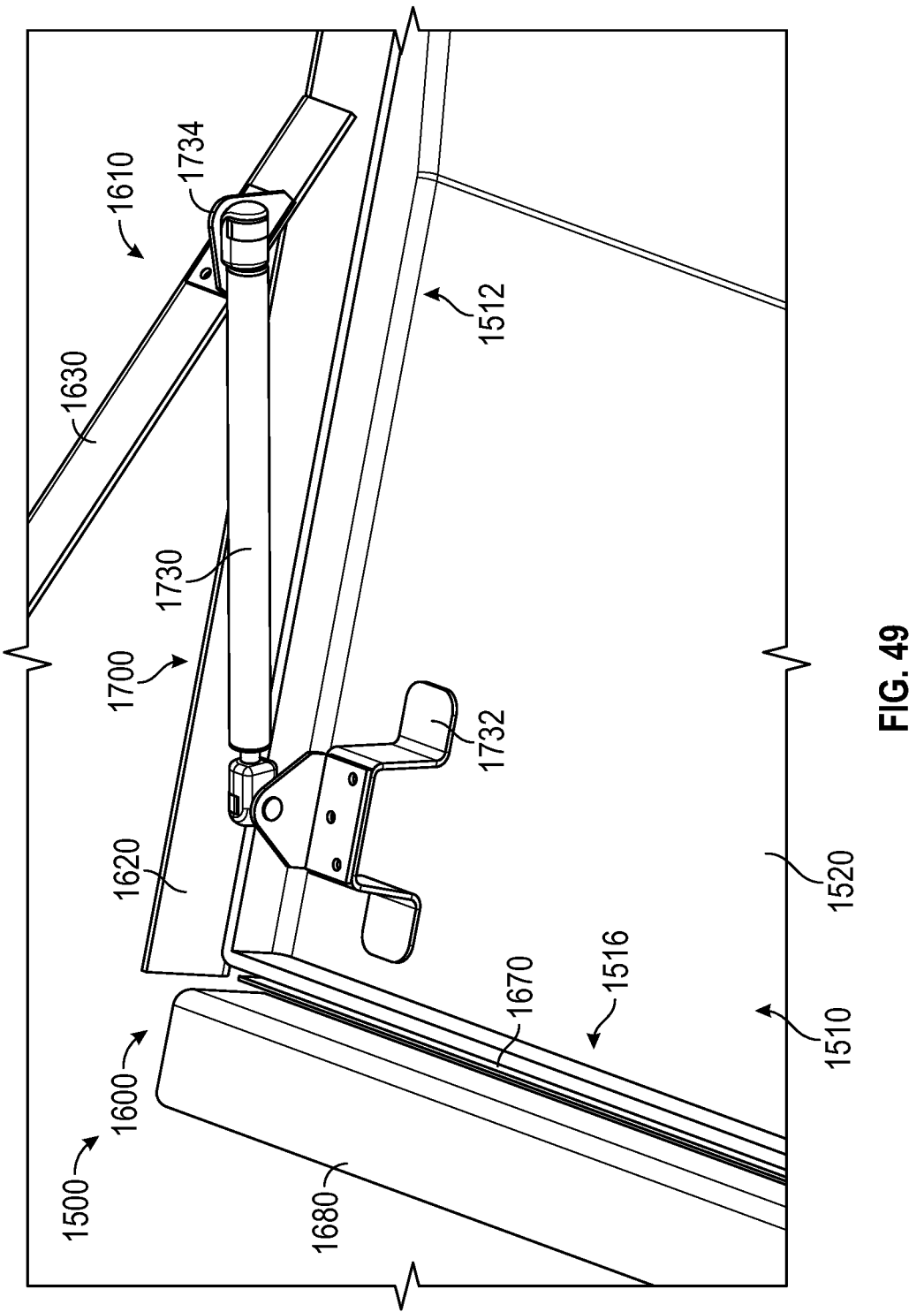
FIG. 49 is a detailed rear perspective view of the transition door assembly of FIG. 46, according to an exemplary embodiment.
Figure 50:
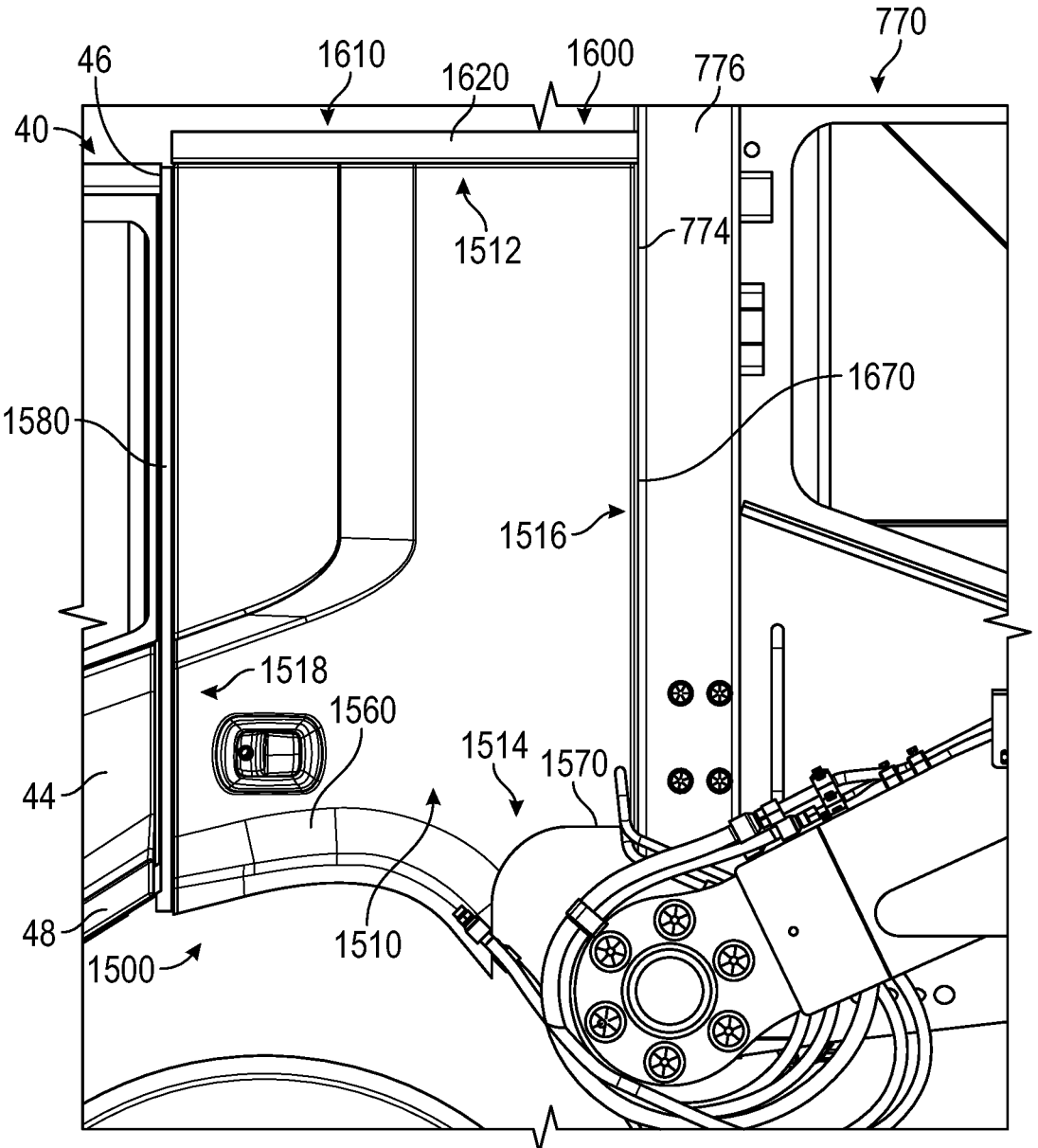
FIGS. 50-52 are various views of a support structure of the transition door assembly of FIG. 46 coupling the transition door assembly to the vehicle of FIGS. 45, according to an exemplary embodiment.
Figure 51:
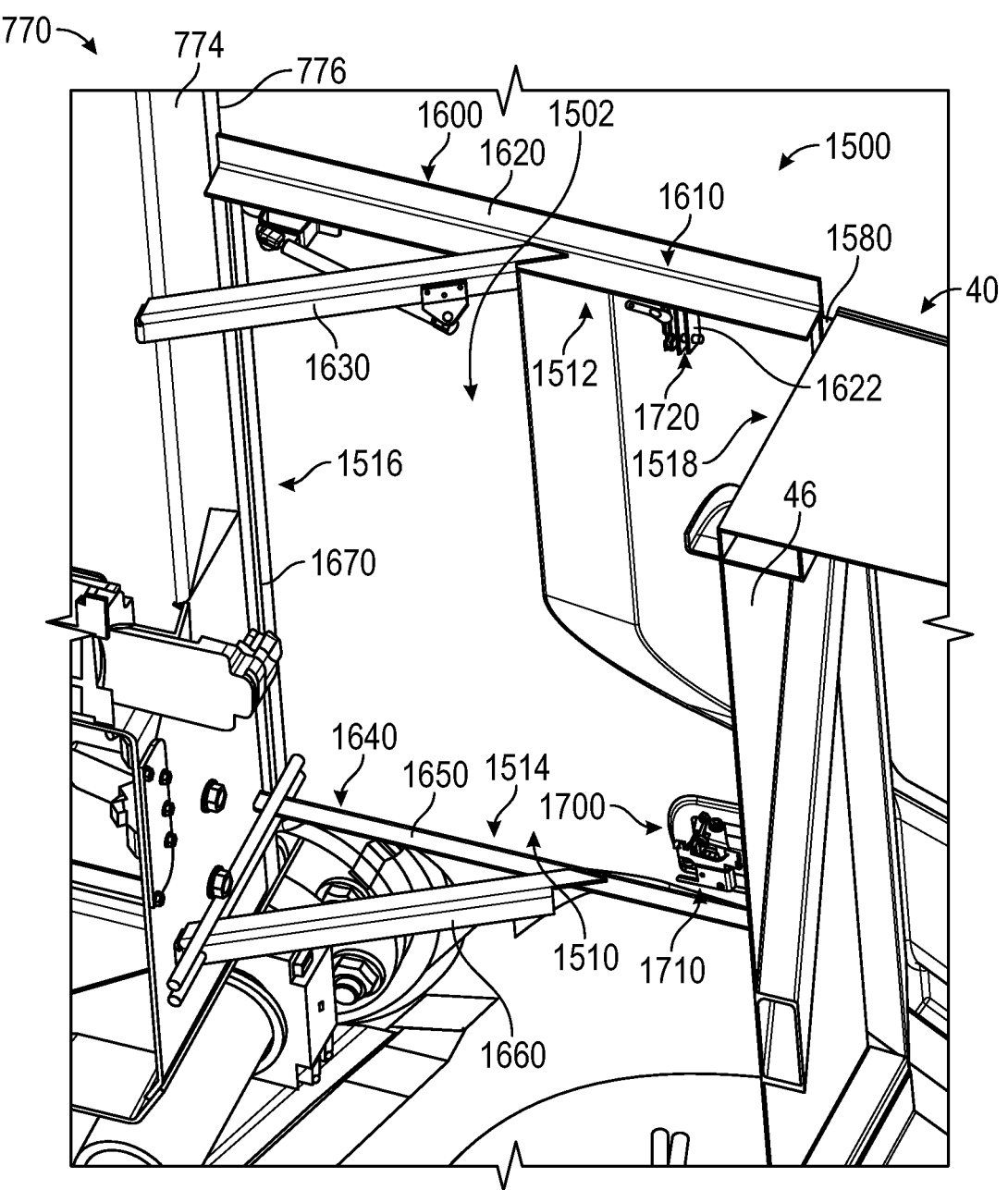

As shown in FIGS. 46-51, the upper support assembly 1610 includes (i) a first cantilevered bracket or arm, shown as upper cantilevered arm 1620, extending from the front wall 774 of the body 770 and (ii) a first support member or tube, shown as upper support 1630, extending between the front wall 774 of the body 770 and the upper cantilevered arm 1620 (e.g., at a position away from the free end of the upper cantilevered arm 1620, proximate a midpoint thereof, etc.). As shown in FIGS. 47,48, and 51, the upper cantilevered arm 1620 includes a first latch interface, shown as upper latch retainer 1622, coupled to and extending downward from the upper cantilevered arm 1620 (e.g., proximate the free end of the upper cantilevered arm 1620, at a position between the free end of the upper cantilevered arm 1620 and the interface between the upper support 1630 and the upper cantilevered arm 1620, etc.). In an alternative embodiment, the upper latch retainer 1622 is coupled to the rear shroud 792 of the cowl assembly 1010.

As shown in FIGS. 47,48, and 51, the lower support assembly 1640 includes (i) a second cantilevered bracket or arm, shown as lower cantilevered arm 1650, extending from the front wall 774 of the body 770 and (ii) a second support member or tube, shown as lower support 1660, extending between the front wall 774 of the body 770 and the lower cantilevered arm 1650 (e.g., at a position away from the free end of the lower cantilevered arm 1650, proximate a midpoint thereof, etc.). As shown in FIGS. 47,48, and 51, the lower cantilevered arm 1650 includes a second latch interface, shown as lower latch retainer 1652, coupled to and extending upward from the lower cantilevered arm 1650 (e.g., proximate the free end of the lower cantilevered arm 1650, at a position between the free end of the lower cantilevered arm 1650 and the interface between the lower support 1660 and the lower cantilevered arm 1650, etc.).

Figure 52:
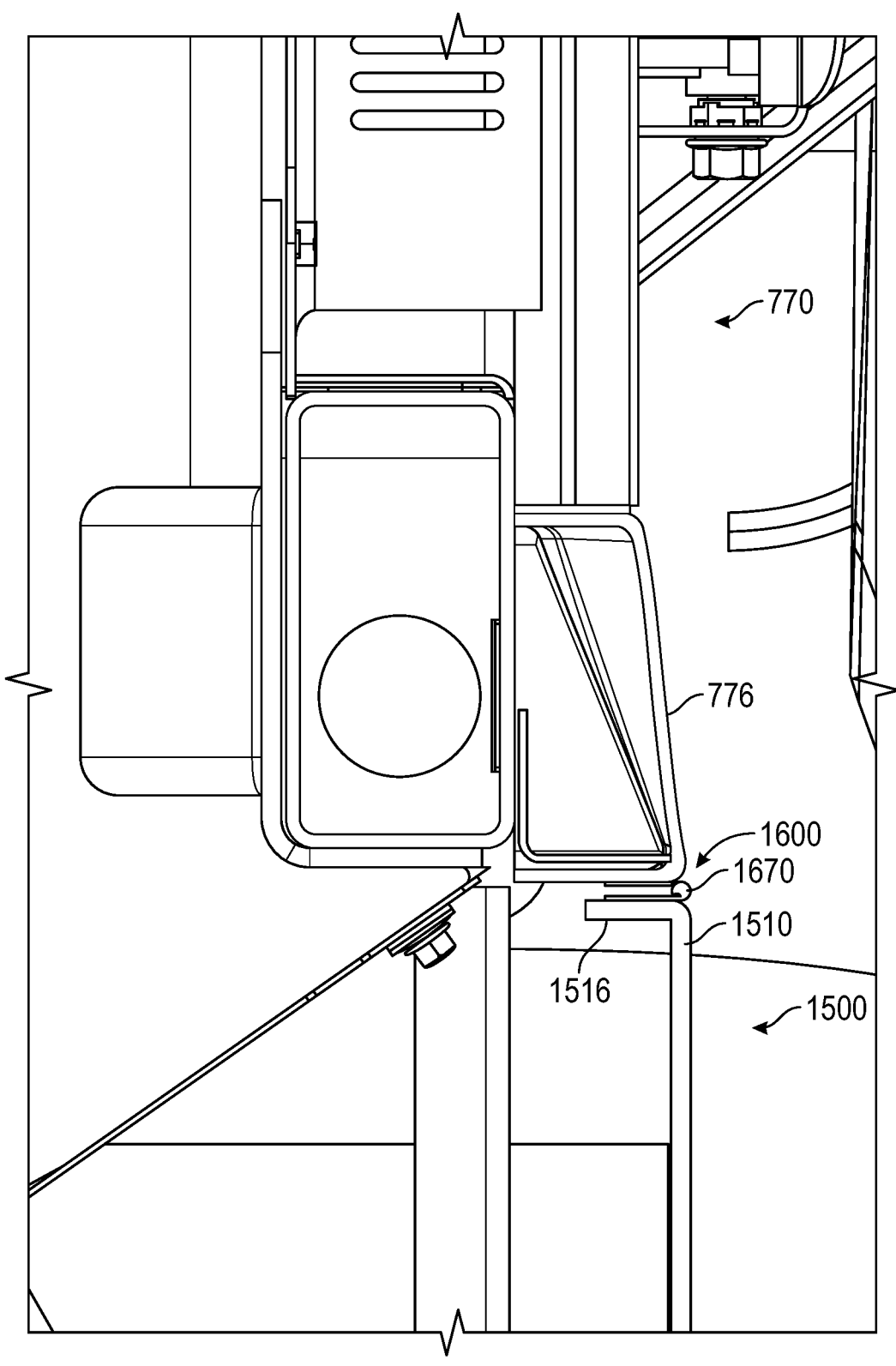

As shown in FIGS. 46-52, the piano hinge 1670 extends along the substantial majority or the entirety of the rear edge 1516 of the transition door 1510 and is positioned to pivotably couple the rear edge 1516 of the transition door 1510 to the body 770. In other embodiments, the piano hinge 1670 is replaced with a plurality of smaller hinges. As shown in FIGS. 50-52, the piano hinge 1670 directly couples the rear edge 1516 of the transition door 1510 to a body support, shown as body tube 776, positioned at a front corner of the front wall 774 of the body 770. In some embodiments (e.g., a side-loader embodiment), as shown in FIGS. 47-49, the L-channel bracket 1680 extends along the rear edge 1516 of the transition door 1510 with the piano hinge 1670 positioned to pivotably couple the rear edge 1516 of the transition door 1510 directly to the L-channel bracket 1680. According to an exemplary embodiment, the L-channel bracket 1680 is configured to couple directly to a portion of the body 770 to facilitate coupling the transition door 1510 to the body 770.

As shown in FIGS. 47-49 and 51, the latch and actuator assembly 1700 includes (i) a first latching mechanism, shown as lower latch 1710, coupled to the handle assembly 1550, (ii) a second latching mechanism, shown as upper latch 1720, coupled to a rear side of the recessed door panel portion 1530 of the transition door 1510, and (iii) an actuator, shown as door actuator 1730, extending between a first interface, shown as door bracket 1732, coupled to a rear side of the main door panel portion 1520 of the transition door 1510 and a second interface, shown as support bracket 1734, positioned along the upper support 1630. In some embodiments, the latch and actuator assembly 1700 does not include the support bracket 1734 (see, e.g., FIGS. 56 and 57)

Figure 56:
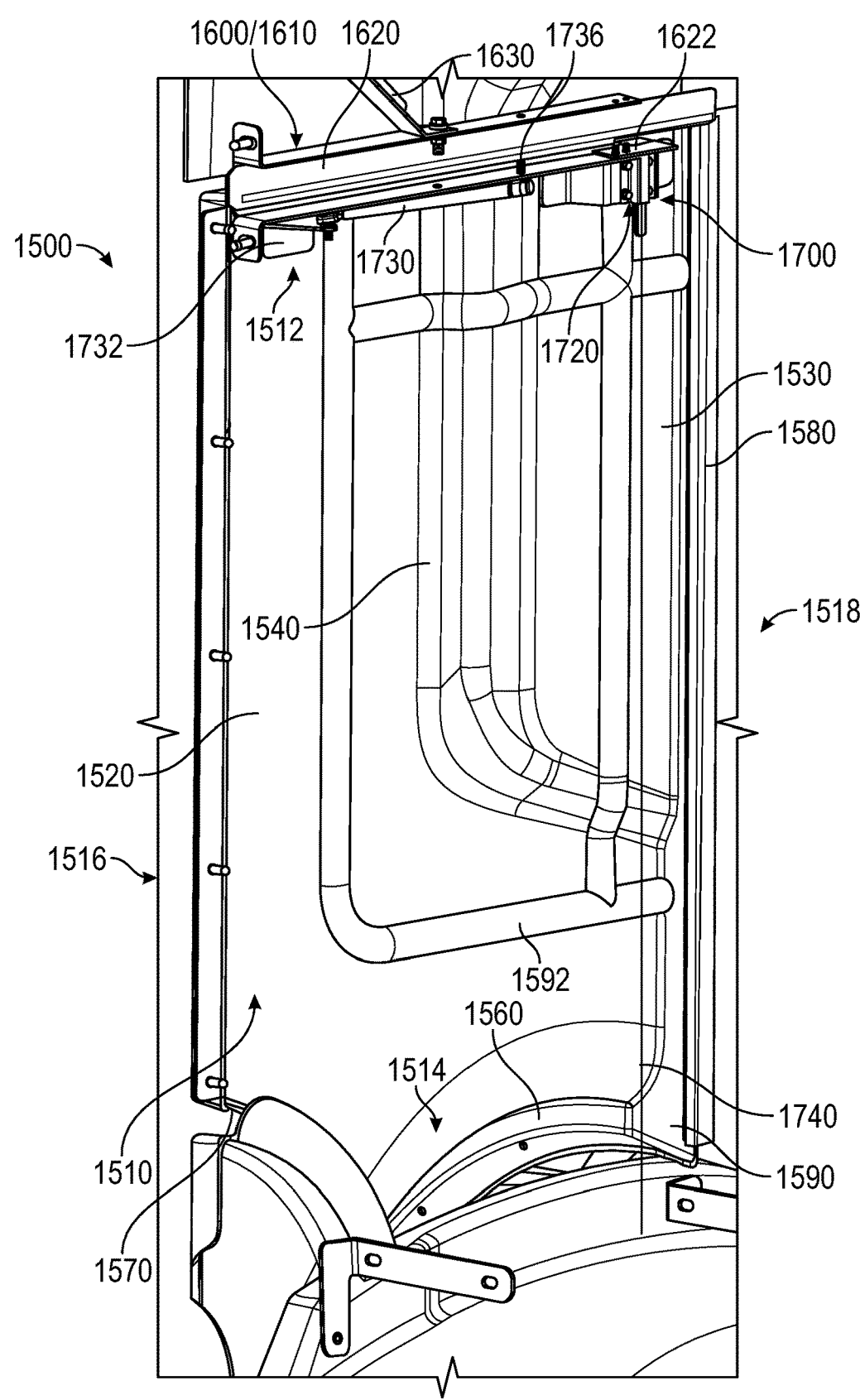
FIG. 56 is a rear perspective view of the transition door assembly of FIGS. 45 and 46, according to another exemplary embodiment.

As shown in FIGS. 47, 48, and 51, the upper latch 1720 is positioned to engage with the upper latch retainer 1622 and the lower latch 1710 is positioned to engage with the lower latch retainer 1652 to secure the transition door 1510 in the closed orientation such that the transition door 1510 is positioned to extend across a gap, shown as intermediate gap 1502, defined between the rear wall 46 of the cab 40 and the front wall 774 of the body 770. In some embodiments, the transition door assembly 1500 does not include one of (i)

the upper latch 1720 and the upper latch retainer 1622 or (ii) the lower latch 1710 and the lower latch retainer 1652 (see, e.g., FIG. 56).

As shown in FIG. 48, a cable, shown as latch cable 1740, extends between the lower latch 1710 and the upper latch 1720. According to an exemplary embodiment, engagement of the door handle 1552 causes the lower latch 1710 to (i) disengage from the lower latch retainer 1652 and (ii) pull on the latch cable 1740, causing the upper latch 1720 to disengage from the upper latch retainer 1622, thereby permitting the transition door 1510 to be pivoted relative to the body 770 about the piano hinge 1670 from the closed orientation to the open orientation to facilitate accessing the storage compartment 1012 positioned between the cab 40 and the body 770 (e.g., by climbing onto the step assembly 1300 and going through the intermediate gap 1502). In some embodiments, the lower latch 1710 and/or the upper latch 1720 include bumpers to provide vibration dampening. As shown in FIGS. 44, 45, 50, 51, and 53, the wiper 1580 is positioned to engage with the rear wall 46 of the cab 40 when the transition door 1510 is in the closed orientation (e.g., providing a seal). In some embodiments, a slight gap (e.g., a 1 inch gap, a 0.5 inch gap, etc.) is present between the rear wall 46 of the cab 40 and the wiper 1580 when the transition door 1510 is in the closed orientation.

According to an exemplary embodiment, the door actuator 1730 is a pneumatic or gas spring actuator. In one embodiment, the door actuator 1730 is a dual acting actuator that is configured to bias the transition door 1510 both closed and open. The door actuator may be, for example, a compression gas spring. By way of example, the door actuator 1730 may require (i) about 7 pounds of force to open the transition door 1510 from the closed orientation to the open orientation and (ii) about 14.5 pounds of force to close the transition door 1510 from the open orientation to the closed orientation. In another embodiment, the door actuator 1730 is a single acting actuator that is configured to bias the transition door 1510 toward either the open orientation or the closed orientation. According to an exemplary embodiment, the door actuator 1730 is configured to hold the transition door 1510 in the open orientation in up to 30 mph winds.

According to an exemplary embodiment, the transition door assembly 1500 is not physically coupled to the cab 40, thereby permitting movement (e.g., pitch, roll, etc.) between the cab 40 and the body 770. Accordingly, as shown in FIG. 53, the transition door assembly 1500 is configured to move with the body 770 as the body 770 and the cab 40 move relative to one another. According to an exemplary embodiment, the lower channel portions 1220 of the drip channel assembly 1200 are angled along the rear wall 46 of the cab 40 to provide increased clearance for the transition door assembly 1500 as the transition door 1510 articulates. As shown in FIG. 53, the transition door assembly 1500 is configured to articulate up to an angle γ as the body 770 rolls relative to the cab 40. In one embodiment, the angle γ is about 6 degrees. According to an exemplary embodiment, the wiper 1580, being compliant or elastic, is configured to permit a change in pitch of the cab 40 relative to the body 770 (e.g., a change in pitch of about $\frac{1}{8}^{th}$ of an inch).

As shown in FIG. 54, the transition door 1510 is configured to pivot from the closed orientation to the open orientation where the open orientation is orientated an angle θ relative to the closed orientation. According to an exemplary embodiment, the angle θ is greater than 90 degrees. In one embodiment, the angle θ is at least 100 degrees. In another embodiment, the angle θ is at least 105 degrees. In still another embodiment, the angle θ is at least 110 degrees.

Figure 55:
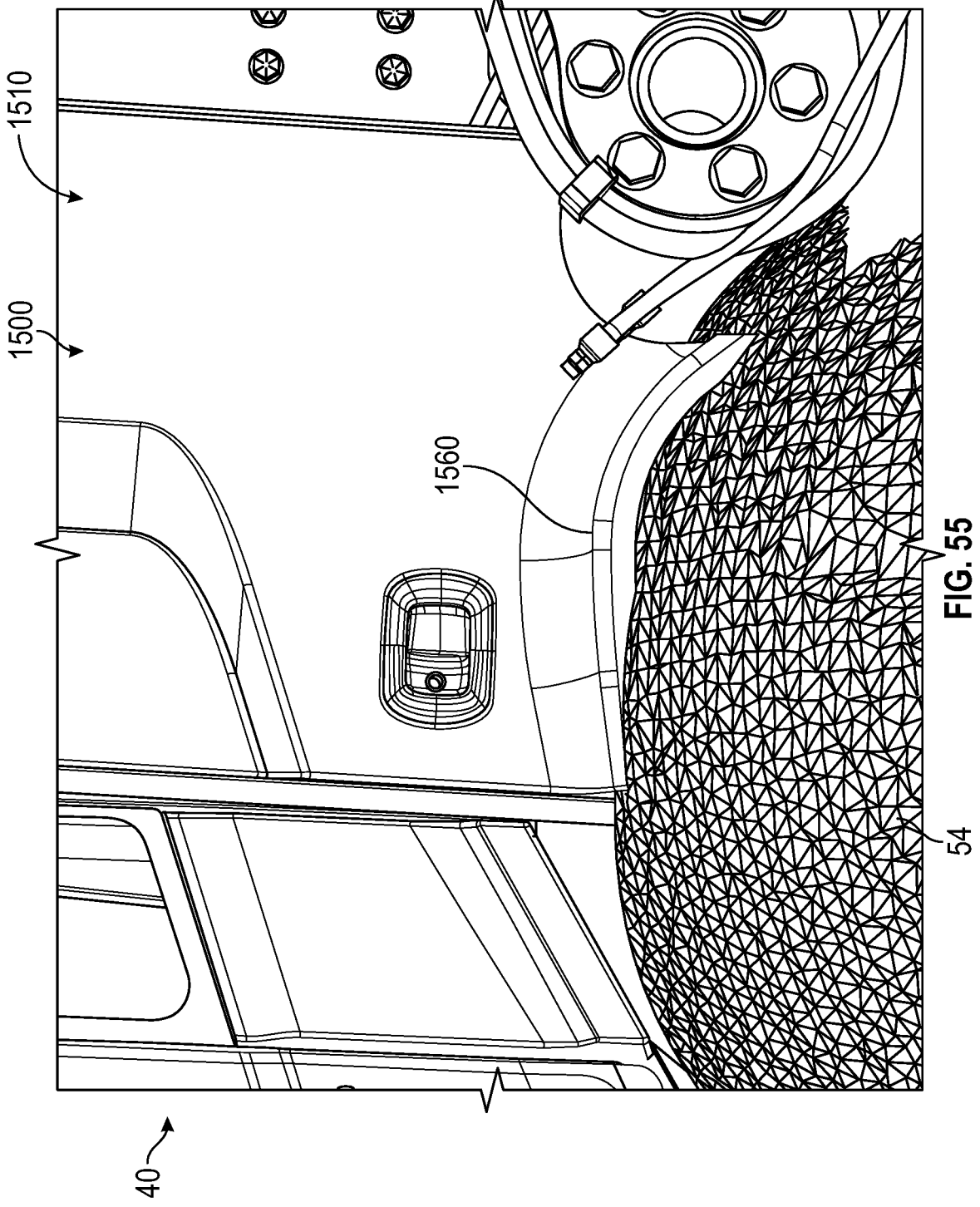
FIG. 55 is a detailed side view of the transition door assembly of FIG. 45 showing wheel clearance capabilities thereof, according to an exemplary embodiment.

As shown in FIG. 55, the rear fender portion 1560 of the transition door 1510 is configured (e.g., designed, shaped, etc.) so as to ensure that the bottom edge 1514 of the transition door 1510 does not engage with the wheel and tire assemblies 54 as the body 770 and the cab 40 move relative to each other and while the wheel and tire assemblies 54 are in any orientation through their full turning range of motion.

Figure 57:
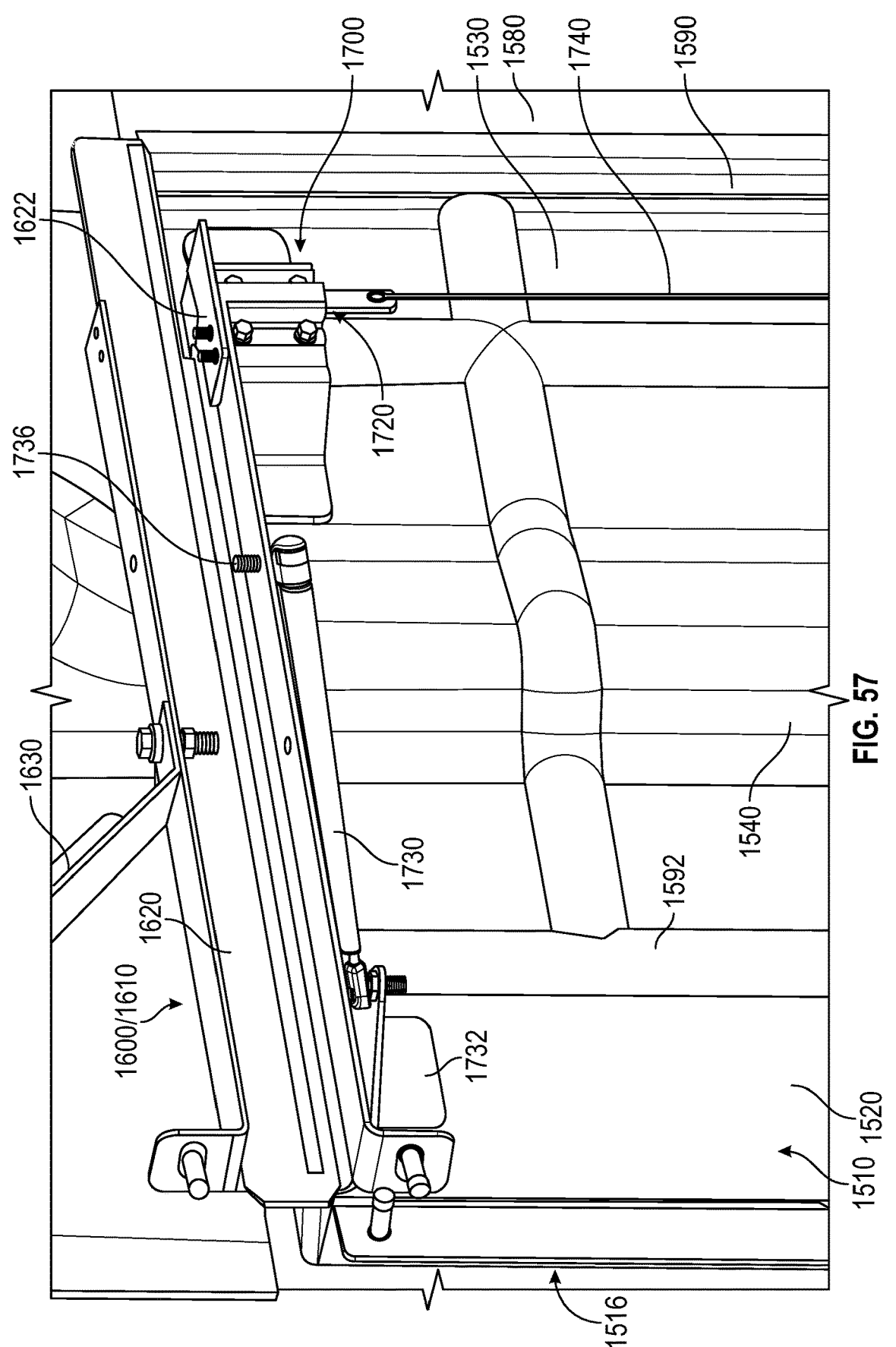
FIG. 57 is a detailed rear perspective view of the transition door assembly of FIG. 56, according to an exemplary embodiment.

Referring now to FIGS. 56 and 57, the transition door assembly 1500 is shown, according to another exemplary embodiment. The transition door assembly 1500 shown in FIGS. 56 and 57 may be substantially similar to the transition door assembly 1500 shown in FIGS. 44-55 except as otherwise specified herein. Specifically, as shown in FIGS. 56 and 57, the transition door assembly 1500 does not include the handle assembly 1550, the lower support assembly 1640, the lower latch 1710, or the support bracket 1734 positioned along the upper support 1630.

As shown in FIGS. 56 and 57, the transition door 1510 includes a flange, shown as front flange 1590, extending inward from the front edge 1518 thereof. The transition door 1510 also includes a frame, shown as rear frame 1592, that extends from the front flange 1590 and along the main door panel portion 1520, the recessed door panel portion 1530, and the angled door panel portion 1540. The rear frame 1592 may provide increased rigidity and strength to the transition door 1510.

As shown in FIGS. 56 and 57, the upper latch retainer 1622 does not extend downward from the upper cantilevered arm 1620, but rather is an extension thereof (i.e., extends beyond the free end thereof). According to the exemplary embodiment shown in FIGS. 56 and 57, the upper latch 1720 is configured as a plunger latch and the latch cable 1740 extends freely therefrom (i.e., does not connect to the handle assembly 1550). The latch cable 1740 may have a sufficient length to hang into a cavity in the wheel well. An operator of the vehicle 10 may, therefore, be able to reach into the wheel well and pull down on the latch cable 1740 to disengage the upper latch 1720 from the upper latch retainer 1622.

As shown in FIGS. 56 and 57, the upper cantilevered arm 1620 defines the second interface (e.g., an aperture, etc.), shown as actuator interface 1736, therealong to which the door actuator 1730 interfaces with. In other embodiments, the upper cantilevered arm 1620 does not define the actuator interface 1736, but rather the support bracket 1734 is positioned along the upper cantilevered arm 1620.

While the transition door assembly 1500 has been described herein and shown in the figures as being on one side of the vehicle 100, it should be understood that the transition door assembly 1500 may be similarly applied to the opposite side of the vehicle 100. Further, while the transition door assembly 1500 has been described herein and shown in the figures as being coupled to the body 770 (i.e., the support structured 1600 extending from the front wall 774 of the body 770), in other embodiments, the transition door assembly 1500 is coupled to the cab 40 (e.g., the support structure 1600 extends from the rear wall 46 of the cab 40).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle comprising:
a chassis;
a cab coupled to the chassis;
a body coupled to the chassis and spaced from the cab such that a gap is positioned therebetween; and
a transition door assembly positioned across the gap, the transition door assembly including:

a support structure coupled to the body, the support structure including a cantilevered arm having a latch retainer positioned or defined therealong;
a door panel having a rear edge and a front edge;
a hinge pivotably coupling the rear edge of the door panel to the body;
a latch disposed along the door panel and positioned to engage with the latch retainer to selectively secure the door panel in a closed orientation; and
a latch actuator configured to facilitate disengaging the latch from the latch retainer.

2. The refuse vehicle of claim 1, wherein the transition door assembly includes a bracket extending along the rear edge of the door panel, wherein the hinge pivotably couples the rear edge of the door panel to the bracket, and wherein the bracket is directly coupled to the body.

3. The refuse vehicle of claim 1, wherein the hinge is directly coupled to the body.

4. The refuse vehicle of claim 1, wherein the transition door assembly includes an elastic seal positioned along the front edge of the door panel.

5. The refuse vehicle of claim 1, wherein the cab includes a cab door, wherein a bottom edge of the cab door defines a first portion of a fender, and wherein a bottom edge of the door panel of the transition door assembly defines a second portion of the fender.

6. The refuse vehicle of claim 1, further comprising a lift assembly coupled to the body, wherein a bottom edge of the door panel defines a cutout positioned to clear a portion of the lift assembly when the door panel is in an open orientation.

7. The refuse vehicle of claim 1, wherein the latch actuator includes at least one of a latch cable coupled to the latch or a handle positioned along the door panel and coupled to the latch cable.

8. The refuse vehicle of claim 7, wherein the latch actuator includes the latch cable.

9. The refuse vehicle of claim 8, wherein the latch actuator includes the handle.

10. The refuse vehicle of claim 8, wherein the latch is a plunger latch, and wherein the latch cable extends freely from the latch into a cavity of a wheel well.

11. The refuse vehicle of claim 1, further comprising a step coupled to the chassis at a position (a) between the cab and the body and (b) behind the transition door assembly.

12. The refuse vehicle of claim 1, further comprising a drip channel disposed along a rear wall of the cab, wherein the drip channel extends at an angle.

13. The refuse vehicle of claim 12, wherein the transition door assembly is configured to move with the body as the body and the cab articulate relative to one another, and wherein the angle of the drip channel provides clearance for the transition door assembly as the transition door assembly articulates relative to the cab.

14. The refuse vehicle of claim 1, wherein the transition door assembly includes a door actuator extending between the door panel and the cantilevered arm.

15. The refuse vehicle of claim 14, wherein the door actuator is a dual acting actuator configured to bias the door panel both closed and open.

16. The refuse vehicle of claim 1, wherein the door panel is configured to pivot between the closed orientation and an open orientation, and wherein the open orientation is oriented at an angle greater than 90 degrees from the closed orientation.

17. The refuse vehicle of claim 1, wherein the door panel has a first panel portion, a second panel portion, and an angled panel portion extending between the first panel portion and the second panel portion at an angle toward a center of the refuse vehicle such that the second panel portion is offset inward relative to the first panel portion defining a door recess.

18. The refuse vehicle of claim 17, further comprising a cowl assembly positioned above the cab and the transition door assembly, wherein the cowl assembly defines a cowl recess, and wherein the door panel is aligned with the cowl assembly such that the door recess at least partially corresponds to and aligns with the cowl recess.

19. A refuse vehicle comprising:

a chassis;

a cab coupled to the chassis;

a body coupled to the chassis and spaced from the cab such that a gap is positioned therebetween;

a cowl assembly positioned above the cab and extending toward the body, the cowl assembly defining a cowl recess; and a transition door coupled to either the body or the cab, the transition door extending across the gap, the transition door including a door panel having a first panel portion, a second panel portion, and a third panel portion extending between the first panel portion and the second panel portion at an angle toward a center of the refuse vehicle such that the second panel portion is offset inward relative to the first panel portion defining a door recess;

wherein the door recess aligns with the cowl recess.

20. A refuse vehicle comprising:

a chassis;

a cab coupled to the chassis;

a body coupled to the chassis and spaced from the cab such that a gap is positioned therebetween;

a drip channel disposed along a rear wall of the cab, the drip channel extending at an angle along a height of the rear wall; and a transition door coupled to the body and extending across the gap;

wherein the transition door is configured to move with the body as the body and the cab articulate relative to one another; and wherein the angle of the drip channel provides clearance for the transition door as the transition door articulates relative to the cab.

* * * * *